United States Patent
Sato et al.

(10) Patent No.: US 9,177,511 B2
(45) Date of Patent: Nov. 3, 2015

(54) ELECTROPHORETIC DISPLAY DEVICE AND DRIVING METHOD THEREOF

(71) Applicant: NLT Technologies, Ltd., Kanagawa (JP)

(72) Inventors: Tetsushi Sato, Kanagawa (JP); Michiaki Sakamoto, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 81 days.

(21) Appl. No.: 14/028,391

(22) Filed: Sep. 16, 2013

(65) Prior Publication Data

US 2014/0078035 A1    Mar. 20, 2014

(30) Foreign Application Priority Data

Sep. 14, 2012 (JP) ................ 2012-202310
Jul. 16, 2013 (JP) ................ 2013-147478

(51) Int. Cl.
*G09G 3/34* (2006.01)
*G09G 3/20* (2006.01)
*G02F 1/167* (2006.01)

(52) U.S. Cl.
CPC .............. *G09G 3/344* (2013.01); *G09G 3/2011* (2013.01); *G02F 1/167* (2013.01); *G09G 2300/0876* (2013.01); *G09G 2310/0254* (2013.01); *G09G 2310/0275* (2013.01); *G09G 2310/06* (2013.01); *G09G 2310/063* (2013.01); *G09G 2320/0204* (2013.01)

(58) Field of Classification Search
CPC ... G09G 3/344; G09G 3/3446; G09G 3/2011; G09G 2300/0876; G09G 2310/0254; G09G 2310/0275; G09G 2310/06; G09G 2310/063; G09G 2320/0204; G02F 1/167

USPC .................... 345/99, 107, 204, 210
See application file for complete search history.

(56) References Cited

U.S. PATENT DOCUMENTS

| | | | |
|---|---|---|---|
| 2002/0005832 A1* | 1/2002 | Katase | 345/107 |
| 2002/0021483 A1* | 2/2002 | Katase | 359/267 |
| 2004/0227720 A1* | 11/2004 | Shikina et al. | 345/107 |
| 2005/0280626 A1* | 12/2005 | Amundson et al. | 345/107 |
| 2007/0120812 A1* | 5/2007 | Nagayama | 345/107 |
| 2013/0100103 A1* | 4/2013 | Lai et al. | 345/211 |

FOREIGN PATENT DOCUMENTS

| | | |
|---|---|---|
| JP | 2007-512571 | 5/2007 |
| JP | 2008-509449 | 3/2008 |
| jp | 2009-276763 | 11/2009 |

* cited by examiner

*Primary Examiner* — Tom Sheng
(74) *Attorney, Agent, or Firm* — Young & Thompson

(57) ABSTRACT

An electrophoretic display device is provided, in which an image update period is constituted with a reset period including at least a stirring pulse for stirring electrophoretic particles and a compensation pulse for suppressing accumulation of the residual DC component and with a set period including a set pulse for applying, to intended pixels, a voltage of polarity for making transition to black or white for a prescribed amount of time according to a next image. The voltage waveforms for each display gradation are so designed that a period where a positive voltage is applied to a counter electrode and a period where a negative voltage is applied do not overlap with each other, and a compensation pulse is applied after the stirring pulse which sets all the pixels of the display unit to a white or black base state. Thereby, changes in the display state are not visually recognized.

16 Claims, 63 Drawing Sheets

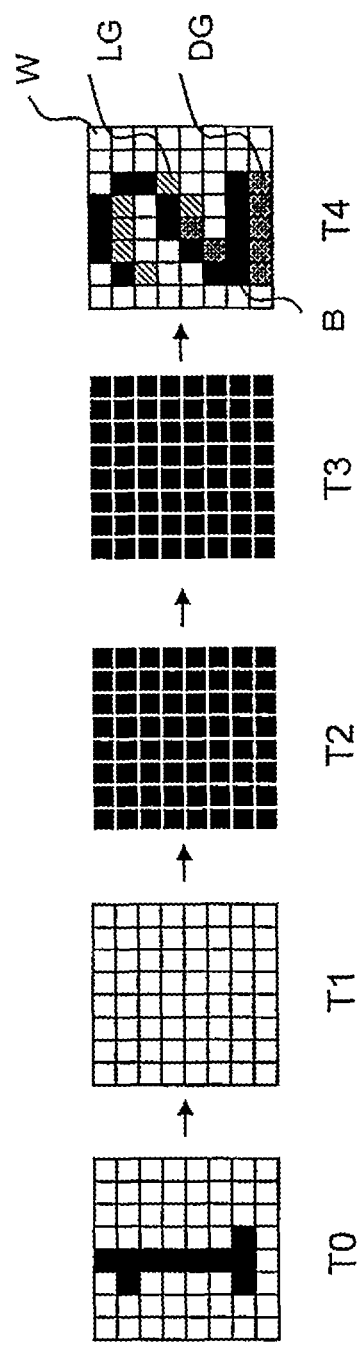

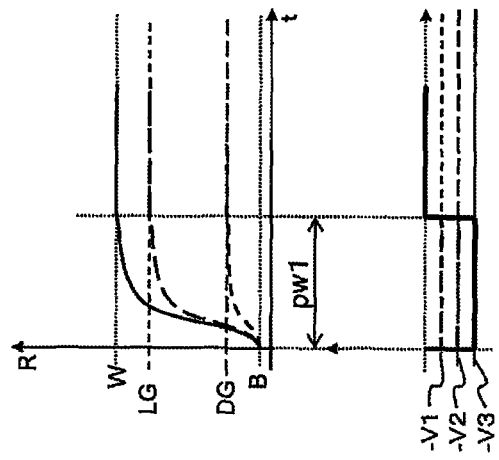
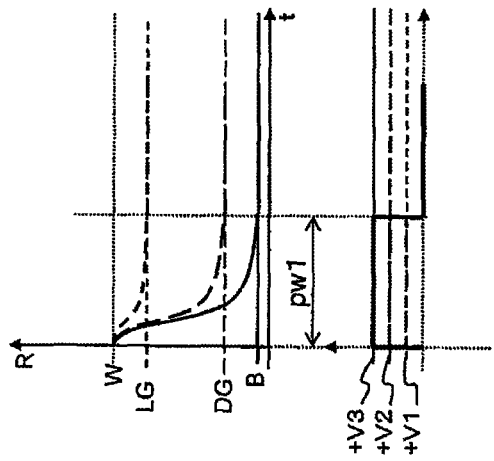

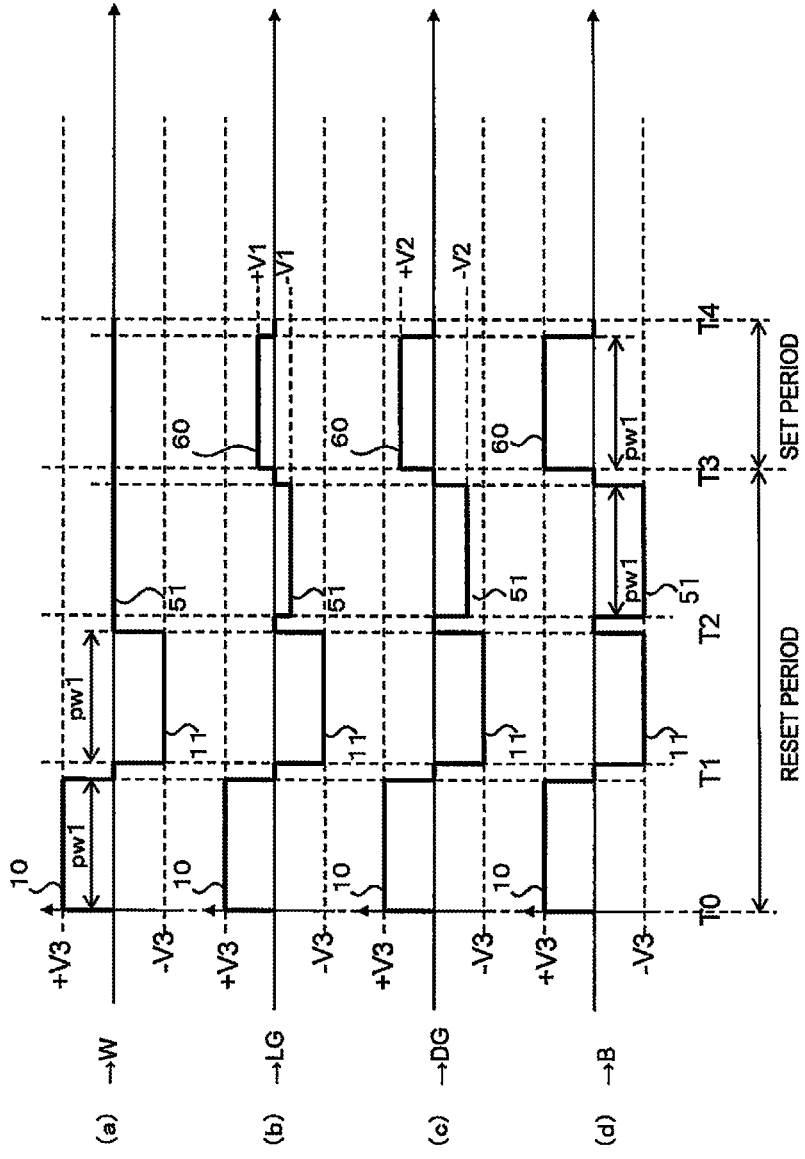

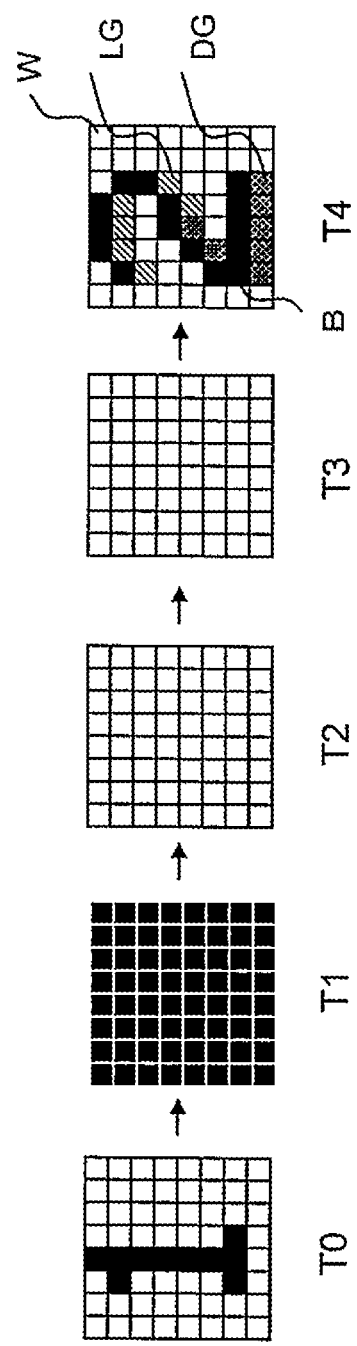

(Prior Art)

(Prior Art)

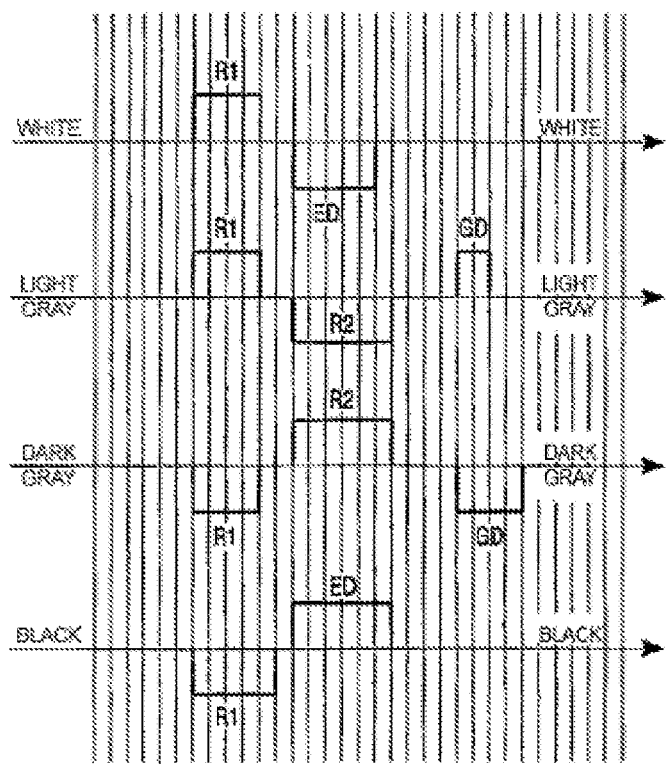
(Prior Art)

ELECTROPHORETIC DISPLAY DEVICE AND DRIVING METHOD THEREOF

CROSS-REFERENCE TO RELATED APPLICATION

This application is based upon and claims the benefit of priority from Japanese patent application No 2012-202310, filed on Sep. 14, 2012 and No. 2013-147478, filed on Jul. 16, 2013, the disclosure of which is incorporated herein in its entirety by reference.

BACKGROUND OF THE INVENTION

1. Field of the Invention

The present invention relates to an electrophoretic display device and a driving method thereof. More specifically, the present invention relates to an electrophoretic display device and a driving method thereof, with which afterimages and ghosting are not generated and inverted images (negative images) are not displayed when updating images.

2. Description of the Related Art

As a display device capable of conducting an action of "reading" without stress, electronic paper display devices referred to as electronic books or electronic newspapers are being developed. The electronic paper display device of such type is required to be thin, light in weight, hard to be broken, and low in power consumption. In order to satisfy those demands, a reflective display medium having a display memory characteristic is generally considered as advantageous. An electrophoretic display device, an electronic powder type element, a cholesteric liquid crystal element, and the like are known as such display media. Recently, an electrophoretic display device using two or more kinds of charged particles has drawn an attention. Hereinafter, a display device using an electrophoretic display element is simply referred to as an "electrophoretic display device". However, it is to be noted that the concept of the "electrophoretic display device" includes the type of display device using an element that provides display by migration of charged particles, such as an electronic powder type element. The basic principle of the electrophoretic display device is that a liquid cell (electrophoretic layer) containing charged particles is sandwiched by transparent electrodes, and the reflectance of the display surface changes by migration of the charged particles caused by adding a voltage. Recently, an active matrix driving type electrophoretic display device using a film-type electrophoretic layer on which a great number of microcapsules filled with charged particles and a solvent and using a TFT glass substrate has been put into practical use. This electrophoretic display device is constituted by stacking a TFT glass substrate, an electrophoretic display element film (electrophoretic layer), and a counter substrate in this order. In the TFT glass substrate, TFTs as a great number of switching elements arranged in matrix, pixel electrodes, gate lines, and data lines connected to each of the TFTs, respectively, are provided. Further, the electrophoretic display element film is formed by filling microcapsules of about 40 μm in a polymer binder. In the solvent inside the microcapsules, two kinds of nanoparticles charged in plus and minus, i.e., white pigment such as titanium oxide particles charged minus and black pigment such as carbon particles charged plus are confined in a dispersedly floating manner. Further, a counter electrode (also referred to as a common electrode) for giving a reference potential is formed on the counter substrate.

The operations of the above-described active matrix drive type electrophoretic display device are executed by migration of the white pigment and the black pigment vertically through applying voltages corresponding to pixel data between the pixel electrode and the counter electrode. That is, when the positive voltage is applied to the pixel electrode, the white pigment charged minus is gathered to the pixel electrode while the black pigment charged plus is gathered to the counter electrode. Thus, assuming that the counter electrode side is the display surface, the area (pixel) on the display screen corresponding to the pixel electrode to which the positive voltage is applied turns out as black display. In the meantime, when the negative voltage is applied to the pixel electrode, the black pigment is gathered to the pixel electrode and the white pigment is gathered to the counter electrode. Thus, the corresponding area (pixel) on the display screen turns out as white display. Further, the migration amount of the charged particles can be changed through changing the voltage applying time and the extent of the voltage, so that it is possible to provide halftone (gray) display (e.g., Japanese Unexamined Patent Publication 2009-276763 (Patent Document 1)). As described, it is possible to display characters, images, and the like through controlling the voltages to be applied for each pixel electrode.

However, when voltages corresponding to a next image are simply applied to the pixel electrodes at the time of updating the displayed image with the electrophoretic display device, the history of the previous image affects the next image, which is visually recognized as an afterimage. Therefore, it is being tried to cancel the history of the previous image by, for example, providing the so-called reset period in which white/black display is repeated in all the pixels on the display screen once, white-black inverted image is displayed in a next image, etc. Therefore, the voltages applied to the pixel electrodes at the time of update include not only the voltages corresponding to prescribed display colors but also voltages in the reset period, and change for the period (time) during the update of images. A series of voltages applied to the pixel electrodes from the start to the end of the update of the image are referred to as a voltage waveform at the time of updating the image.

Further, it is known to cause deterioration in the display quality such as having afterimages, ghosting, and the like with the electrophoretic display device when DC (Direct Current) components are accumulated (residual electric charges are generated) by repeating the update of the images. As a driving method which suppresses the accumulation of the DC components, there is a driving method which zeros the total amount (time-integrated voltage value) of the voltages applied to the pixel electrode. Japanese Patent Application Publication 2008-509449 (Patent Document 2) and Japanese Patent Application Publication 2007-512571 (Patent Document 3) disclose examples of the driving method which zeros the total DC components. FIG. 61 shows examples of the waveforms disclosed in Patent Document 2. Each graph of FIG. 61 shows the waveform of the voltage given to the pixel electrodes when updating the image, in which the lateral axis is the time (seconds) and the longitudinal axis is the applied voltage (V). Expression of [R1 R2] in FIG. 61 is a symbol while defining the display before updating the image, i.e., the initial state, is R2 and the display after updating the image, i.e., the final state, is R1. That is, FIG. 61 shows the total of sixteen voltage waveforms of transitions in four gradations including gray display.

Specific examples of the expression [R1, R2] are shown in the followings.

[1 1]: Transition from black (gray level 1) to black (gray level 1)

[3 1]: Transition from black (gray level 1) to light gray (gray level 3)

[4 1]: Transition from black (gray level 1) to white (gray level 4)

Details of each waveform will be described by referring to the [1 4] waveform as an example. The [1 4] waveform is constituted with: a first reset pulse of +15 V and 0.5 seconds, which drives the pixels to black; a second reset pulse of −15

V and 0.5 seconds, which drives the pixels to white; and a set pulse of +15 V and 0.5 seconds, which drives the pixels to black. The [1 4] waveform achieves transition from the gray level 4 (white) to gray level 1 (black), i.e., achieves update of an image. Referring to FIG. 61, the total DC of the voltages applied to the pixels in a single-time update of the image is zero in the waveforms of [1 1], [2 2], [3 3], and [4 4]. In the meantime, as in the case of the [1 4] waveform, for example, there is a waveform having deviation in DC component with a single-time update of the image. Those waveforms are so described in Patent Document 2 that the total DC becomes zero by conducting the update of images for a plurality of times.

Further, FIG. 63 shows examples of the waveforms disclosed in Patent Document 3. FIG. 63 shows the typical waveforms used at the time updating the images from white to white, from light gray to light gray, from dark gray to dark gray, and from black to black, in which R1, R2 are the reset pulses, GD is a gray scale drive pulse, and ED is a polar drive pulse (pulse that drives the optical state of pixels from one of the polar optical state to the other polar optical state). Patent Document 3 refers to FIG. 63 and describes that the net DC of each gray scale transition (state between the intermediate gray optical state and the intermediate gray optical state such as the state between light gray and light gray or between dark gray and dark gray) at the time of updating the image, i.e., the product of the voltage and the time at each pulse, is zero. Further, it is also described that the net DC becomes the minimum for each polar transition (e.g., between white and white, between black and black).

However, with the electrophoretic display device driving method which prevents the conventionally generated after images and ghosting and increases the display quality, an inverted image of the displayed image and an inverted image of the image to be displayed next are displayed in the reset period at the time of updating the image. This gives a sense of discomfort to the user.

For example, the inverted image displayed in the reset period will be described by using the Driving Example shown in FIG. 61 and the display example shown in FIGS. 62A and 62B of Patent Document 2. FIGS. 62A and 62B illustrate the changes in the display screen when the image is updated with the waveforms of FIG. 61 in the display matrix of 6×8 pixels. FIG. 62A shows the expression of the gray level, the initial image before updating the image, and the final image after updating the image. As described above, the expression of [R1 R2] shows the transition between the gradations used in Patent Document 2. Note that black is expressed as B (gray level 1), white is expressed as W (gray level 4), and [4 1] shows the transition from black to white.

FIG. 62B shows a midway state during update of the image by the waveform of FIG. 61, the display screen after 0.5 seconds passed from the point of applying the first reset pulse, and the display screen after 1.0 seconds passed from the point of applying the second reset pulse. As shown in FIG. 62B, the display screen after 1.0 seconds passed from the point of applying the second reset pulse becomes an almost white-black inverted image of the final image. The change speed of the display state of the electrophoretic display device such as the transition time from white to black, for example, is more gradual compared to the case of the liquid crystal display device and the like. Thus, the white-black inverted image after 1.0 seconds shown in FIG. 62B including the changes before and after is sufficiently recognized by the eyes of human beings. Therefore, the user is to visually recognize the inverted image of the image displayed next every time the image is updated, thereby giving a sense of discomfort to the user.

Further, in the Driving Example shown in FIG. 63 of Patent Document 3, the display state of almost an white-black inverted image of the final image is displayed at the end of R1 (reset pulse). This occurs because the polarity of R1 is the opposite polarity of the pulse to be applied at last for forming the final image shown in FIG. 63. As described above, the transition time of the particles of the electrophoretic display device is generally gradual. Thus, the user also comes to visually recognize the white-black inverted image also in the Driving Example of FIG. 63, thereby giving a sense of discomfort to the user.

As described above, one of the reasons why the inverted image is recognized is that the migration time of the particles is slow. Further, the reset pulse is required for increasing the display quality, so that the image according to the voltage applied in the reset period is to be visually recognized. However, to zero the total DC component for increasing the display quality is to execute the transition reversed from the final transition, i.e., to apply the voltage that is of inverted polarity of the voltage applied in the set period in the reset period for the same length of time. That is, when a waveform of zero total DC is simply devised, an inverted image is generated as a result. As will be described later, the inventors of the present invention have done eager studies to find the driving method which can achieve zero total DC and generate no inverted image, and have achieved the present invention.

Further, in the Driving Example of Patent Document 2, the polarities of the set pulse and the reset pulse vary depending on the display gradations (gray levels) as in the waveforms shown in FIG. 61. Therefore, when employed to the active matrix drive, an instantly large driving capacity is required for the drive circuit that supplies the voltage to the pixels. For example, it is assumed that two pixels such as a pixel making transition from black to black [1 1] and a pixel making transition from white to white [4 4] are in a relation of being adjacent to each other by being connected via a same voltage supply line and connected sequentially to selection lines for selecting switching modules. In that case, a radical change in the potential of the voltage supply line is required at the time of supplying the reset pulse, i.e., −15 V for the [1 1] pixel and +15 V for the next [4 4] pixel. Further, at the time of supplying the set pulse, a radical change in the potential of the voltage supply line is also required at the time of supplying the reset pulse, i.e., +15 V for the [1 1] pixel and −15 V for the next [4 4] pixel. It is necessary for the drive circuit to satisfy this demand. However, when a large scaled screen and high definition thereof are more advanced, the driving capacity to be required becomes larger as well. Thus, in order to correspond to the large scaled screen and the high definition thereof, a waveform that does not require a radical change in the potential, i.e., drive with suppressed power consumption, is required.

The present invention is designed in view of the above-described issues. An exemplary object of the present invention is to provide an electrophoretic display device and a driving method thereof, with which the DC component can be made zero in the driving waveforms in total, afterimages and ghosting are not generated, and inverted image is not displayed at the time of updating the image. Further, an exemplary object of the present invention is to provide an electrophoretic display device and a driving method thereof, which require low power consumption by employing a waveform that does not require a radical change in the potential.

SUMMARY OF THE INVENTION

An electrophoretic display device according to an exemplary aspect of the invention includes: a display unit which includes a first substrate, a second substrate, and electrophoretic particles inserted between the first substrate and the second substrate; and a voltage applying unit which updates a display state of the display unit from a current image to a next image by applying a stirring pulse, a compensation pulse, and a set pulse constituted with prescribed voltage waveforms to the electrophoretic particles, wherein the voltage applying unit first sets the display state to a state where the electrophoretic particles are migrated to either the first substrate or the second substrate by the stirring pulse according to polarity of the electrophoretic particles, then applies a voltage for suppressing a residual direct current component that may be generated after applying the set pulse without causing a change in the display state by the compensation pulse, and updates the image to the next image by the set pulse.

An electrophoretic display device driving method according to another exemplary aspect of the invention is a method for driving an electrophoretic display device which includes: a display unit which includes a first substrate, a second substrate, and electrophoretic particles inserted between the first substrate and the second substrate; and a voltage applying unit which updates a display state of the display unit from a current image to a next image by applying a stirring pulse, a compensation pulse, and a set pulse constituted with prescribed voltage waveforms to the electrophoretic particles, wherein the voltage applying unit first sets the display state to a state where the electrophoretic particles are migrated to either the first substrate or the second substrate by the stirring pulse according to polarity of the electrophoretic particles, then applies a voltage for suppressing a residual direct current component that may be generated after applying the set pulse without causing a change in the display state by the compensation pulse, and updates the image to the next image by the set pulse.

BRIEF DESCRIPTION OF THE DRAWINGS

FIG. 8 is an illustration showing displayed images at the time of updating the image in Driving Example 1-1 and Driving Example 1-2;

FIGS. 27A-27F are pattern charts in which the pixels on a display unit of the third exemplary embodiment are separated into a group of pixels a and a group of pixels b;

FIGS. 36A and 36B show charts of the reflectance response characteristic of an electrophoretic element with respect to the voltage values;

FIG. 37 is a chart showing voltage waveforms at the time of updating an image in Driving Example 4-1;

FIG. 38 is an illustration showing displayed images at the time of updating an image in Driving Example 4-1 and Driving Example 4-2;

FIG. 63 is a chart showing the driving timing disclosed in Patent Document 3.

DETAILED DESCRIPTION OF THE PREFERRED EMBODIMENTS

Figure 1:
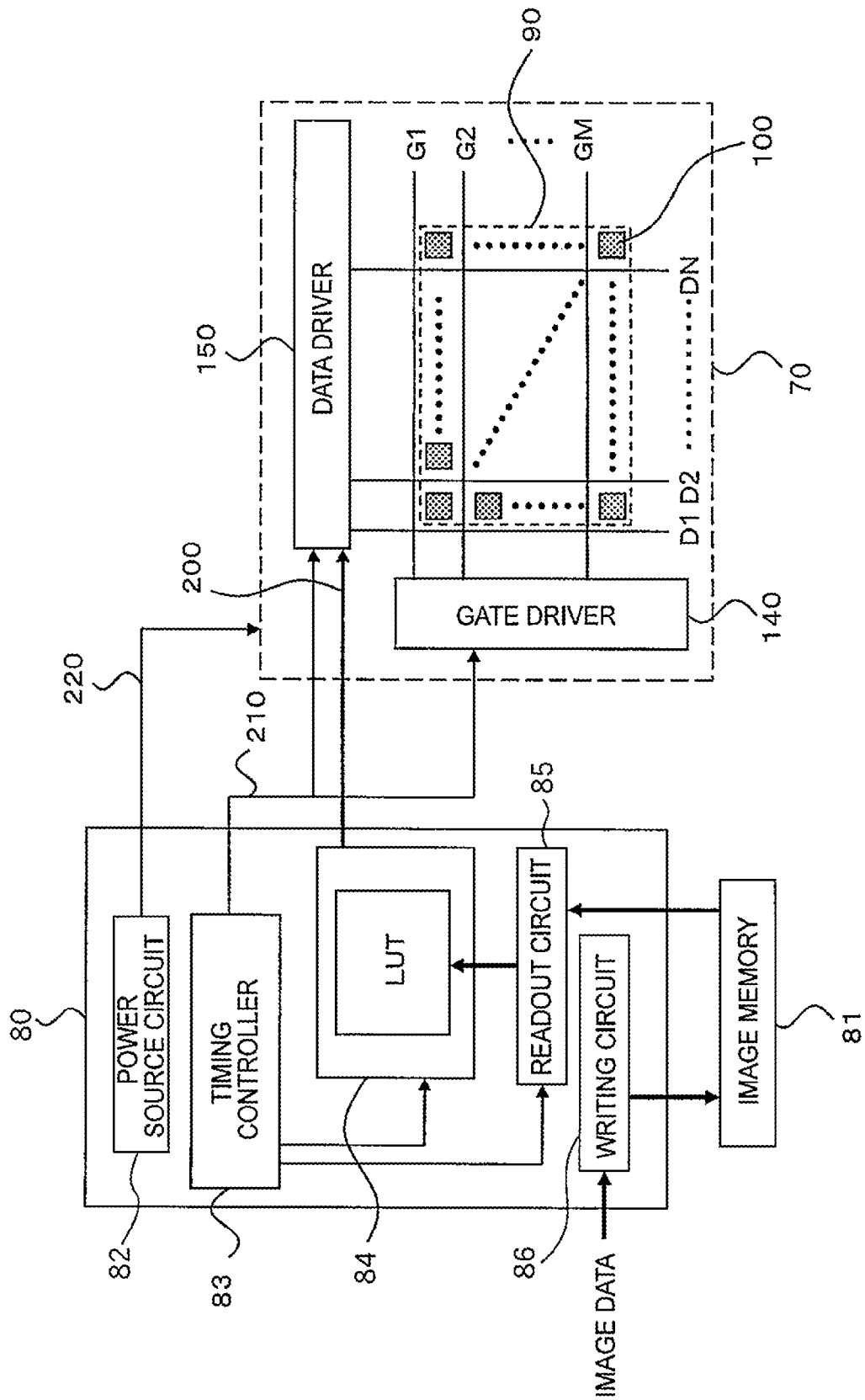
FIG. 1 is a functional block diagram showing an electrophoretic display device according to a first exemplary embodiment.

Hereinafter, modes for embodying the present invention (referred to as exemplary embodiments hereinafter) will be described by referring to the accompanying drawings. In the Specification and the drawings, same reverence numerals are used for substantially the same structural elements. The shapes in the drawings are illustrated in a manner to be easily comprehended by those skilled in the art, so that the dimensions and the ratios thereof are not necessarily consistent with the actual ones.

(First Exemplary Embodiment)
(Explanations of Structures)

Hereinafter, the structures of an electrophoretic display device according to a first exemplary embodiment of the present invention will be described by referring to the accompanying drawings.

FIG. 1 is a block diagram showing the entire structure of the electrophoretic display device according to the first exemplar embodiment. As shown in FIG. 1, the electrophoretic display device according to the first exemplary embodiment includes a display controller 80, an image memory 81, a display panel 70, and the like. The display controller 80 includes a power source circuit 82, a timing controller 83, a data conversion circuit 84, a readout circuit 85, a writing circuit 86, and the like. The display controller 80 processes inputted image data, and outputs display data 200, a control signal 210, and various power source voltages 220. The display panel 70 sets the image memory 81 and pixels 100 arranged in a matrix of M rows and N columns to prescribed display states according to the output of the display controller 80.

The display panel 70 includes: a display unit 90 constituted with the pixels 100 of M rows and N columns; at least N-pieces of data lines Dn (n=1, 2, - - - , N) to be wirings of voltages to be applied to the pixel electrodes (not shown) corresponding to each of the pixels 100; at least M-pieces of gate lines Gm (m=1, 2, - - - , M) to be the wirings for setting ON/OFF of the switching modules (not shown) corresponding to each of the pixels 100; a common electrode 50 to which a potential VCOM of a counter electrode (simply referred to as "VCOM" hereinafter) is inputted; a data driver 150 which supplies voltages according to the display data to each of the data lines Dn; and a gate driver 140 which supplies voltages for setting ON/OFF of the switching modules to each of the gate lines Gm.

Hereinafter, the detailed structures of the display panel 70 will be described by using a sectional view of the display unit 90 shown in FIG. 2 and a plan schematic view of the display panel 70 shown in FIG. 3.

Figure 2:
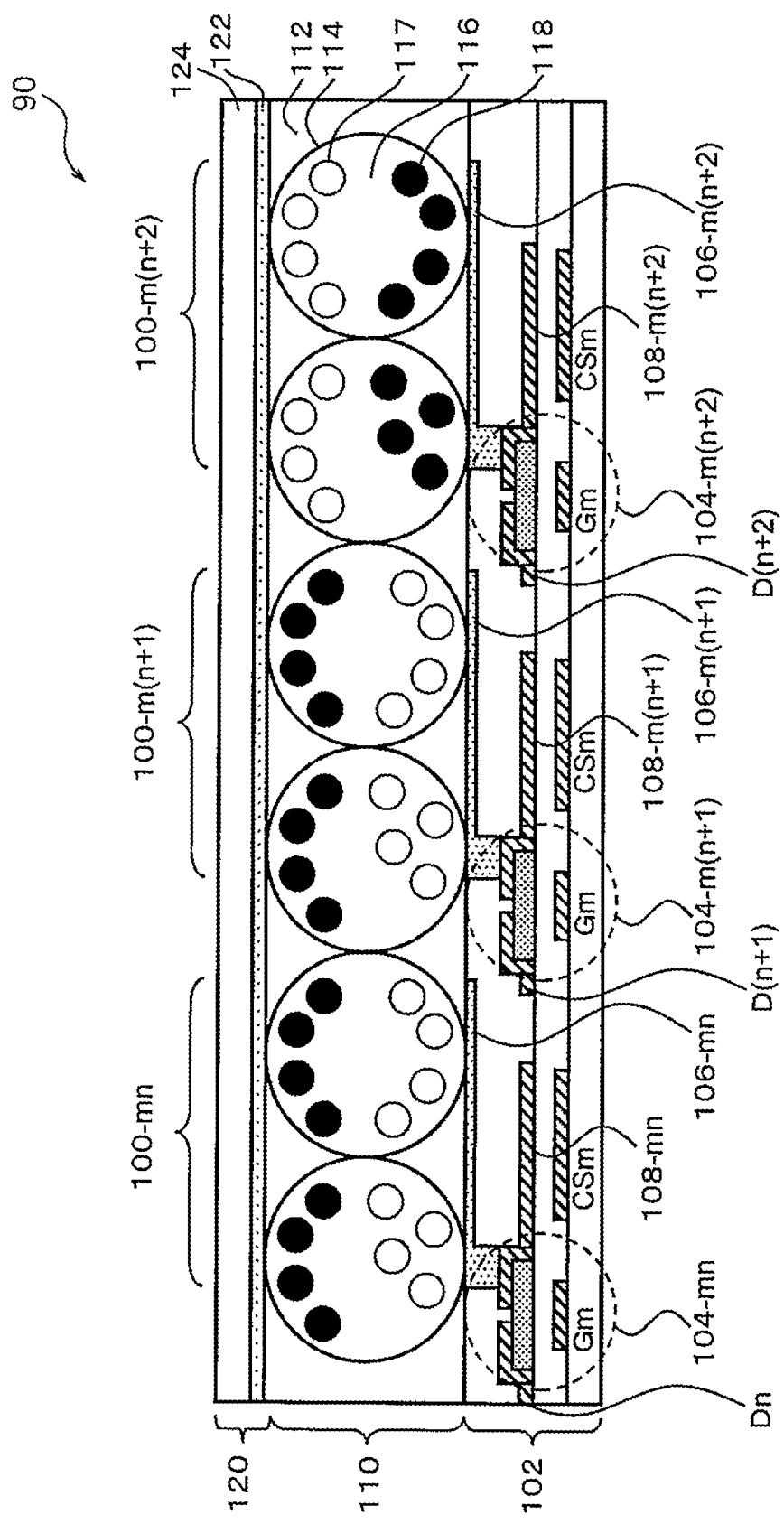
FIG. 2 is a sectional view showing a display panel according to the first exemplary embodiment.

FIG. 2 is a sectional view taken along m row of the display unit 90, and it is formed with a laminated structure of a TFT glass substrate 102, an electrophoretic layer 110, and a counter substrate 120 laminated in this order.

In the TFT glass substrate 102, provided are TFTs functioning as the switching elements, and pixel electrodes, gate lines, data lines, storage electrodes connected to each TFT, respectively. Specifically, TFT104-mn, TFT104-m(n+1), and TFT104-m (n+2) are provided over the m rows and (n+2) columns from the m row and n column of the display unit; the gate lines Gm, the data lines Dn, D(n+1), D(n+2), the pixel electrodes 106-mn, 106-m(n+1), 106-m(n+2), the storage electrodes 108-mn, 108-m(n+1), 108-m(n+2) connected to each TFT are provided; and storage capacitance (reference numeral is omitted) is formed, respectively, between the storage electrodes 108-mn, 108-m(n+1), 108-m(n+2), and the storage lines CSm.

The electrophoretic layer 110 is formed by filling microcapsules 114 in a polymer binder 112, for example. In general, each of the microcapsules 114 is smaller than the size of the pixel electrode of the electrophoretic display device. FIG. 2 shows a case where two microcapsules correspond to a single pixel electrode. However, it is so illustrated for the sake of explanations, and the structure is not limited only to such case. A solvent 116 is inserted inside the microcapsules 114. In the solvent 116, infinite numbers of nano-level sized white pigment (white particles, e.g., titanium oxide) 117 charged minus and black pigment (black particles, e.g., carbon) 118 charged plus are floating.

The counter substrate 120 is formed by laminating a single counter electrode 122 opposing to each of the pixel electrodes 106-mn, 106-m(n+1), and 106-m(n+2) of the TFT glass substrate 102 with a transparent plastic substrate 124 (e.g., PET: Poly Ethylene Terephthalate).

In the display unit 90 structured as in FIG. 2, the charged particles (white pigment 117, black pigment 118) within the microcapsules 114 in the electrophoretic layer 110 migrate and the reflectance of the display surface changes when the voltage is applied between each of the pixel electrodes 106-mn, - - - and the counter electrode 122. Therefore, a pixel 100-mn, a pixel 100-m(n+1), and a pixel 100-m(n+2) are formed, respectively, in the regions corresponding to each of the pixel electrodes 106-mn, 106-m(n+1), and 106-m(n+2).

Figure 3:
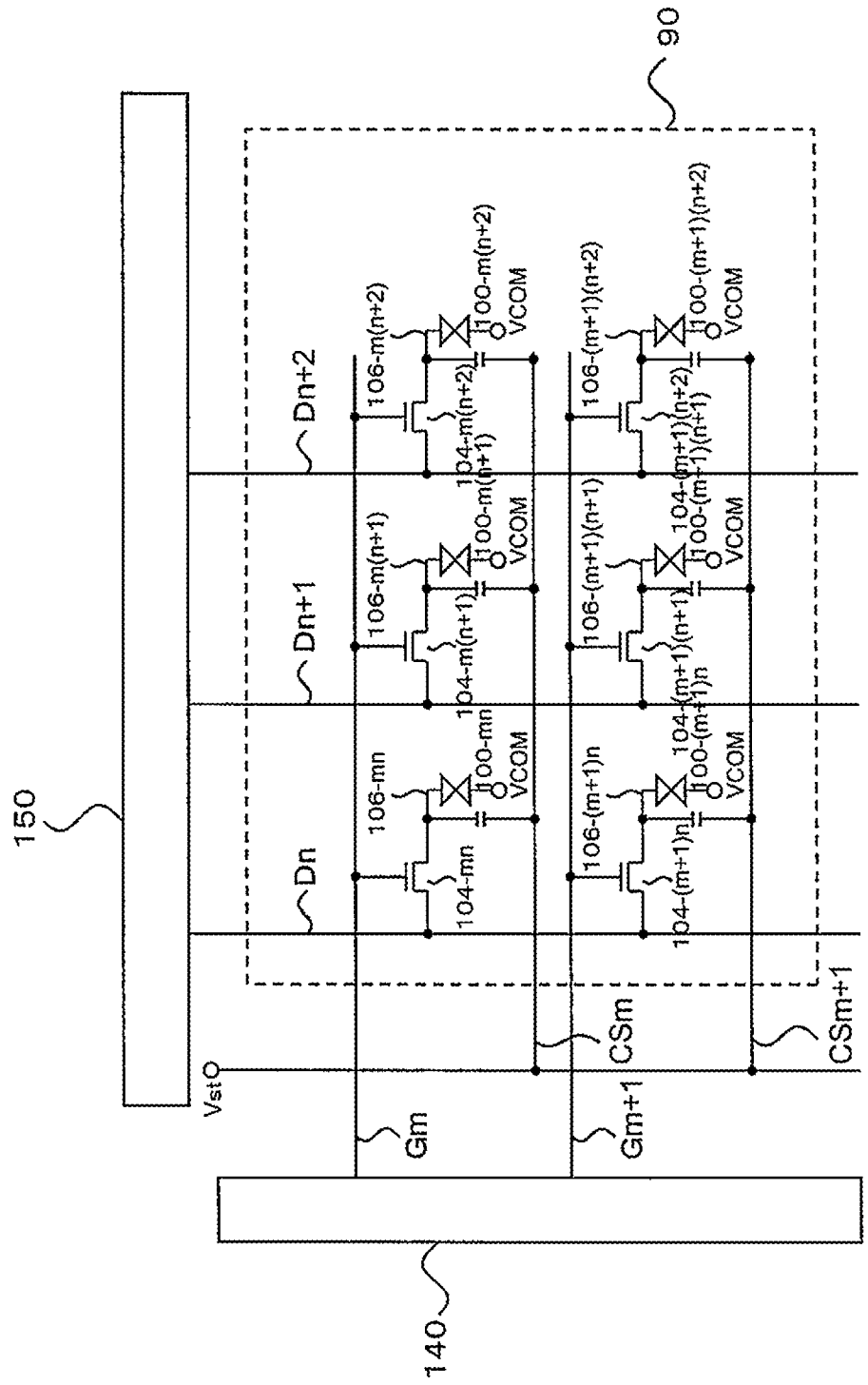
FIG. 3 is a plan schematic view showing the display panel according to the first exemplary embodiment.

FIG. 3 shows the plan detailed structure of the display unit 90 shown in FIG. 2, and it is a schematic view which particularly shows the electric connecting relation. Among the pixel group arranged in a matrix of M rows and N columns, the structure from the m row and n column (m=1, 2, - - - , M−1, n=1, 2, - - - , N−2) to m+1 row and n+2 column are shown in FIG. 3. However, the pixels that are not illustrated therein are also in the same structure.

As shown in FIG. 3, data lines for supplying the voltages corresponding to the display data such as the pixel electrode 106-mn and the like via the TFT104-mn and the like are disposed along the column direction for each column such as the data line Dn, the data line Dn+1, and the data line Dn+2. Further, along the row direction, gate lines for controlling the TFT are disposed for each row as in the gate line Gm and the gate line Gm+1. Furthermore, the storage lines for forming the storage capacitance between the storage electrode 108-mn and the like (reference numerals in the drawing are omitted) are also disposed for each row as in the storage line CSm and the storage line CSm+1. Each of the storage lines is connected mutually as shown in FIG. 2, and a common potential Vst is supplied. In general, the common potential Vst is structured to supply VCOM that is the same potential as that of the counter electrode.

The gate driver 140 has a function which sequentially supplies voltage pulses to the data lines G1, G2, - - - , GM for each one horizontal period by a start signal, a clock signal, an enable signal, and the like contained in a control signal 210 supplied from the display controller 80 shown in FIG. 1 to set on the TFT connected to each gate line for each row in an enable period. One horizontal period is determined by the clock signal, and the enable period is determined by the enable signal.

Figure 4:
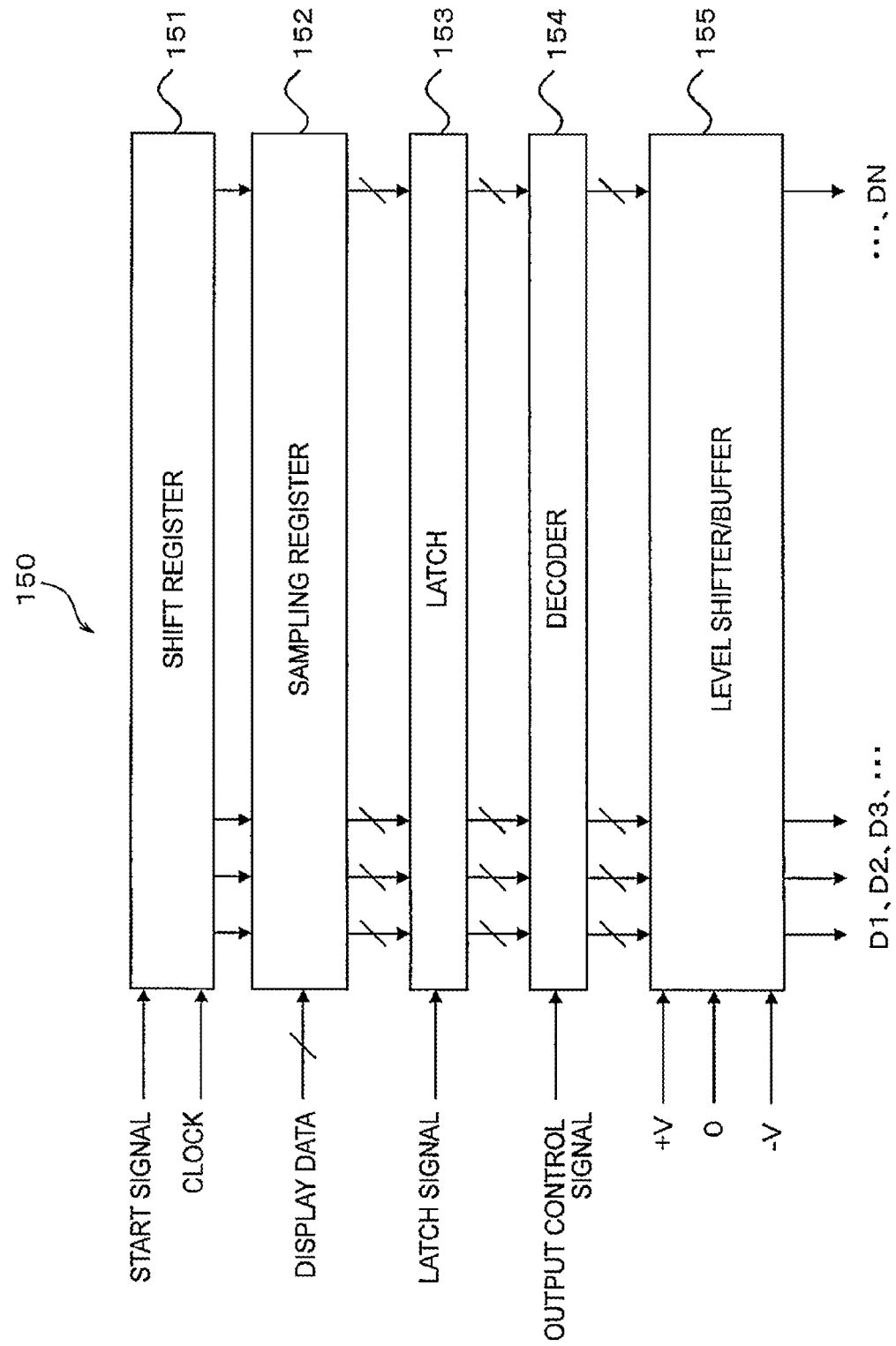
FIG. 4 is a block diagram showing a data driver according to the first exemplary embodiment.

The data driver 150 has a function which supplies voltages corresponding to various kinds of signals contained in the control signal 210 supplied from the display controller 80 and the display data 200 to each of the data lines D1, D2, - - - , and DN. FIG. 4 shows an example of the structure of the data driver 150.

The data driver 150 is constituted with a shift register 151, a sampling register 152, a latch 153, a decoder 154, and a level shifter/buffer 155, and operates as follows.

When a start signal is inputted under a state where a clock is inputted to the shift register 151, the shift register 151 sequentially outputs a sampling signal to the sampling register 152 by synchronizing with the clock. In the sampling register 152, display data is sequentially fetched and held according to the sampling signal. When a latch signal is transmitted to the latch 153 after the display data for one row is held, the display data held by the sampling register 152 is fetched at once to the latch 153. When an output control signal is transmitted to the decoder 154 thereafter, the display data in the latch 153 is fetched into the decoder 154, and decoded signals are outputted at once to the level shifter/buffer 155. In the level shifter/buffer 155, a voltage of +V, 0, or −V is selected according to the decoded signals, and the voltage selected from +V, 0, or −V is outputted to the data lines D1, D2, - - - , DN via the buffer.

The voltage (+V/0/−V) inputted to the data lines D1, D2, - - - , DN is written to the pixel electrodes (106-m1, 106-m2, - - - , 106-mN) belonging to the gate line (e.g., Gm in FIG. 3) to which the voltage pulse is inputted from the gate driver 140 via the TFT (104-m1, 104-m2, - - - , 104-mN). That is, the voltage is written to the pixel electrodes of the m row. Further, in the writing period of the m-th row (horizontal period), the display data for the next row (m+1) is outputted to the data driver 150 from the display controller 80 and is fetched to the latch 153. Then, when the voltage corresponding to the display data on the m+1 row is inputted to the data line and the voltage pulse is inputted to the gate line Gm+1 after the TFTs on the m row are set off by the changes in the voltage of the gate line Gm (after the enable period is ended), the voltage is written to the pixel electrodes on the m+1 row. This operation is repeated to sequentially write the voltage to all the pixel electrodes on the display unit 90. The voltage of the pixel electrodes is held for a specific period by the storage capacitance connected in parallel even after the TFTs are set off.

As described above, the voltage according to the display data is written to the pixel electrodes. The structure of the module for writing the voltage to the pixel electrodes described above is almost the same as that of the conventional active matrix type liquid crystal display device. For example, it is also possible to employ the gate driver used for the liquid crystal display device. However, with the electrophoretic display device, the changing speed of the display state of the pixels is determined by the migration speed of the charged particles, and the changing speed is considerably slower than the changing speed of the pixels of the liquid crystal display device. Therefore, a plurality of frame periods are required for updating the image in the electrophoretic display device, while the image is updated in a single frame (a period for writing the voltage once to all the pixel electrodes) in a typical liquid crystal display device. Hereinafter, each frame in the plurality of frame periods required for updating the image is referred to as a sub-frame (one vertical period).

Figure 5:
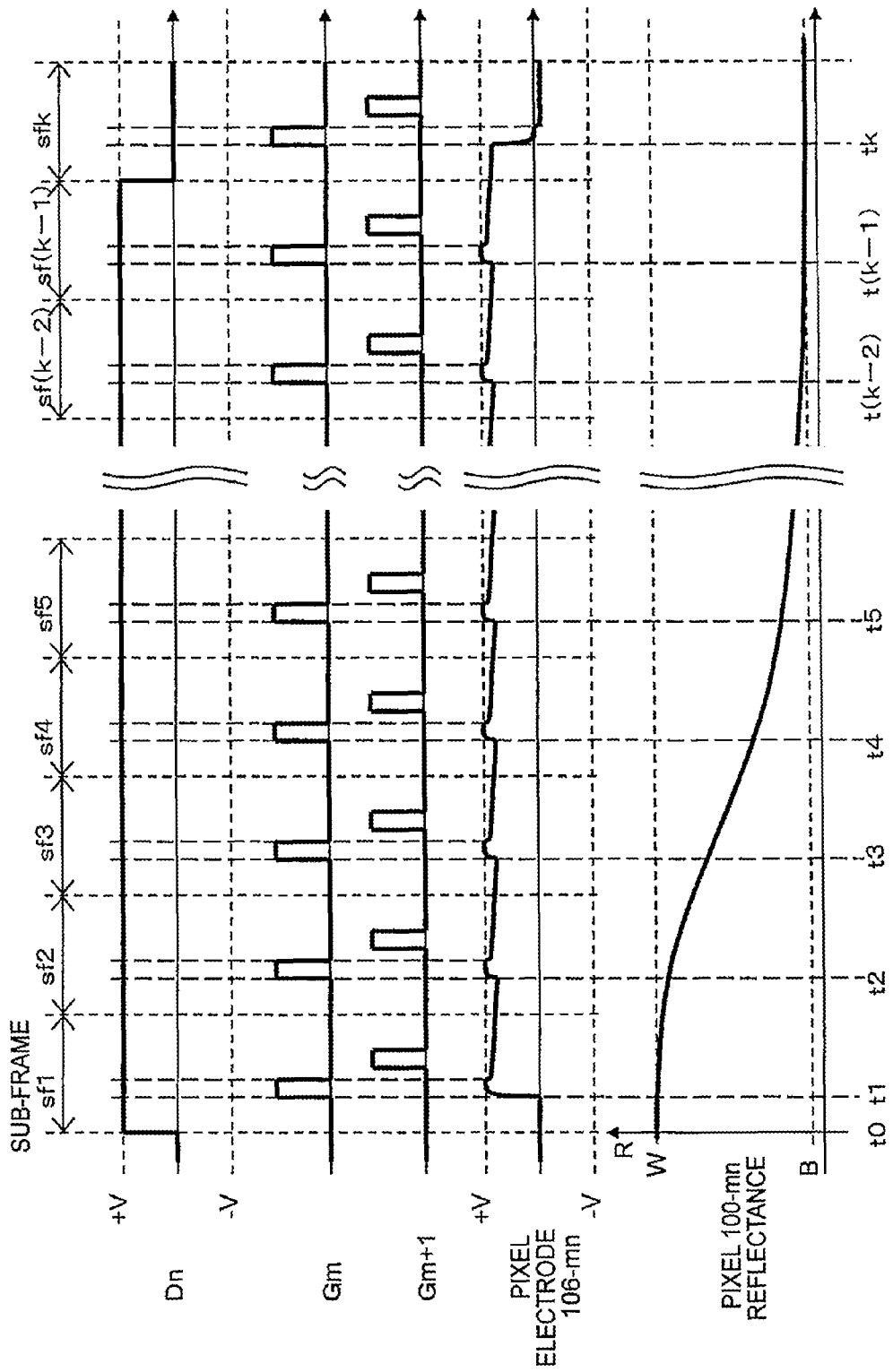
FIG. 5 is a timing chart showing the relation between the timing for applying a voltage to a pixel electrode and changes in the reflectance (white to black) of the pixel according to the first exemplary embodiment.
Figure 6:
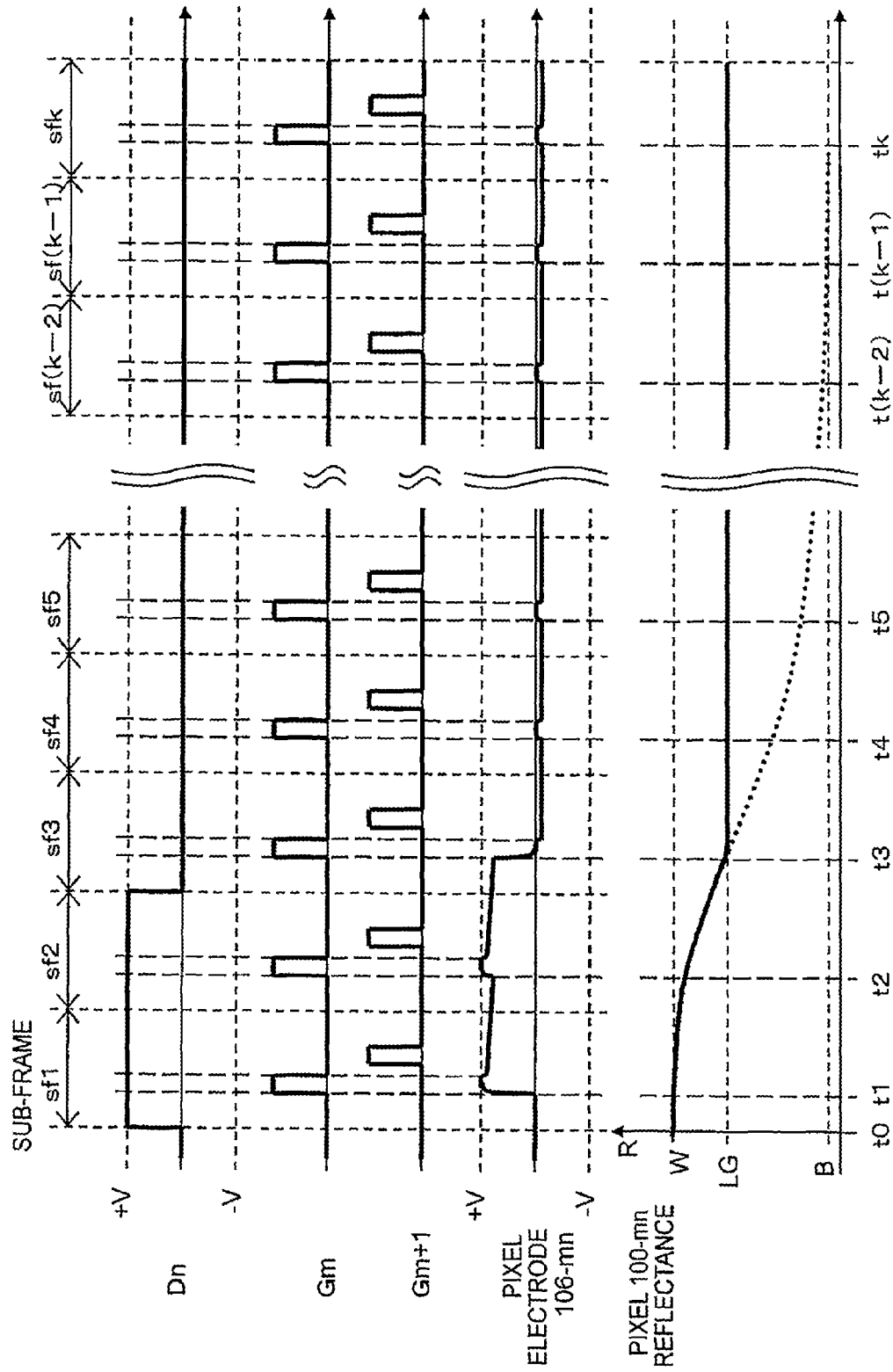
FIG. 6 is a timing chart showing the relation between the timing for applying a voltage to a pixel electrode and changes in the reflectance (white to light gray) of the pixel according to the first exemplary embodiment.

Specific examples of the case where the display state of the pixels changes over a plurality of sub-frames in the electrophoretic display device are shown in FIG. 5 and FIG. 6. FIG. 5 and FIG. 6 are charts showing the changes in the voltages in the data line Dn, the gate line Gm (gate line Gm+1), and the pixel electrode 106-mn(longitudinal axis) and the changes in the reflectance of the pixel 100-mn caused according to that, while taking the lateral axis as the time. +V in the charts is a positive voltage (e.g., +15 V), −V is a negative voltage (e.g., −15 V), and 0 V is supplied to the counter electrode (VCOM) (not shown). Black particles (not shown) are charged plus, and white particles (not shown) are charged minus.

FIG. 5 is an example where the pixel 100-mn is changed from the white display state (W) to the black display state (B) by writing the voltage in the period from the sub-frame sf1 to the sub-frame sfk. Thus, at t0, the white particles stay on the counter electrode 122 side that is the display surface side, while the black particles stay on the pixel electrode 106-mn side. The sub-frame sf1 starts at t0, and the voltage pulse is sequentially inputted to the gate lines G1, G2 (not shown). When the voltage of the gate line Gm rises at t1 and the TFT104-mn is set on, the voltage (+V) of the data line Dn is written to the pixel electrode 106-mn. The written voltage of the pixel electrode 106-mn is maintained by the storage capacitance as described above even after the voltage of the gate line Gm rises and the TFT is set off. As a result, the positive voltage +V is applied to the pixel electrode 106-mn for the counter electrode 122 starting from t1. Thereby, the white particles charged minus staying on the counter electrode 122 side start to move to the pixel electrode 106-mn side, the black particles charged plus staying on the pixel electrode 106-mn side start to move to the counter electrode 122 side, and the reflectance of the pixel 100-mn start to decrease. However, in the period to t2 of the sub-frame sf2 where the gate line Gm rises next (e.g., 16.6 ms), intended reflectance (B) cannot be acquired. Thus, the positive voltage +V is continuously written to the pixel electrode 106-mn until the prescribed reflectance (B) is acquired in the sub-frames sf2, sf3, - - -, sf(k−1) thereafter. Thereby, migration of each of the particles by applying +V is continued, and the reflectance of the pixel 100-mn is continued to decrease. After the intended reflectance (B) is acquired by writing the voltage in the sub-frame period sf(k−1), 0 V is written to the pixel electrode 106-mn in order to stop the migration of the particles by applying the voltage.

As described above, the method of writing the voltage over a plurality of sub-frames for making the pixels in an intended display state is capable of setting the pixels into a halftone (gray) display state. FIG. 6 is an example where the pixel 100-mn is changed from the white display state (W) to the light gray display state (LG) by writing the voltage in the period from the sub-frame sf1 to the sub-frame sfk. As in the case of FIG. 5, the sub-frame sf1 starts from t0, the positive voltage +V is written to the pixel electrode 106-mn from t1, and the reflectance of the pixel 100-mn starts to decrease according to the migration of the particles. At t2 of the sub-frame sf12, intended reflectance (LG) cannot be acquired. Thus, the positive voltage +V is written to decrease the reflectance of the pixel 100-mn further. At next time t3, the intended reflectance (LG) can be acquired. Therefore, 0 V is written from the data line Dn via TFT to stop the migration of the particles. In the sub-frames sf4, sf5, - - -, sfk thereafter, 0 V is continuously written to the pixel electrode 106-mn so that the particles do not migrate. Therefore, the reflectance (LG) can be maintained. In the manner described above, it is possible to set the pixel 100-mn to the light gray display state (LG) that is the intended display state.

For changing the pixel 100-mn from the black display state (B) to the white display state (W), the positive voltage +V applied in FIG. 5 may be changed to the negative voltage −V. As shown in FIG. 5 and FIG. 6, regarding the voltage of the pixel electrode 106-mn, strictly speaking, there is deterioration in the voltage (feed-through voltage) generated when the TFT is off and there is moderate change in the voltage towards the common electrode voltage due to the leak current in the retaining period. For the feed-through voltage, the voltage of the counter electrode 122 is adjusted. The voltage +V, 0, or −V that is same as the voltage of the output of the data driver is to be applied between the pixel electrode 106-mn and the counter electrode 122. For the leak current, the change in the voltage is suppressed to minimum through making the TFT as a double-gate structure or through providing a sufficiently large storage capacitance.

Further, in FIG. 5 and FIG. 6, the voltage of the data line Dn is shown in such a manner that all the pixels of the n column change to the display state same as that of the pixel 100-mn. However, it is illustrated so for the sake of explanations. Through setting the voltage to an arbitrary voltage (+V/0/−V) in the period corresponding to an arbitrary pixel within each sub-frame, it is possible to change the display state to an arbitrary state.

As described above, the electrophoretic display device according to the first exemplary embodiment is structured to write the voltage of +V, 0, or −V to the pixel electrode over a plurality of sub-frames to make an intended pixel in an intended display state. Therefore, the display controller 80 shown in FIG. 1 includes: a function which repeatedly outputs the prescribed timing signal (control signal 210) to the gate driver 140 and the data driver 150 in each sub-frame period; and a function which generates and outputs the display data 200 so that the voltage required for an intended display gradation is outputted from the data driver 150 according to the sub-frames sf1, sf2, - - -, sfk. Thus, in the display controller 80, the timing controller 83 includes a counter for counting the number of sub-frames, and the data conversion circuit 84 includes voltage data outputted for each display gradation in the order of sub-frames (e.g., includes as a lookup table (LUT)). Each pieces of pixel data is read out from the image data stored in the image memory 81 by each sub-frame, and the voltage (+V/0/−V) to be written to the pixel electrode is selected from the display gradation designated by the pixel data and the count value of the dub-frames by utilizing the voltage data described above. Further, encoding (e.g., 2 bit: +V=01, 0=00, −V=1) suited for the data driver specification is performed according to the selected voltage (+V/0/−V), and the result is outputted to the data driver 150 as the display data 200.

The display controller 80, the image memory 81, the gate driver 140, and the data driver 150 correspond to examples of the "voltage applying unit". Similarly, the TFT glass substrate 102 corresponds to an example of the "first substrate", and the counter substrate 120 corresponds to an example of the "second substrate".

(Explanations of Driving Method)

Hereinafter, the driving method as the feature of the first exemplary embodiment will be described by referring to the accompanying drawings. For explaining the voltage waveforms, it is to be noted in this Specification that: the voltage applied to the pixel is the voltage of the pixel electrode for the counter electrode; a positive applied voltage means that the potential of the pixel electrode is higher than that of the counter electrode; a negative applied voltage means that the potential of the pixel electrode is lower than that of the counter electrode; and an applied voltage of 0 V means that the potentials of the counter electrode and the pixel electrode are equivalent. Further, the voltage waveform to be applied to the pixel is acquired by continuously plotting the voltage (+V/0/−V) to be written to the pixel electrode for each sub-frame as described by using FIG. 5 and FIG. 6, and it is also considered as the voltage data of each display gradation of the display controller described above. Therefore, the minimum unit of the applied time of the voltage waveform applied to the pixel is one sub-frame period. The voltages +V and −V to be applied to the pixels are of different polarities but are set to be the voltages of same value.

The driving method according to the first exemplary embodiment is a method that is characterized to apply a compensation pulse for setting the total DC component of the voltage waveform to be applied to the pixel electrode at the time of updating an image as zero after all the pixels of the display unit are turned to the white or black base state.

(Driving Example 1-1)

The driving method at the time of updating an image will be described by using the voltage waveforms applied to the pixels shown in FIG. 7 and the display images shown in FIG. 8. The image update period is constituted with a reset period (T0 to T3) where a previous image is erased and a set period (T3 to T4) where an image is written. FIG. 7A shows the waveform of the voltage applied to the pixel for displaying white (W) next for updating the image. FIG. 7B shows the waveform of the voltage applied to the pixel for displaying light gray (LG) next for updating the image. FIG. 7C shows the waveform of the voltage applied to the pixel for displaying dark gray (DG) next for updating the image. FIG. 7D shows the waveform of the voltage applied to the pixel for displaying black (B) next for updating the image.

Figure 7:
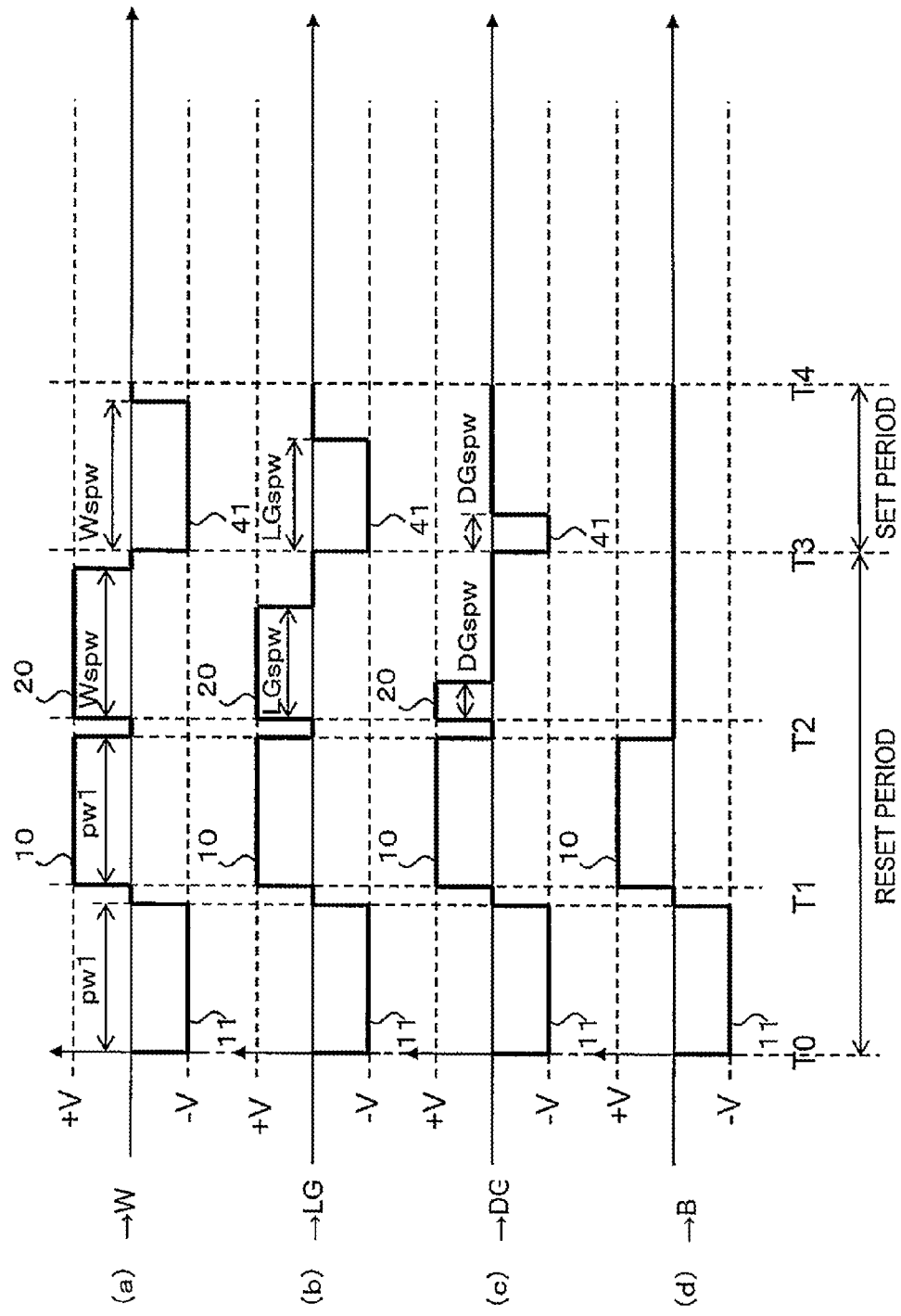
FIG. 7 is a chart showing voltage waveforms at the time of updating an image in Driving Example 1-1.

The Driving Example shown in FIG. 7 and FIG. 8 is the method which sets all the pixels of the display unit to black display (black base state) at the end of the reset period, and changes the intended pixels to the state of high reflectance by applying the voltage of −V in the set period.

In the voltage waveforms shown in FIG. 7, a positive stirring pulse 10 is applied to all the pixels after applying a negative stirring pulse 11 from T0 to T2 of the reset period in order to erase the displayed image and to stir the particles. Note here that the stirring pulse is the voltage waveform which continuously applies a negative voltage (in the case of negative stirring pulse) or a positive voltage (in the case of the positive stirring pulse) in the period of the pulse width pw1 required for stirring the particles.

Figure 9A:
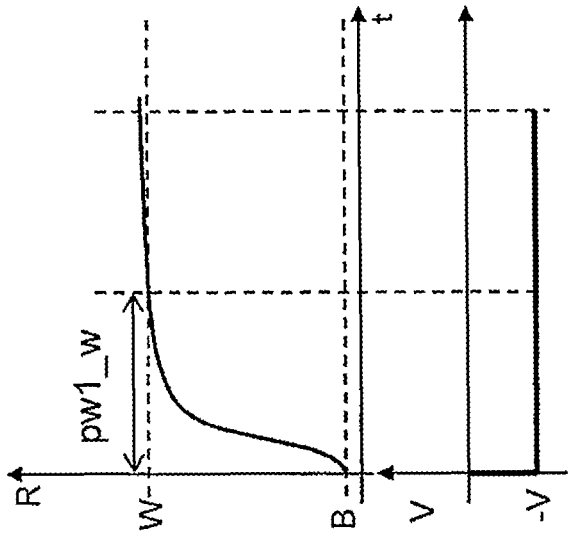
FIGS. 9A and 9B show charts of the pixel reflectance response characteristic.
Figure 9B:
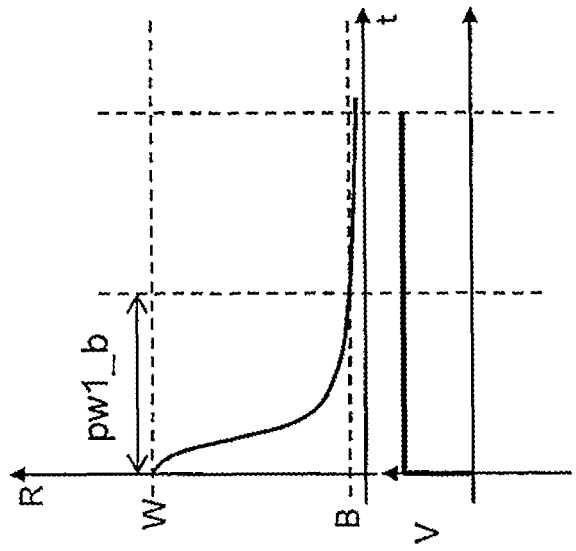

Now, the pulse width pw1 that is in common to the positive and negative stirring pulses will be described by referring to FIGS. 9A and 9B. FIG. 9A shows the reflectance response characteristic when a positive voltage +V (e.g., +15 V) is applied to the pixels in the black state. FIG. 9B shows the reflectance response characteristic when a negative voltage −V (e.g., −15 V) is applied to the pixels in the black state. As shown in FIG. 9A, when the positive voltage +V is supplied to the pixel electrode, the white particles migrate to the pixel electrode side, and the black particles migrate to the counter electrode side. Thus, the reflectance of the pixels is decreased according to the applied time. However, after the applied time of certain length is passed, migration of the particles is resolved and the change in the reflectance per unit time becomes small. As shown in FIG. 9B, when the negative voltage is supplied to the pixel electrode, the black particles migrate to the pixel electrode side, and the white particles migrate to the counter electrode side. Thus, the reflectance of the pixels is increased according to the applied time. However, the change in the reflectance per unit time becomes small as the applied time is passed. When the change in the reflectance becomes small as described above, it is not possible to identify that state as a displayed color with the eyes of the human beings even if the voltage is applied continuously. The state where identification is not possible is referred to as a white or black base state in this Specification.

The pulse width pw1 of the stirring pulse is determined by the time used to change the state from the black or white display state to the white or black base state. Strictly speaking, the reflectance response characteristic lacks the symmetry between the positive voltage and the negative voltage, and the time for reaching the base state varies for the case of changing from white to black (pw1_b) and the case of changing from black to white (pw1_w). Thus, in the case of the Driving Example whose voltage waveforms are shown in FIG. 7, it is preferable to apply the time (pw1_b) required for changing to the black display state (black base state) from the white display state by applying the voltage of +V as pw1 in regards to the relation with the compensation pulse to be described later.

As described above, all the pixels of the display unit are turned to white display at T1 and then turned to black display at T2 as shown in FIG. 8 by the negative stiffing pulse 11 and the positive stirring pulse 10 of the pulse width pw1 applied in T0 to T2 of the reset period. In this Specification, the displayed image is expressed with the display unit of 8×8 pixels as shown in FIG. 8. However, it is so expressed only for the sake of explanations, and the number of pixels on the display unit is not limited only to that.

Next, as shown in FIG. 7, a positive compensation pulse 20 that is of the same polarity as that of the stirring pulse immediately before is applied in the reset period T2 to T3. Note here that the compensation pulse is the voltage waveform which continuously applies a negative voltage (in the case of the negative compensation pulse) or a positive voltage (in the case of the positive compensation pulse) for suppressing accumulation of the DC components by applying the voltage in the image update period. In the Driving Example, the compensation pulse is applied for setting the total DC components of each of the voltage waveforms shown in FIG. 7A to FIG. 7D as zero. In the Driving Example shown in FIG. 7, the total DC component between T0 and T2 is 0, and a negative set pulse 41 of the pulse width spw is applied in the set period according to the display gradation. Thus, when the positive compensation pulse of the pulse width spw is applied, the total DC component of the voltage waveform becomes zero.

Specifically, the set pulse width is Wspw in the voltage waveform of FIG. 7A applied to the pixel displaying white (W), so that the positive compensation pulse 20 of the pulse width Wspw is applied. The set pulse width is LGspw in the voltage waveform of FIG. 7B applied to the pixel displaying light gray (LG), so that the positive compensation pulse 20 of the pulse width LGspw is applied. The set pulse width is DGspw in the voltage waveform of FIG. 7C applied to the pixel displaying dark gray (DG), so that the positive compensation pulse 20 of the pulse width DGspw is applied. The set pulse width is 0 in the voltage waveform of FIG. 7D applied to the pixel displaying (B) black, so that the positive compensation pulse 20 of the pulse width also becomes 0. That is, the compensation pulse is not applied.

As can be seen from those, the stirring pulse can continuously apply the voltage of specific polarity in the period of pw1. In the meantime, the period for applying the compensation pulse of the first exemplary embodiment changes according to the display gradation. Thus, considering the period of pw1, there are a case where the voltage of specific polarity is continuously applied, a case where the voltage of specific polarity is applied in a short period and 0 V is applied in other periods, and a case where 0 V is continuously applied.

As described above, in the reset period T2 to T3, the positive compensation pulse 20 of the pulse width corresponding to the display gradation is applied. However, at the point of T2, all the pixels are in the black display state (black base state) by the positive stirring pulse 10 immediately before.

Thus, the change in the display state by the positive compensation pulse 20 is not visually recognized. That is, as shown in FIG. 8, all the pixels in the display unit from T2 to T3 are in the black display state as in the state of T2.

At last, in the set period (T3 to T4), the negative set pulse 41 of the pulse width corresponding to the display gradation is applied. In this period, the prescribed pixels are in the intended gradation display state. Thereby, the image update is completed as shown in T4 of FIG. 8.

As described above, through updating the image by the voltage waveforms shown in FIG. 7, it is possible to prevent the inverted image of the updated image from being displayed as in FIG. 8. This is because the inverted image by the compensation pulse is not visually recognized by applying the compensation pulse of the same polarity as that of the stirring pulse as already has been described above. According to this concept, while the positive compensation pulse 20 of the pulse width DGspw is applied at the timing of T2 in FIG. 7C, for example, it is not essential to apply the pulse at T2. The compensation pulse can be applied at an arbitrary timing between T2 and T3 that is in an allowable range of the pulse width DGspw.

Further, while not specifically explained, to apply the stirring pulse at the same timing in each of the display gradations, i.e., the timing for changing the display state of all the pixels, is also the factor for not making the inverted display visually recognized. However, the timing for applying the stirring pulse does not strictly need to be the same timing, i.e., does not necessarily need to start from the same sub-frame. While it depends on the design of sub-frame periods, the difference on the order of several sub-frames (difference of about up to 30 ms) is tolerated based on the visual sense characteristic of human beings.

However, for achieving the low power consumption, it is required that the positive stirring pulse 10 and the negative stirring pulse 11 do not overlap between the display gradations even in a case where the timing for applying the stirring pulse is adjusted in an allowable range. It is because when the positive/negative applied pulses overlap between the display gradations within a same sub-frame, it becomes necessary to change the voltage of the data line drastically depending on the pattern of the display image and a high current driving capacity is required for the data driver.

Figure 10:
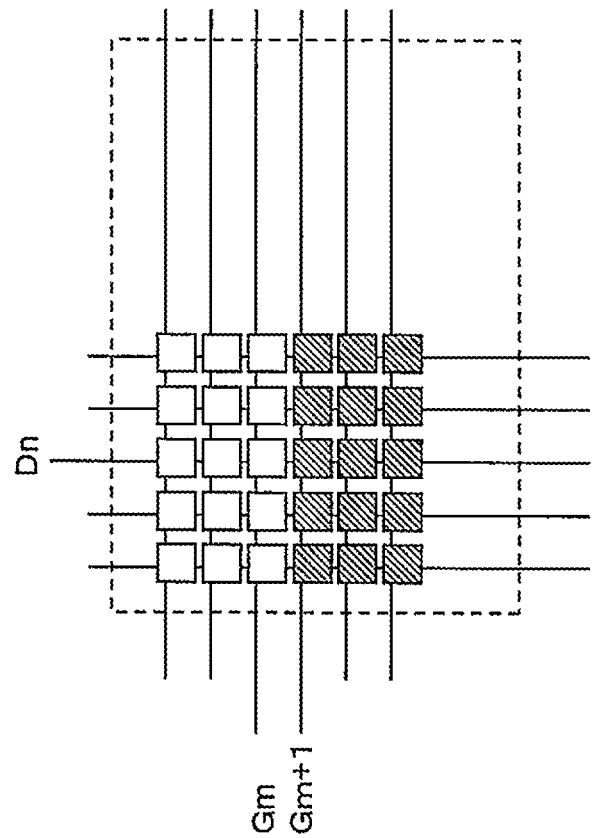
FIG. 10 is a chart showing an example of a displayed image.
Figure 11:
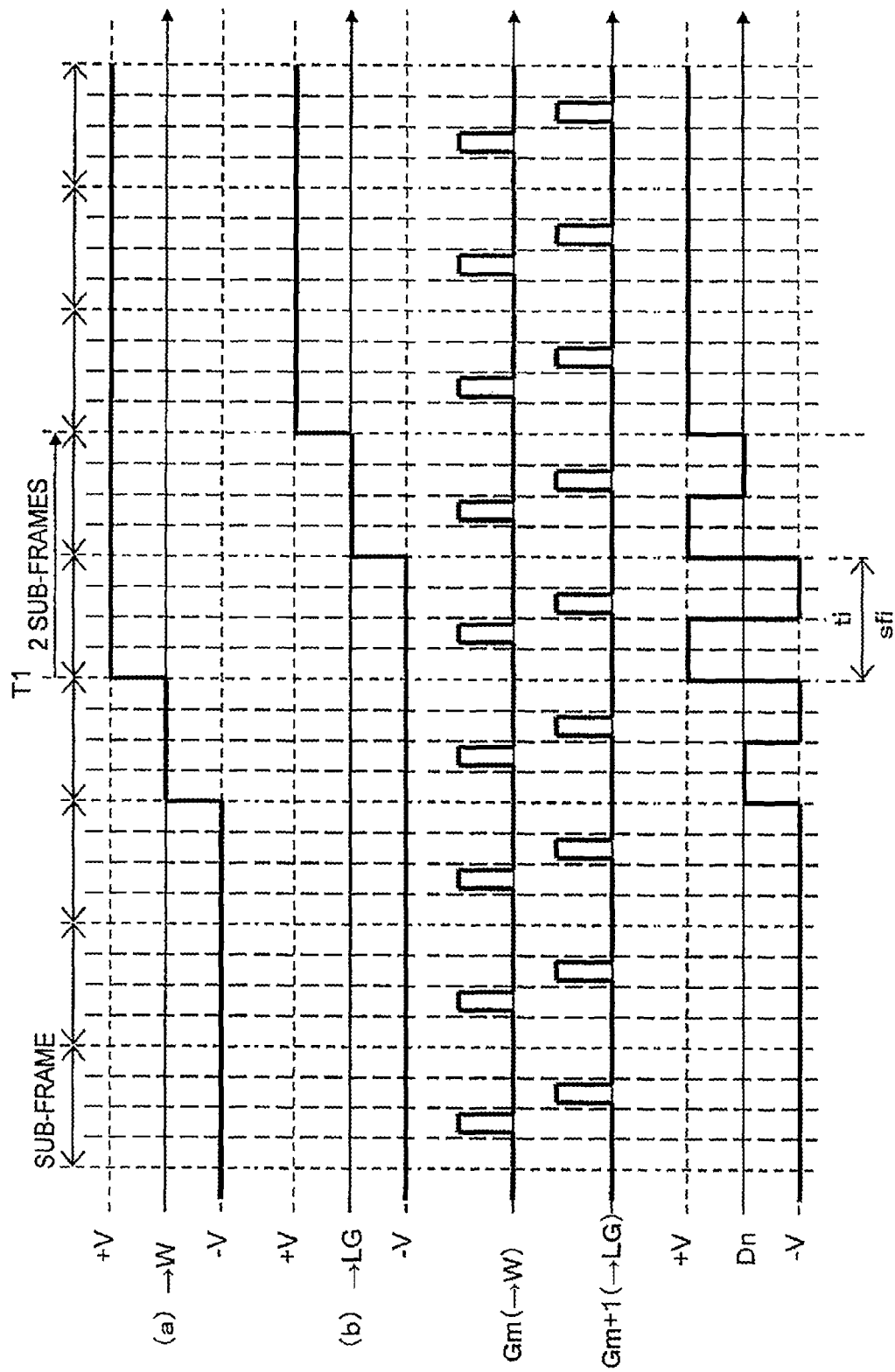
FIG. 11 is a timing chart showing a case where the voltage waveform of LG is delayed by two sub-frames than that of W in the displayed image of FIG. 10 in the case of Driving Example 1-1.

A specific example will be described by using the updated display pattern shown in FIG. 10 and the timing chart shown in FIG. 11. FIG. 10 shows the relation regarding the display gradations of the pixel and the data line as well as the gate line. In the display pattern, white is displayed up to the gate line Gm row, and light gray is displayed from the gate line Gm+1. FIG. 11 is a timing chart showing the voltages of the gate lines Gm, Gm+1, and the data line Dn when the voltage waveform (FIG. 7B) displaying LG (light gray) is delayed by two sub-frames with respect to the voltage waveform (FIG. 7A) displaying white (W). As shown in FIG. 11, in the voltage waveform of W, the positive stirring pulse 10 is applied after T1, so that the voltage becomes +V. However, in the voltage waveform of LG, the negative stirring pulse is being applied, so that the voltage is −V. Therefore, the voltage of the data line Dn on the pixel row of W shown in FIG. 10 is +V, and it changes to −V on the pixel row of LG during the sub-frame sfi. This change in the voltage needs to be completed between the writing period for the pixels of W and the writing period for the pixels of LG, i.e., needs to be completed in the enable period of the gate lines Gm and Gm+1. Thus, a large current for changing the data line from +V to −V in the vicinity of the timing of ti is required. The change from −V to +V of the data line Dn occurs at the start and the end of the sub-frame sfi.

Figure 12:
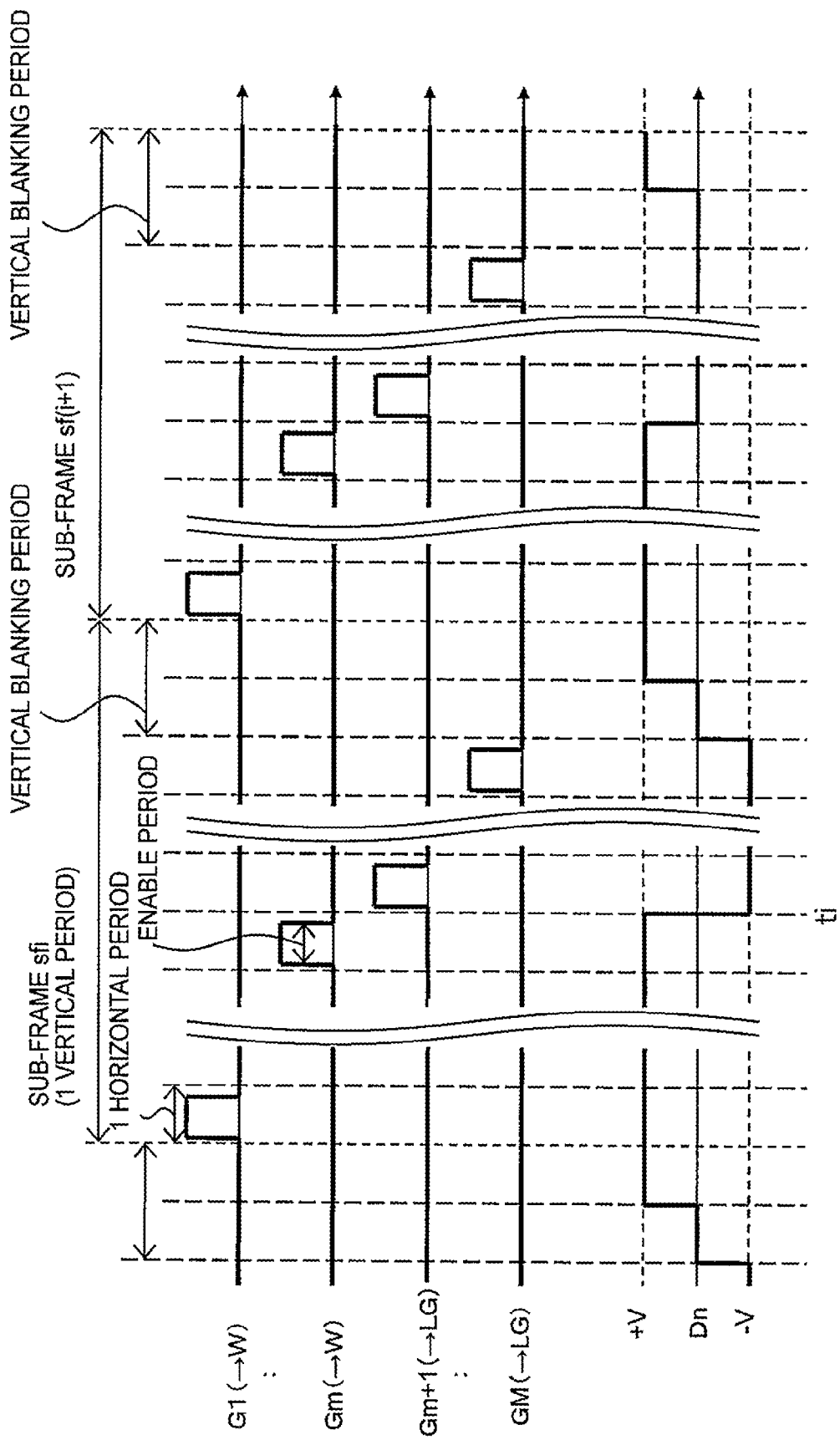
FIG. 12 is a timing chart in which sfi period of FIG. 11 is time-expanded.

However, as shown in FIG. 12, those can be divided to the voltage changes from −V to 0 V and from 0 V to +V by utilizing the vertical blanking period.

As described above, when there is no overlapping in the positive/negative applied pulses between the display gradations, the change generated in the voltage of the data line is suppressed only to the extent of the change from +V to 0 or from −V to 0V. Thus, the required current is only a half of the current required for the change between +V and −V described above. That is, it is necessary to execute the designing in such a manner that the gradation where the applied voltage is +V and the gradation where the applied voltage is −V do not exist within a same sub-frame.

As described above, with the drive by using the voltage waveforms shown in FIG. 7, the display state is changed as in FIG. 8 at the time of updating the image, the inverted image of the updated image is not displayed, and the total DC component of the voltage waveforms becomes zero. Since the inverted image is not displayed, there is no load imposed upon the user. Further, the total DC component of the voltage waveforms applied at the time of updating the image is zero, so that it is possible to achieve an electrophoretic display device of a high image quality with which no afterimage and ghosting is generated.

Further, in Driving Example 1-1, between the voltage waveforms (specific example: FIG. 7) given to all the display gradations at the time of updating the image, the timing for supplying +V and the timing for supplying −V do not overlap with each other. Thus, the voltage of the data line does not change largely (e.g., from +V to −V) in a short time, and the driving capacity of the data driver can be suppressed. Therefore, the power consumption and the cost can be lowered.

(Driving Example 1-2)

In the Driving Example 1-1, each of the voltage pulses applied to the pixel is the pulse that comes to the state of 0 V after applying the voltage as shown in FIG. 7. However, with the driving method of the first exemplary embodiment, it is not essential for each of the voltage pulses to be in the state of 0 V after applying the voltage. Therefore, it is also possible to drive with the voltage waveforms shown in FIG. 13, for example.

Figure 13:
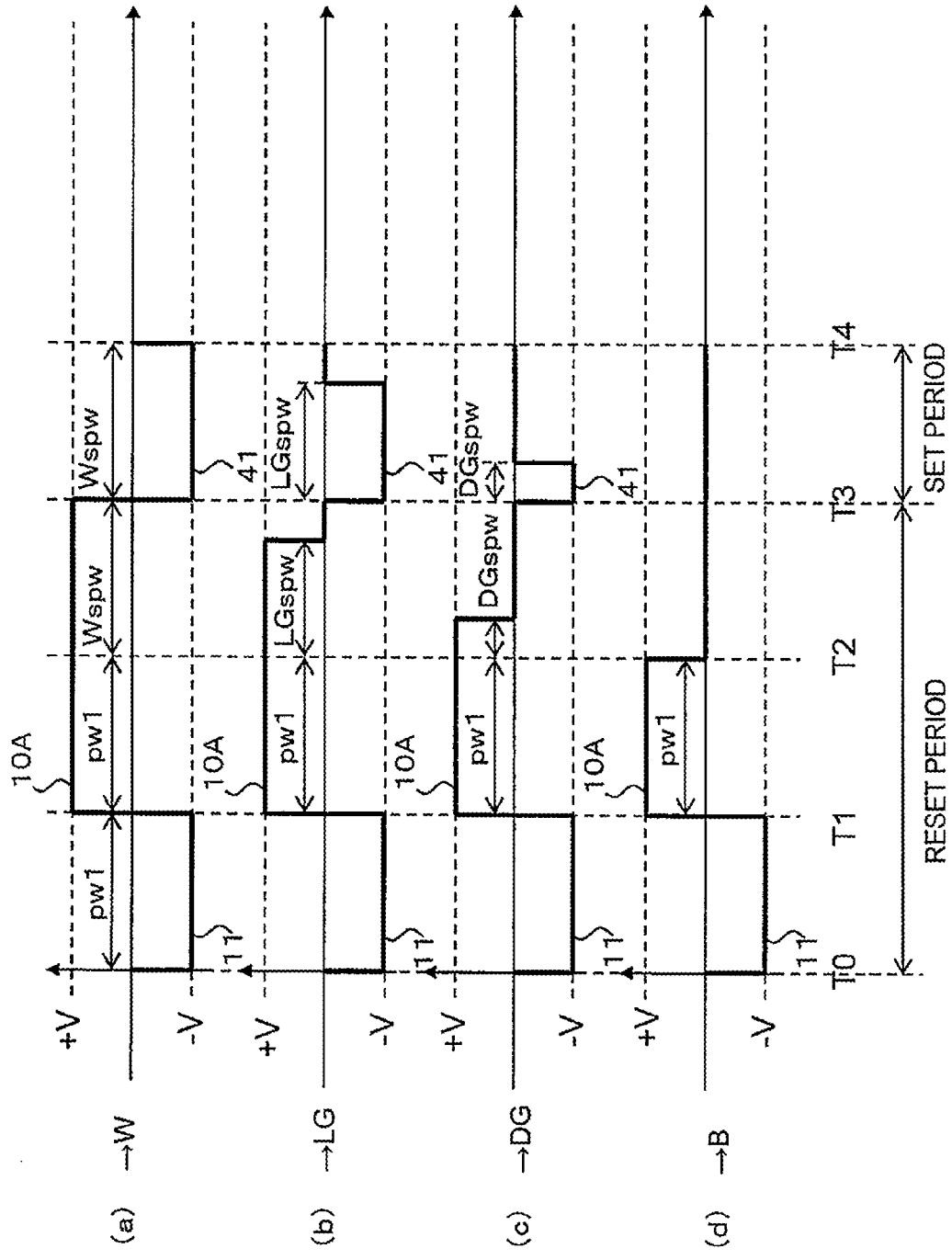
FIG. 13 is a chart showing voltage waveforms at the time of updating an image in Driving Example 1-2.

The voltage waveforms shown in FIG. 13 are voltage waveforms in which the state of 0 V between each of the voltage pulses shown in FIG. 7 (Driving Example 1-1) is omitted. Thus, as in the case of FIG. 7, the negative stirring pulse 11 of the pulse width pw1 is applied to all the pixels in T0 to T1 of the reset period. Subsequently, a positive stirring pulse 10A is applied from T1. However, the stirring pulse of this Driving Example is a pulse including the function of the compensation pulse, and the pulse width thereof is different from that of Driving Example 1-1 (FIG. 7). The pulse width of the positive stirring pulse 10A of this Driving Example is the width acquired by adding the pulse width spw of the set pulse applied according to the display gradation in the set period to the pulse width pw1 of the negative stirring pulse. It is determined as follows:

Pulse width of stirring pulse 10A=pw1+spw

That is, with the voltage waveform applied to the pixel displaying W (white), the pulse width of the stirring pulse 10A is "pw1+Wspw" as shown in FIG. 13-(a). With the voltage waveform applied to the pixel displaying LG (light gray), the pulse width of the stirring pulse 10A is "pw1+LGspw" as shown in FIG. 13-(b). With the voltage waveform applied to the pixel displaying DG (dark gray), the pulse width of the stirring pulse 10A is "pw1+DGspw" as shown in FIG. 13-(c). With the voltage waveform applied to the pixel displaying B (black), the pulse width of the stirring pulse 10A is "pw1+0 (Bspw=0)" as shown in FIG. 13-(*d*).

As the change in the display state of the pixels by applying the stirring pulse 10A, first, all the pixels are turned into the black display state (black base state) in the period (pw1) of T1 to T2. Thus, the change in the display state by applying the voltage in the following period T2 and thereafter is not visually recognized, and the state where all the pixels are in the black display state continues until T3.

In the set period from T3 to T4, the negative set pulse 41 of the pulse width corresponding to the display gradation is applied as in the case of Driving Example 1-1 (FIG. 7) to change the intended pixels to the intended gradation display state.

As described above, in the voltage waveform of this Driving Example where 0 V after applying each of the voltage pulses is omitted from the case of the Driving Example 1-1 (FIG. 7), the displayed images at each passage of timing (T0, T1, - - -, T4) are the displayed images shown in FIG. 8 that are same as those of Driving Example 1-1. Therefore, it is possible to perform the drive with which the total DC component of the voltage waveform is 0 and the inverted image is not displayed.

Figure 14:
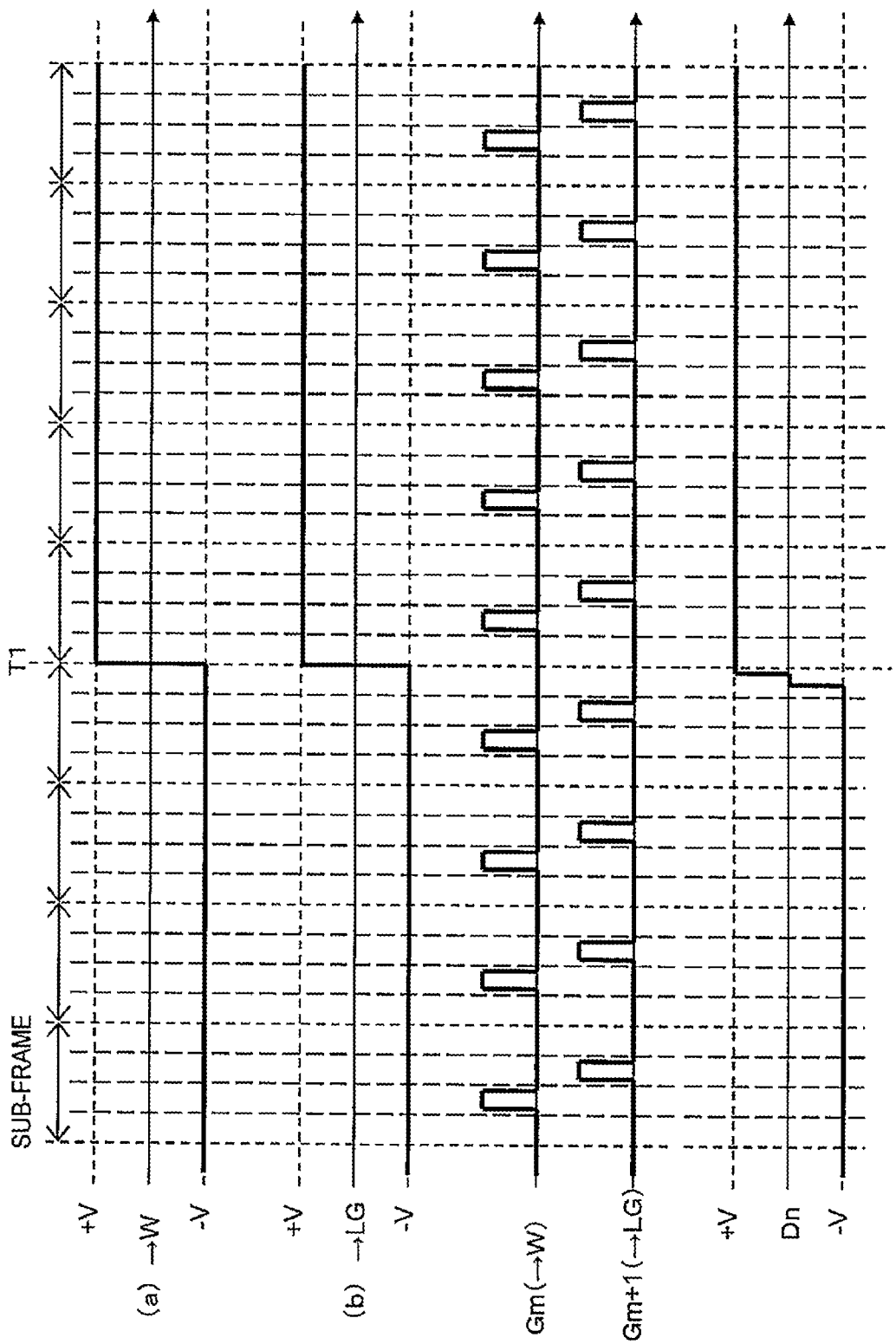
FIG. 14 is a timing chart showing changes in the voltage on a data line in the vicinity of T1 of FIG. 13.

In the voltage waveform (FIG. 13) applied to the pixels according to this Driving Example, at T1, for example, a direct change in the voltage from −V to +V is shown. However, as described in Driving Example 1-1 by using FIG. 12, it is possible to divide the change in the voltage of the data line to the voltage changes from −V to 0 V and from 0 V to +V within the vertical blanking period (e.g., FIG. 14). Therefore, it is possible to achieve the low power consumption. As described above, with Driving Example 1-2, the same effect as that of Driving Example 1-1 can be acquired. In addition, there is also an effect of completing the update of the image more quickly than the case of Driving Example 1-1, since the period for applying 0 V is omitted.

(Driving Example 1-3)

Figure 15:
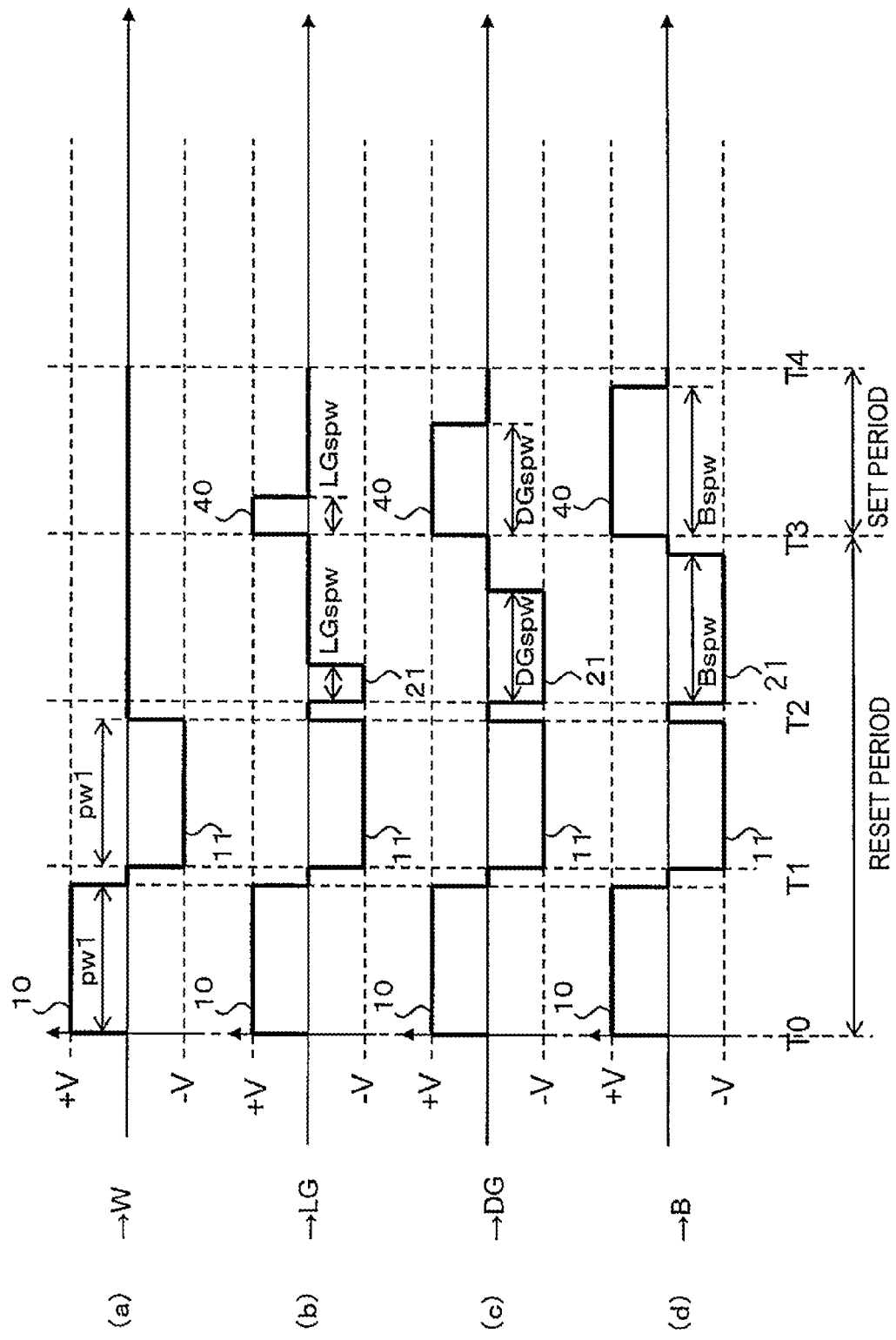
FIG. 15 is a chart showing voltage waveforms at the time of updating an image in Driving Example 1-3.
Figure 16:
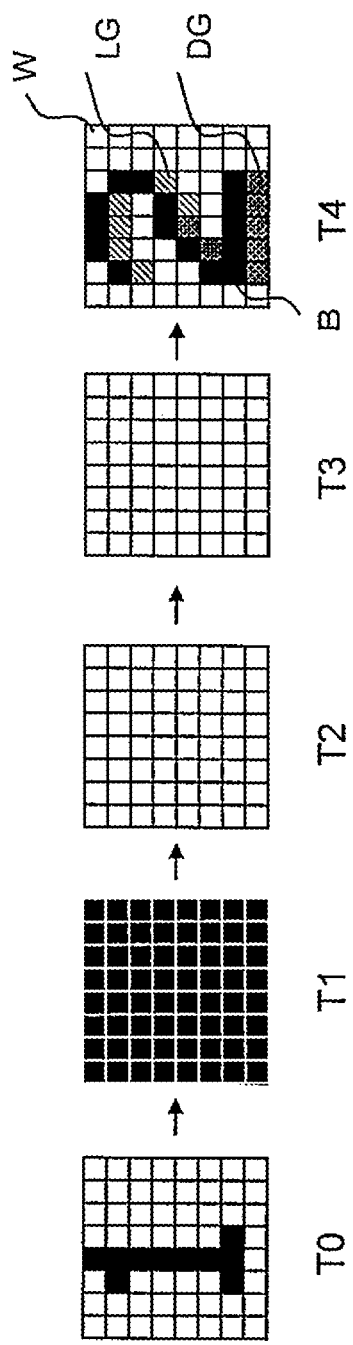
FIG. 16 is an illustration showing displayed images at the time of updating the image in Driving Example 1-3.

As shown in FIG. 15 and FIG. 16, this Driving Example is the driving method which sets all the pixels of the display unit to white display (white base state) at the end of the reset period, and changes the intended pixels to the state where the reflectance becomes low by applying the voltage of +V in the set period.

In the voltage waveforms shown in FIG. 15, the negative stirring pulse 11 is applied to all the pixels after applying the positive stirring pulse 10 from T0 to T2 of the reset period in order to erase the displayed image and to stir the particles. The pulse width of the positive and negative stirring pulse is defined as pw1 in common as in the case of Driving Example 1-1. However, in the case of this Driving Example whose voltage waveforms are shown in FIG. 15, a negative compensation pulse 21 is applied. This, it is desirable to employ the time (FIGS. 9A and 9B: pw1_w) required for changing the black display state to the white display state (white base state) by applying the voltage of −V as pw1.

In the reset period T2 to T3, the negative compensation pulse 21 that is of the same polarity as that of the stirring pulse immediately before is applied. As in the case of Driving Example 1-1, the compensation pulse is applied to make the total DC component of each of the voltage waveforms shown in FIG. 15-(*a*) to FIG. 15-(*b*) as zero.

Specifically, in the voltage waveform of FIG. 15-(*a*) applied to the pixels displaying W (white), the set pulse width is 0. Thus, the pulse width of the negative compensation pulse 21 is also 0. That is, the compensation pulse is not applied. In the voltage waveform of FIG. 15-(*b*) applied to the pixels displaying LG (light gray), the set pulse width is LGspw.

Thus, the negative compensation pulse 21 of the pulse width LGspw is applied. In the voltage waveform of FIG. 15-(*c*) applied to the pixels displaying DG (dark gray), the set pulse width is DGspw. Thus, the negative compensation pulse 21 of the pulse width DGspw is applied. In the voltage waveform of FIG. 15-(*d*) applied to the pixels displaying B (black), the set pulse width is Bspw. Thus, the negative compensation pulse 21 of the pulse width Bspw is applied.

As described above, in the reset period T2 to T3, the negative compensation pulse 21 of the pulse width corresponding to the display gradation is applied. However, all the pixels are in the white display state (white base state) by the negative stirring pulse 11 immediately before. Thus, the change in the display state is not visually recognized. As shown in FIG. 16, all the pixels at T3 are in the white display state as in the state of T2.

At last, in the set period (T3 to T4), the positive set pulse 40 of the pulse width corresponding to the display gradation is applied. In this period, the intended pixels are in the intended gradation display state. Thereby, the image update is completed as shown in T4 of FIG. 16.

As described above, through updating the image by the voltage waveforms shown in FIG. 15, it is possible to prevent display of the inverted image of the updated image as in FIG. 16 according to the same principle as that of Driving Example 1-1. In the voltage waveforms shown in FIG. 15, the timing for applying the stirring pulse and the timing for applying the compensation pulse are tolerated within the range described in Driving Example 1-1 as in the case of Driving Example 1-1.

Further, through executing the designing in such a manner that the gradation where the applied voltage is +V and the gradation where the applied voltage is −V do not exist within a same sub-frame as described in Driving Example 1-1, it is possible to achieve the low power consumption.

With Driving Example 1-3, the same effect as that of Driving Example 1-1 can be achieved. Further, regarding the colors in the vicinity of the boundary between the pixels, there is a case where the color of the particles moved towards the display surface side last influences more strongly. Thus, when black characters are displayed on a white background as in the case of the typical books, an effect of preventing tapering in the font can be achieved efficiently compared to the case of Driving Example 1-1.

With Driving Example 1-3, it is also possible to employ the voltage waveform where the state of 0 V between each of the voltage pulses is omitted as in the case of Driving Example 1-2 with respect to the case of Driving Example 1-1. When it is employed to this Driving Example, the negative stirring pulse 11 shown in FIG. 15 becomes the pulse including the function of the compensation pulse 21, and it is a stirring pulse 11A (not shown) to which the compensation pulse width is added. As described, through omitting the state of 0 V, it is possible to shorten the time for updating the image as in the case of Driving Example 1-2.

(Driving Example 1-4)

Figure 17:
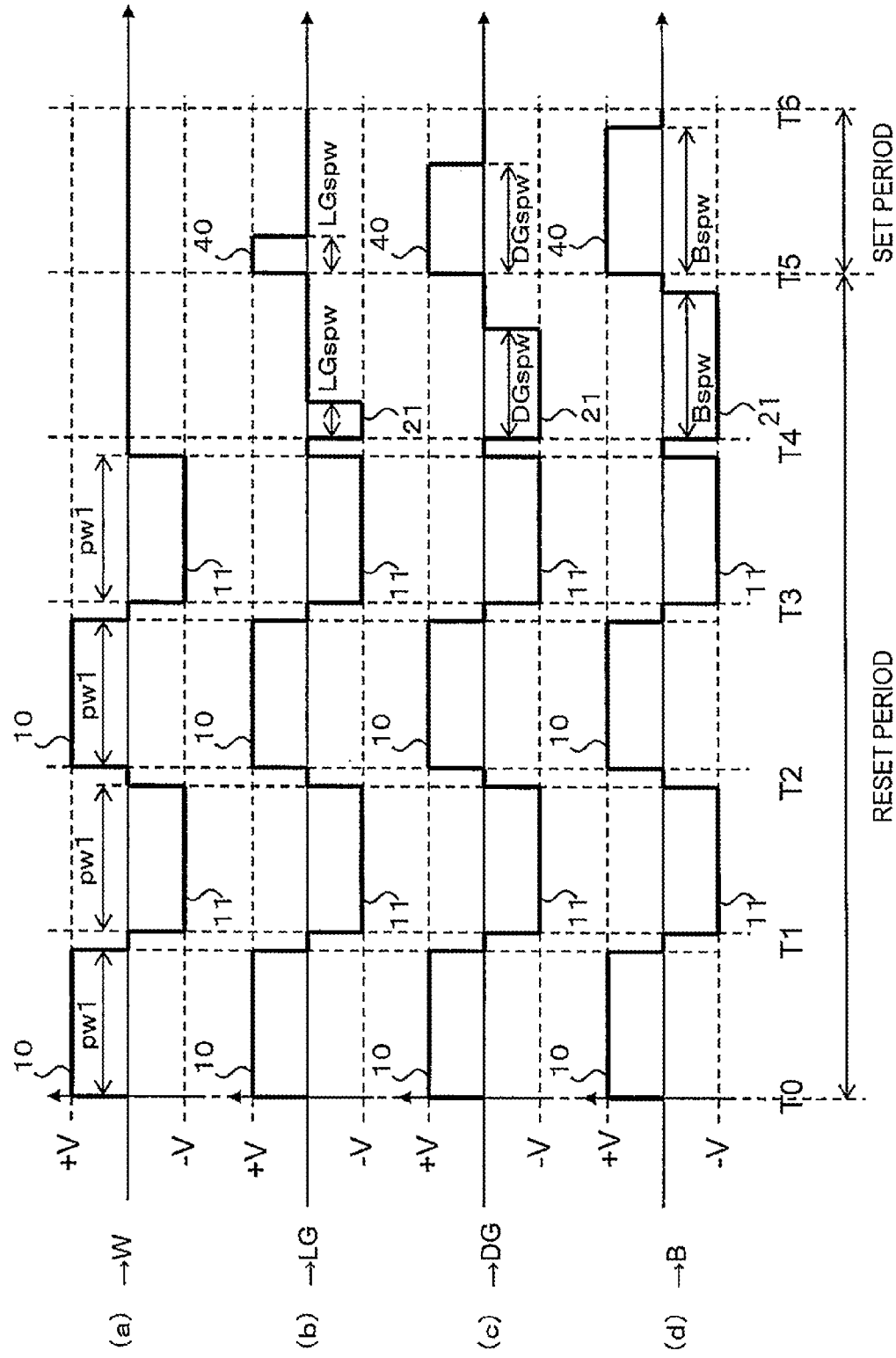
FIG. 17 is a chart showing voltage waveforms at the time of updating an image in Driving Example 1-4.
Figure 18:
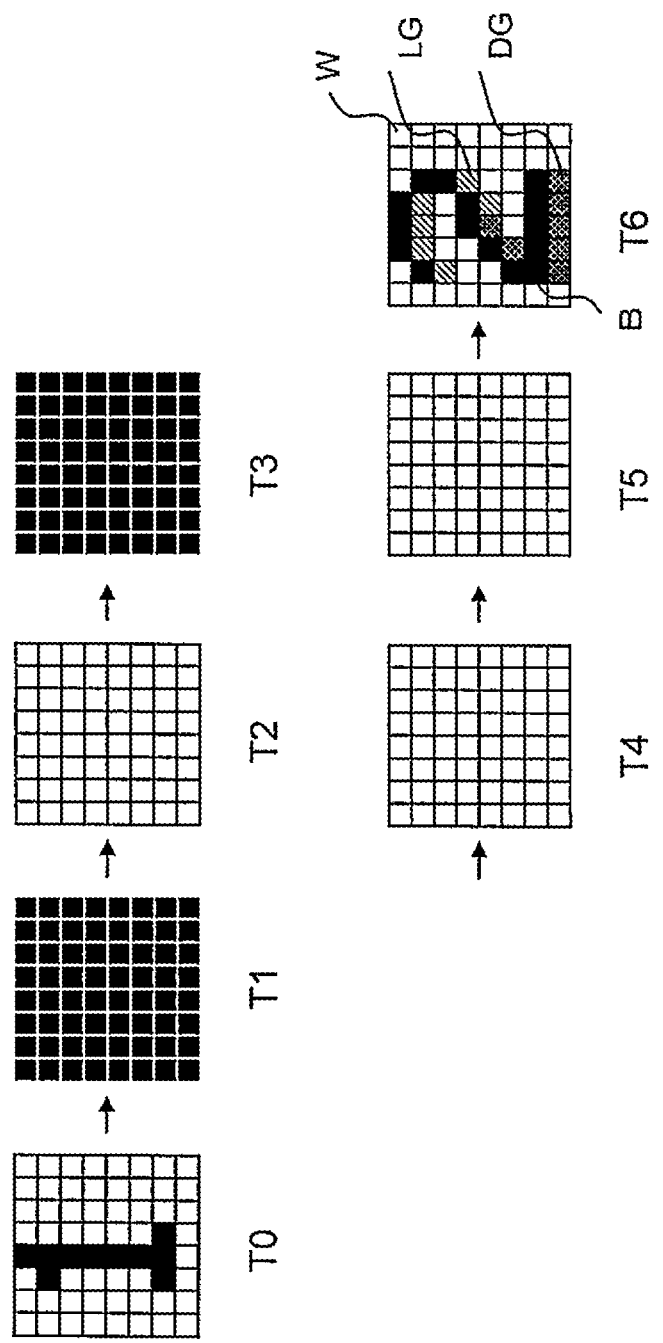
FIG. 18 is an illustration showing displayed images at the time of updating an image in Driving Example 1-4.
Figure 19:
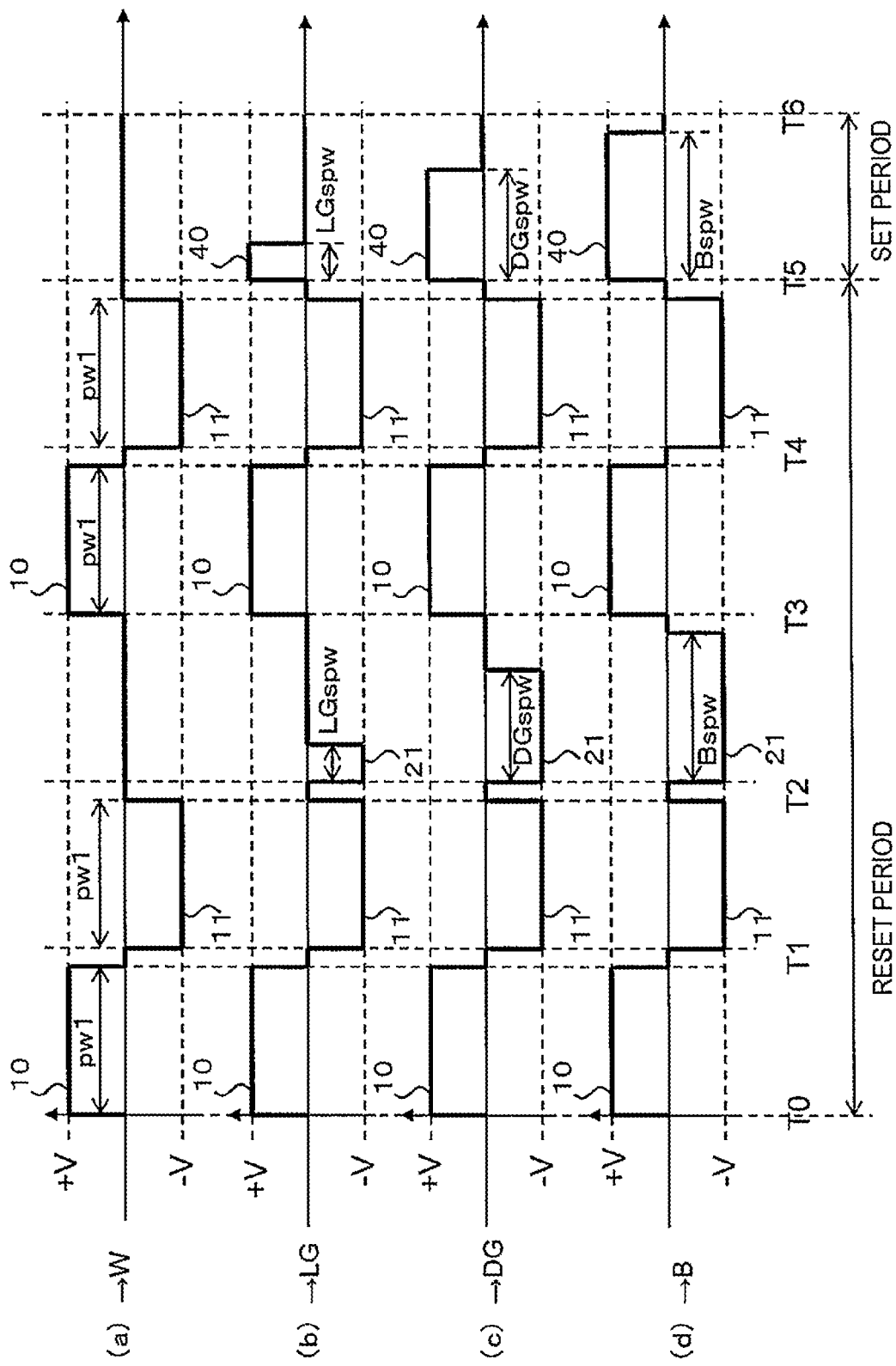
FIG. 19 is a chart showing voltage waveforms at the time of updating an image in Driving Example 1-4.
Figure 20:
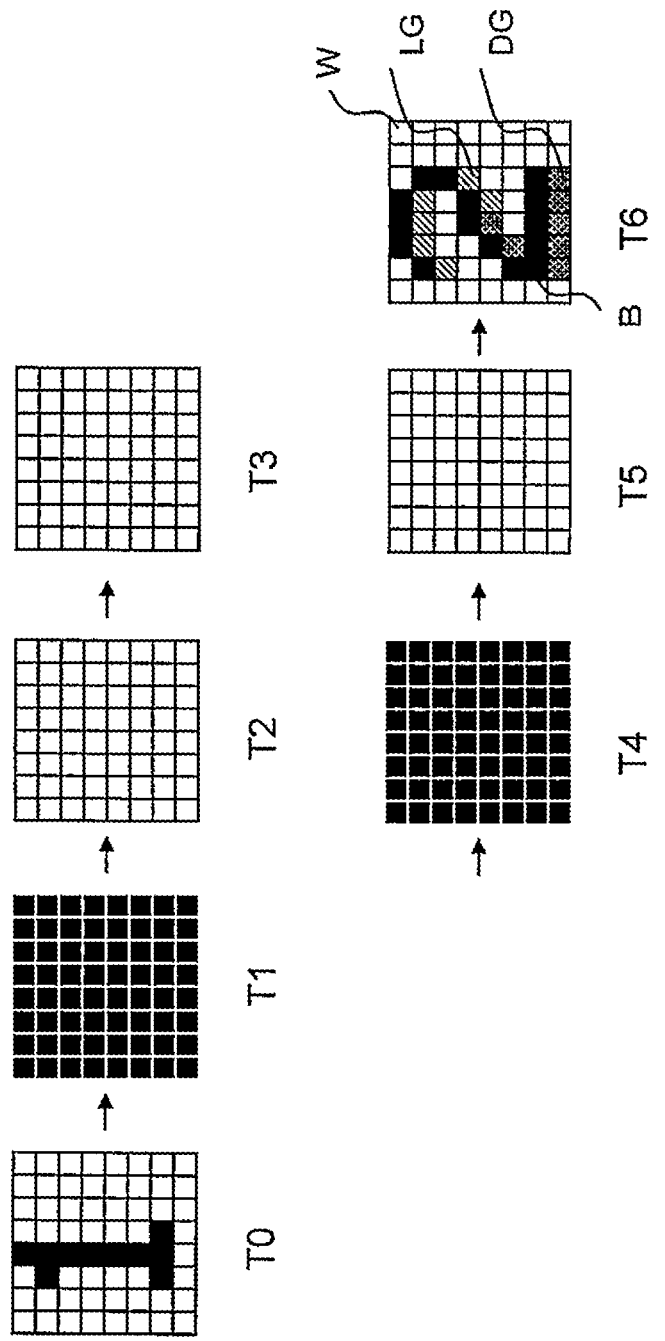
FIG. 20 is an illustration showing displayed images at the time of updating an image in Driving Example 1-4.

The Driving Example 1-4 is an example where a pair of positive and negative stirring pulses is added to the case of Driving Example 1-3 in the reset period. Since the pair of positive and negative stirring pulses having the equal pulse width (pw1) is added, the total DC component of the stirring pulses in the reset period is 0 as in the case of Driving Example 1-3. Therefore, regarding the compensation pulse, the negative stirring pulse 21 is added following the negative stirring pulse 11 according to the width of the positive set pulse 40 added in the set period as in the case of Driving Example 1-3. FIG. 17 and FIG. 19 show the voltage waveforms according to Driving Example 1-4. FIG. 17 shows voltage waveforms where the compensation pulse is applied after applying the pair of positive and negative stirring pulses continuously. The display state changes as in FIG. 18 when updating the image. FIG. 19 shows voltage waveforms where the pair of positive and negative stirring pulses is applied, the compensation pulse is applied thereafter, and the pair of positive and negative stirring pulses are applied again. The display state changes as in FIG. 20.

In both of the voltage waveforms shown in FIG. 17 and FIG. 19, the negative compensation pulse 21 of the pulse width corresponding to the display gradation is applied after all the pixels are in the white display state (white base state) by the negative stirring pulse 11. Thus, the change in the display state is not visually recognized. That is, the update of the image can be completed without having the inverted image visually recognized.

Further, as described in Driving Example 1-1, it is possible to achieve the low power consumption through executing the designing in such a manner that the gradation where the applied voltage is +V and the gradation where the applied voltage is −V do not exist within a same sub-frame.

With Driving Example 1-4, the same effect as that of Driving Example 1-3 can be achieved. Further, the number of the stirring pulses is increased, so that there is an effect of providing a capability of erasing the so-called history where the influence of the previous image affects upon the updated image. Therefore, it is possible to acquire a still higher image quality.

Note that it is possible to shorten the time for updating the image through setting the voltage waveforms of Driving Example 1-4 as the voltage waveforms in which the state of 0 V between each of the voltage pulses is omitted as in the case of Driving Example 1-2 with respect to the Driving Example 1-1. Further, as in the case of this Driving Example where the pair of positive and negative stirring pulses is added to the case of Driving Example 1-3, it is also possible to add the pair of positive and negative stirring pulses to the case of Driving Example 1-1. Furthermore, in Driving Example 1-4, employed is the voltage waveforms having two pairs of the positive and negative stirring pulses in the reset period. However, based on the concept of this Driving Example, it is also possible to add a still greater number of pairs of the positive and negative stirring pulses.

While the structures and the driving method of the first exemplary embodiment have been described above, the structures and the driving method are not limited to those. Changes in the design are tolerated within the range not departing from the concept of the first exemplary embodiment. For example, regarding the electrophoretic layer, described is the structure in which microcapsules having solvent containing charged particles are filled in a polymer binder has been described. However, it is also possible to employ a structure that does not use the microcapsules such as a structure using ribs.

Further, while the first exemplary embodiment has been described as the electrophoretic display device displaying four gradations by defining the display gradations as W (white), LG (light gray), DG (dark gray), and B (black), the display gradations are not limited to the four gradations. Through designing the voltage waveforms to be applied to the pixels according to the concept of the first exemplary embodiment and based on the gradation display module described above, it is possible to employ the number of gradations other than the four gradations. Further, the concept of the gradation display of the first exemplary embodiment can be employed for the electrophoretic particles colored in other colors than white and black, and can be replaced with the colors according to arbitrarily colored particles.

Figure 21:
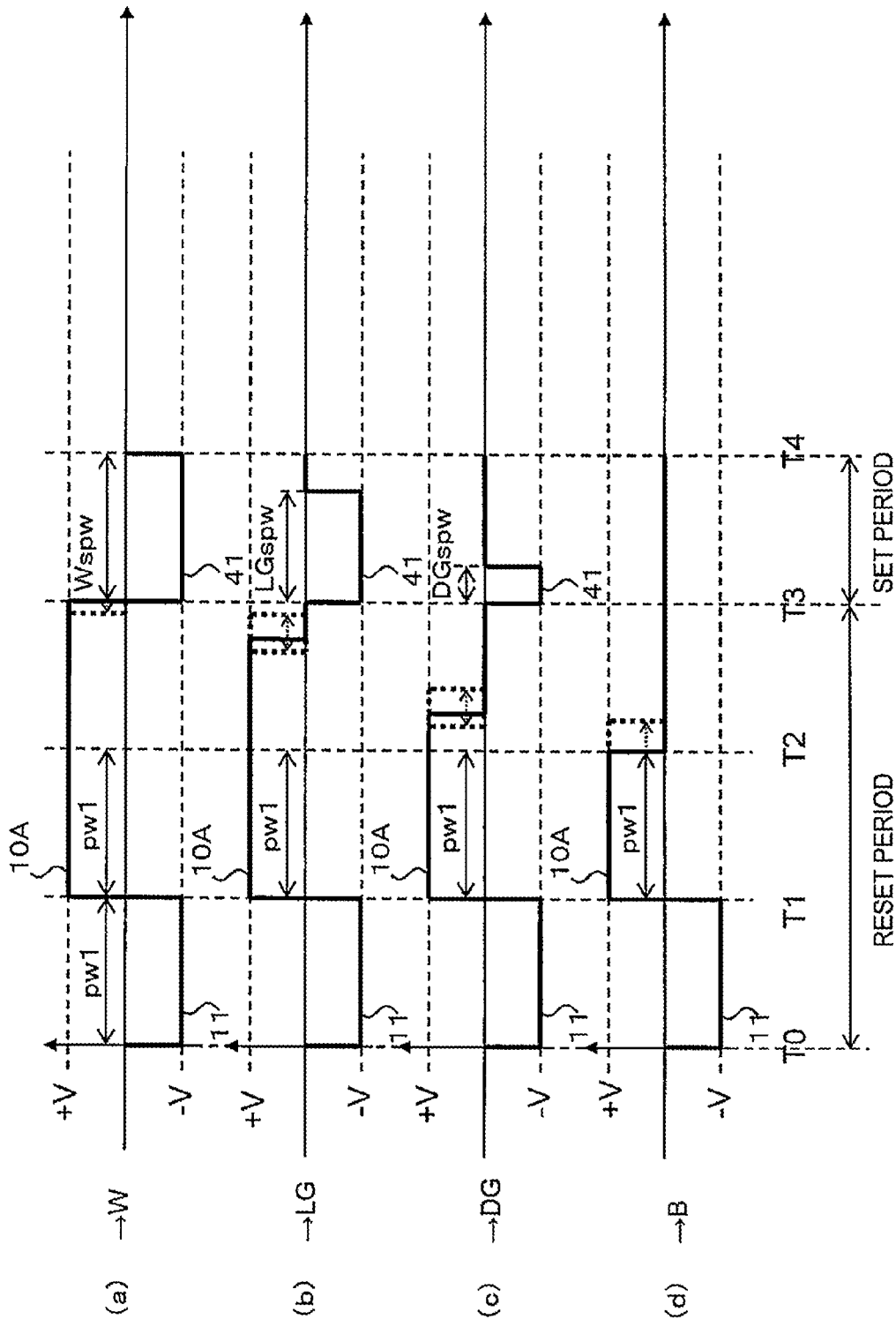
FIG. 21 is a chart showing examples of voltage waveforms in which the width of a compensation pulse and the width of a set pulse are different.

The amount of the residual DC (residual electric charges) for deteriorating the display quality such as afterimages and ghosting and the amount of the influence to the display quality depend on the characteristics of the electrophoretic layer, such as the electric characteristic of the polymer binder, and the characteristics of the solvent as well as the charged particles. Thus, depending on the characteristic (or the structure) of the electrophoretic layer, it is possible to achieve the effect for suppressing the accumulation of the DC components without strictly aligning the width of the compensation pulse to be applied with the width of the set pulse. Therefore, when this concept is applied to the voltage waveforms of Driving Example 1-2 (FIG. 13), the pulse width of the stirring pulse 10A can be extended/shortened as shown with a broken line in FIG. 21 (within a range of pw1 to 2×pw1). Thus, with the voltage waveforms shown in FIG. 21, the display state is in a black base state in T2. Thus, the inverted image is not displayed, and the accumulation of the DC component is suppressed. Thereby, it is possible to achieve the electrophoretic display device of a high image quality with which afterimages and ghosting are not generated.

As an exemplary advantage according to the invention, the inverted image is not displayed. Thus, the user does not feel a load and a sense of discomfort. The total DC component of the waveforms of the voltages applied at the time of updating the image is zero, so that it is possible to achieve a high image quality electrophoretic display device with which afterimages and ghosting are not generated.

(Second Exemplary Embodiment)
(Explanations of Structure)

The structure of a second exemplary embodiment is the same as that of the first exemplary embodiment, so that explanations thereof are omitted.

(Explanations of Driving Method)

The driving method according to the second exemplary embodiment will be described by referring to the accompanying drawings. While there are a pair of positive and negative stirring pulses within a reset period with the method of the first exemplary embodiment, i.e., there are even-number of stirring pulses, the driving method according to the second exemplary embodiment is the driving method where there are odd-number of stirring pulses within a reset period. That is, while the total DC component of the stirring pulses is 0 in the first exemplary embodiment, the total DC component of the stirring pulses in the driving method of the second exemplary embodiment is not 0. Therefore, the way of supplying the compensation pulse is different from that of the first exemplary embodiment.

(Driving Example 2-1)

Figure 22:
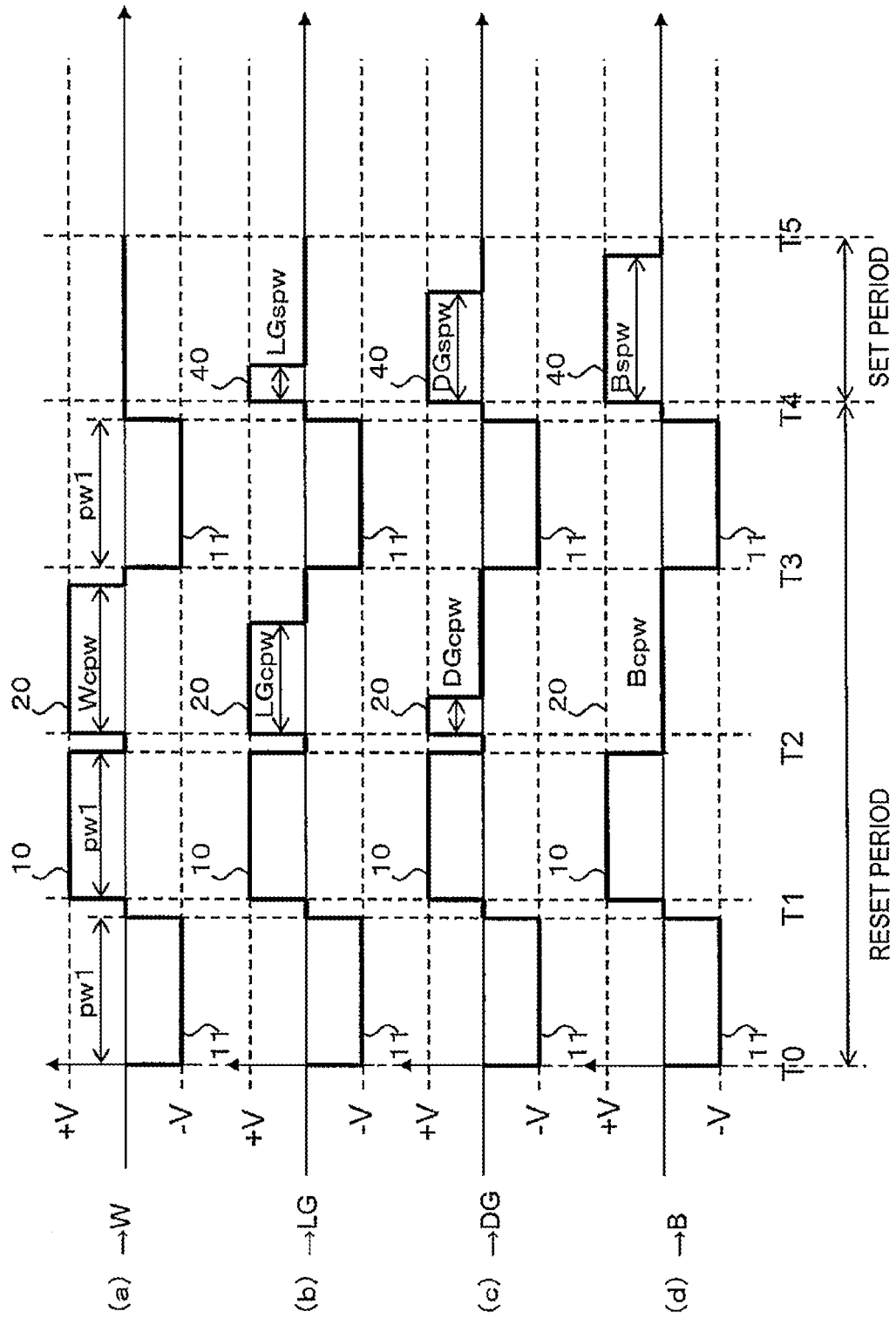
FIG. 22 is a chart showing voltage waveforms at the time of updating an image in Driving Example 2-1.

The driving method at the time of updating the image will be described by using the voltage waveforms applied to the pixel shown in FIG. 22 and the display images shown in FIG. 23. As shown in FIG. 22, the image update period is constituted with a reset period (T0 to T4) where a previous image is erased and a set period (T4 to T5) where an image is written. FIG. 22-(a) is the waveform of the voltage applied to the pixel for displaying W (white). FIG. 22-(b) is the waveform of the voltage applied to the pixel for displaying LG (light gray). FIG. 22-(c) is the waveform of the voltage applied to the pixel for displaying DG (dark gray). FIG. 22-(d) is the waveform of the voltage applied to the pixel for displaying B (black).

Figure 23:
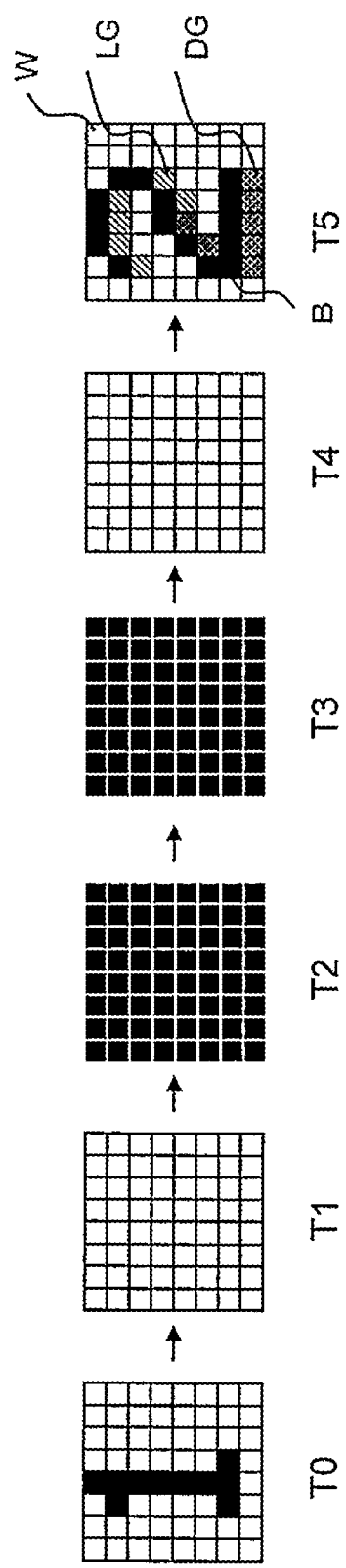
FIG. 23 is an illustration showing displayed images at the time of updating an image in Driving Example 2-1.

The Driving Example shown in FIG. 22 and FIG. 23 is the method which sets all the pixels of the display unit to white display from T3 to T4 of the reset period, and changes the intended pixels to the state of low reflectance by applying the voltage of +V in the set period.

In this Driving Example, as shown in FIG. 22, a positive stirring pulse 10 is applied to all the pixels after applying a negative stirring pulse 11 from T0 to T2 of the reset period in order to erase the displayed image and to stir the particles. Further, the negative stirring pulse 11 is applied to all the pixels from T3 to T4 in the reset period. Note here that the pulse width of both of the positive and negative stirring pulses is defined as pw1, so that the DC component (voltage×applied time) of the stirring pulse within the reset period is the component of the negative stirring pulse 11 (−V×pw1). As described above by using FIGS. 9A and 9B, pw1 is determined by the time required for reaching the white or black base state. In the case of this Driving Example, the positive stirring pulse 20 is used. Thus, it is preferable to apply the time (FIGS. 9A and 9B: pw1_b) required for changing to the black display state (black base state) from the white display state by applying the voltage of +V as pw1.

Next, the compensation pulse applied in the reset period T2 to T3 will be described. The compensation pulse is applied to zero the total DC component of each of the voltage waveforms shown in FIG. 22-($a$) to FIG. 22-($d$). As described earlier, the DC component of the stirring pulse within the reset period of this Driving Example is −V×pw1. The DC component in the set period becomes +V×pw1 by the pulse width spw of the set pulse. Assuming that the pulse width of the compensation pulse is cpw, the following expression for setting the total DC component as zero in the entire image update period applies:

$$(-V) \times \text{pw}1 + (+V) \times \text{cpw} + (+V) \times \text{spw} = 0 \quad \text{Expression (1)}$$

Note here that the values of +V and −V are equivalent, so that the pulse width cpw of the compensation pulse of this Driving Example can be expressed as follows by arranging Expression (1):

$$\text{cpw} = \text{pw}1 - \text{spw} \quad \text{Expression (2)}$$

Therefore, when the positive compensation pulse of the pulse width cpw determined by Expression (2) is applied, the total DC component of the voltage waveform becomes zero. Specifically, in each of the voltage waveforms shown in FIG. 22-($a$) to FIG. 22-($d$), the pulse width of the compensation pulse applied from T2 to T3 is determined as follows:

$$W\text{cpw} = \text{pw}1 - W\text{spw} = \text{pw}1 \quad \text{Expression (3)*}W\text{spw}=0$$

$$LG\text{cpw} = \text{pw}1 - LG\text{spw} \quad \text{Expression (4)}$$

$$DG\text{cpw} = \text{pw}1 - DG\text{spw} \quad \text{Expression (5)}$$

$$B\text{cpw} = \text{pw}1 - B\text{spw} = 0 \quad \text{Expression (6)*Set as }B\text{spw}=\text{pw}1$$

As described above, the positive compensation pulse 20 of the pulse width corresponding to the display gradation is applied in the reset period T2 to T3. However, due to the positive stirring pulse 10 immediately before, all the pixels are in black display state (black base state). Thus, the change in the display state is not visually recognized, and all the pixels at T3 are in the black display state as in T2 as shown in FIG. 23.

Then, the negative stirring pulse 11 is applied in the reset period T3 to T4, and the positive set pulse 40 of the pulse width corresponding to the display gradation is applied in the set period T4 to T5. The intended pixels are turned into the intended display state in the set period T4 to T5, and the image update is completed as shown in T5 of FIG. 23.

As described above, through updating the image with the voltage waveforms shown in FIG. 22, it is possible to prevent display of the inverted image of the updated image as in FIG. 23 according to the same principle as that of Driving Example 1-1. In the voltage waveforms shown in FIG. 22, the timing for applying the stirring pulse and the timing for applying the compensation pulse are tolerated within the range described in Driving Example 1-1 as in the case of Driving Example 1-1.

Further, as described in the Driving Example 1-1, through executing the designing in such a manner that the gradation where the applied voltage is +V and the gradation where the applied voltage is −V do not exist within a same sub-frame, it is possible to achieve the low power consumption.

As described above, with the drive by using the voltage waveform shown in FIG. 22, the display state is changed as in FIG. 23 at the time of updating the image, the inverted image of the updated image is not displayed, and the total DC component of the voltage waveform becomes zero. Since the inverted image is not displayed, there is no load imposed upon the user. Further, the total DC component of the voltage waveform applied at the time of updating the image is zero, so that it is possible to achieve an electrophoretic display device of a high image quality with which no afterimages and ghosting is generated.

Further, in the Driving Example 2-1, between the voltage waveforms (specific example: FIG. 22) given to all the display gradations at the time of updating the image, the timing for supplying +V and the timing for supplying −V do not overlap with each other. Thus, the voltage of the data line does not change largely (e.g., from +V to −V) in a short time, and the driving capacity of the data driver can be suppressed. Therefore, the power consumption and the cost can be lowered. As described in the first exemplary embodiment, the state of 0 V between each of the voltage pulses shown in FIG. 22 can be omitted. With the voltage waveform where the state of 0 V is omitted, it is also possible to shorten the time for updating the image. Further, it is also possible to achieve a still higher image quality through adding the pair of positive and negative stirring pulses to the voltage waveforms shown in FIG. 22 to increase the number of the stirring pulses in order to increase the capability of erasing the so-called history.

(Driving Example 2-2)

While the intended pixels are changed to the state where the reflectance becomes low by applying the voltage of +V in the set period in Driving Example 2-1, Driving Example 2-2 is the driving method which sets all the pixels of the display unit as black display (black base state) at the end of the reset period, and changes the intended pixels to the state where the reflectance is high by applying the voltage of −V in the set period. In this Driving Example, the voltage waveforms to be applied to the pixels are shown in FIG. 24, and the display images corresponding to the voltage waveforms are shown in FIG. 25.

Figure 24:
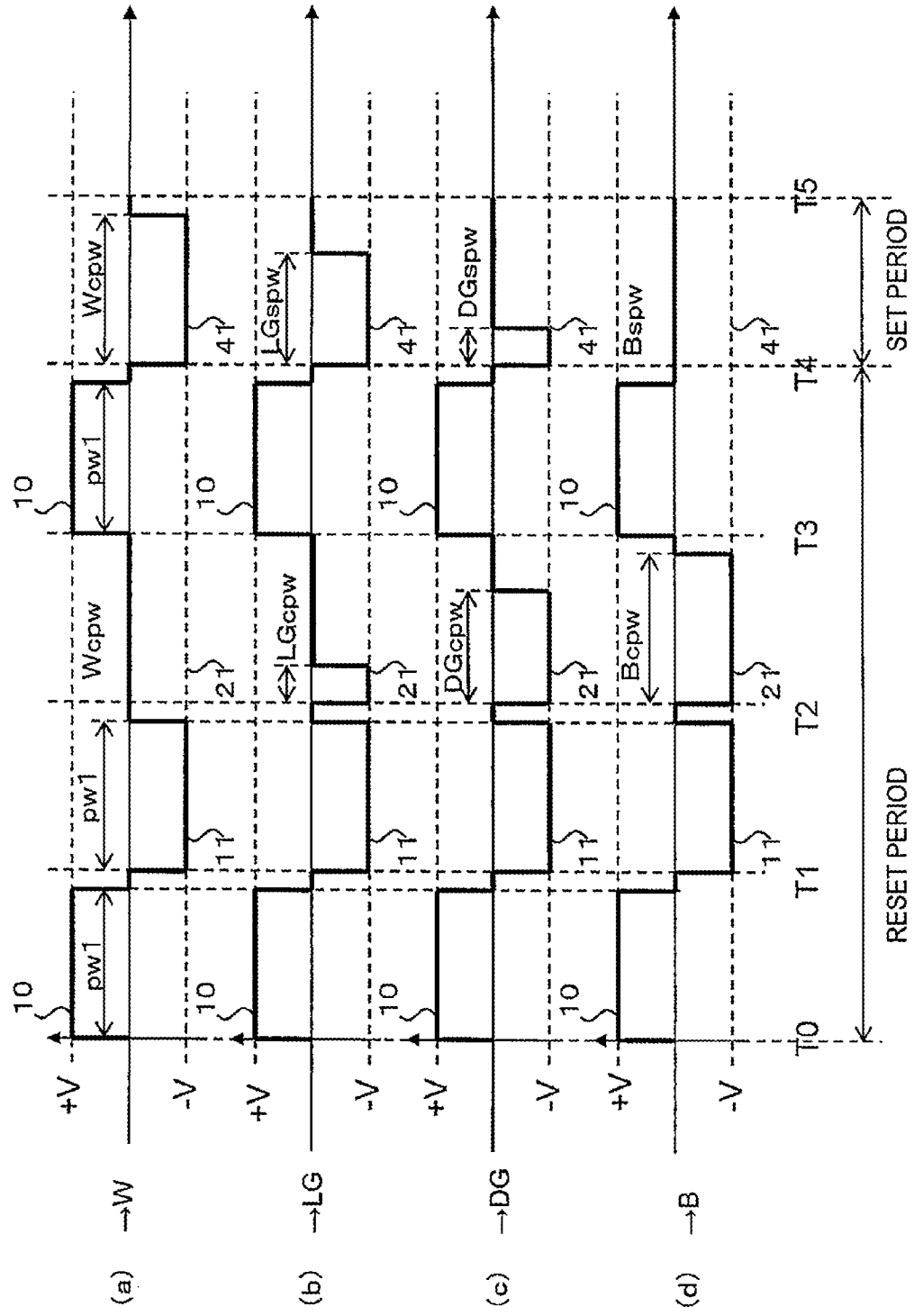
FIG. 24 is a chart showing voltage waveforms at the time of updating an image in Driving Example 2-2.
Figure 25:
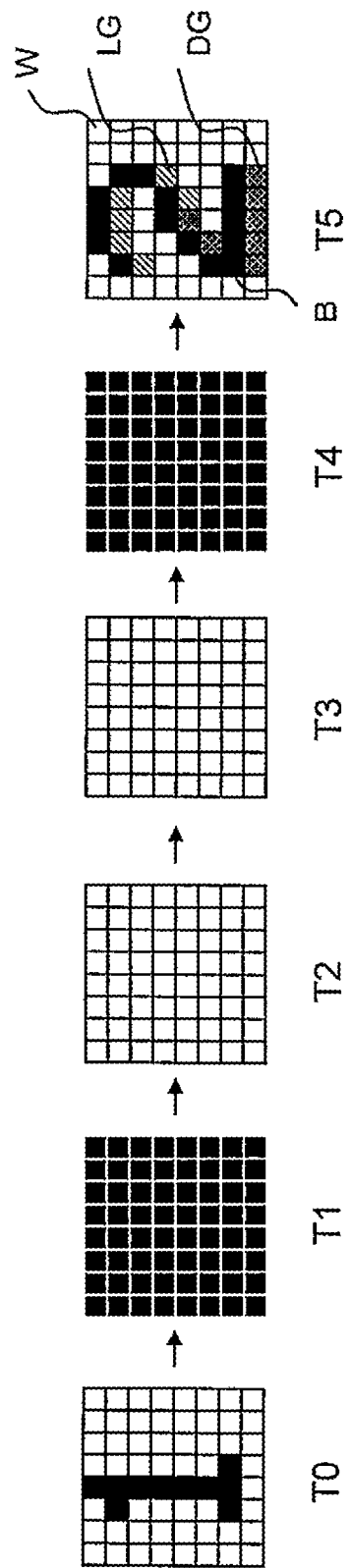
FIG. 25 is an illustration showing a displayed image at the time of updating the image in Driving Example 2-2.

In the voltage waveform shown in FIG. 24, the negative stirring pulse 11 is applied to all the pixels after applying the positive stirring pulse 10 from T0 to T2 of the reset period in order to erase the displayed image and to stir the particles. The pulse width of the positive and negative stirring pulses is defined as pw1 in common as in the case of Driving Example 2-1. However, in the case of this Driving Example whose voltage waveform is shown in FIG. 24, the negative compensation pulse 21 is applied. Thus, it is desirable to employ the time (FIGS. 9A and 9B: pw1_w) required for changing the black display state to the white display state (white base state) by applying the voltage of −V as pw1.

In the reset period T2 to T3, the negative compensation pulse 21 that is of the same polarity as that of the stirring pulse immediately before is applied. In order to acquire the compensation pulse width cpw, a conditional expression for setting the total DC component as zero in the entire image update period is derived as in the case of Expression (1) of Driving Example 2-1. In this Driving Example, the DC component of the stirring pulse in the reset period is +V×pw1 and the DC component in the set period is −V×spw. Thus, assuming that the pulse width of the compensation pulse is cpw, a following expression can be acquired.

$$(+V) \times pw1 + (-V) \times cpw + (-V) \times spw = 0 \quad \text{Expression (7)}$$

Note here that the values of +V and −V are equivalent, the pulse width cpw of the compensation pulse of this Driving Example can be expressed as follows by arranging Expression (7).

$$cpw = pw1 - spw \quad \text{Expression (8)}$$

This is the same as Expression (2). Therefore, in each of the voltage waveforms shown in FIG. 24-(a) to FIG. 24-(d), the pulse width of the compensation pulse applied from T2 to T3 can be calculated in the same manner as that of Driving Example 2-1.

As described above, the white compensation pulse 21 of the pulse width corresponding to the display gradation is applied in the reset period T2 to T3. However, due to the negative stirring pulse 11 immediately before, all the pixels are in white display state (white base state). Thus, the change in the display state is not visually recognized, and all the pixels at T3 are in the white display state as in T2 as shown in FIG. 25.

Then, the positive stirring pulse 10 is applied in the reset period T3 to T4, and the negative set pulse 41 of the pulse width corresponding to the display gradation is applied in the set period T4 to T5. The intended pixels are turned into the intended gradation display state in the set period T4 to T5, and the image update is completed as shown in T5 of FIG. 25.

Driving Example 2-2 can achieve the same effect as that of Driving Example 2-1.

As described above, it is possible to omit the state of 0 V between each of the voltage pulses shown in FIG. 24. With the voltage waveform in which the state of 0 V is omitted, the time for updating the image can be shortened. Further, it is also possible to acquire a still higher image quality through increasing the number of the stirring pulses by adding the pair of positive and negative stirring pulses to the voltage waveforms shown in FIG. 24 and improving the capability of erasing the so-called history.

While the structures and the driving method of the second exemplary embodiment have been described above, the structures and the driving method are not limited to those. Changes in the design are tolerated within the range not departing from the content described as applicable in the first exemplary embodiment and the concept of the second exemplary embodiment.

(Third Exemplary Embodiment)
(Explanations of Structure)

Regarding the structure of a third exemplary embodiment, explanations of the components same as those of the first exemplary embodiment will be omitted. In the third exemplary embodiment, a plurality of pixels of the display unit are divided into a group of pixels a as a first region and a group of pixels b as a second region, and different voltage waveforms are applied to each of the regions (pixels a/pixels b) when updating the image. Thus, the number of the functions provided to the display controller shown in FIG. 1 is increased as described in the followings compared to that of the first exemplary embodiment.

Figure 26:
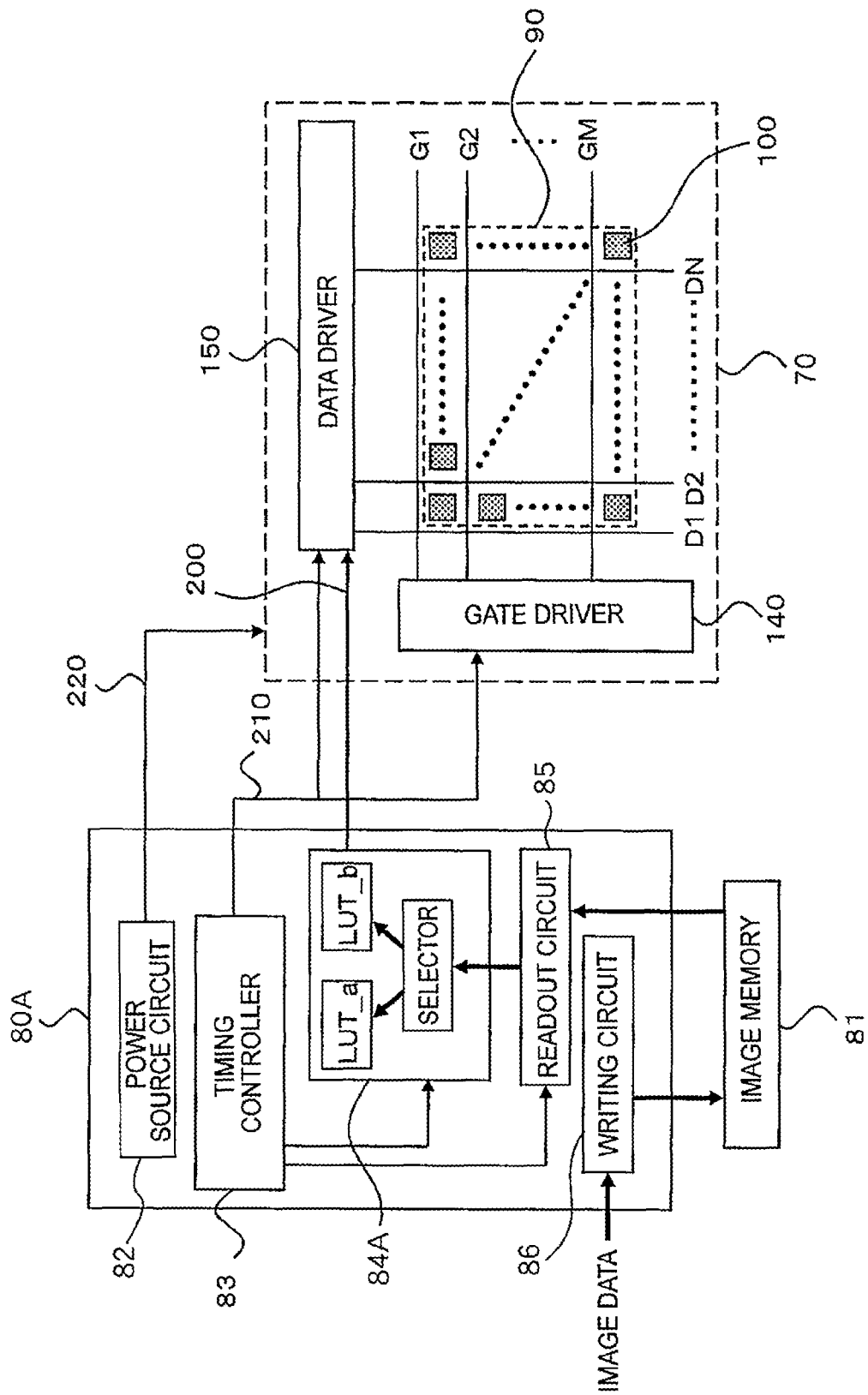
FIG. 26 is a functional block diagram showing an electrophoretic display device according to a third exemplary embodiment.
Figures 27A, 27B, 27C, 27D, 27E, 27F:
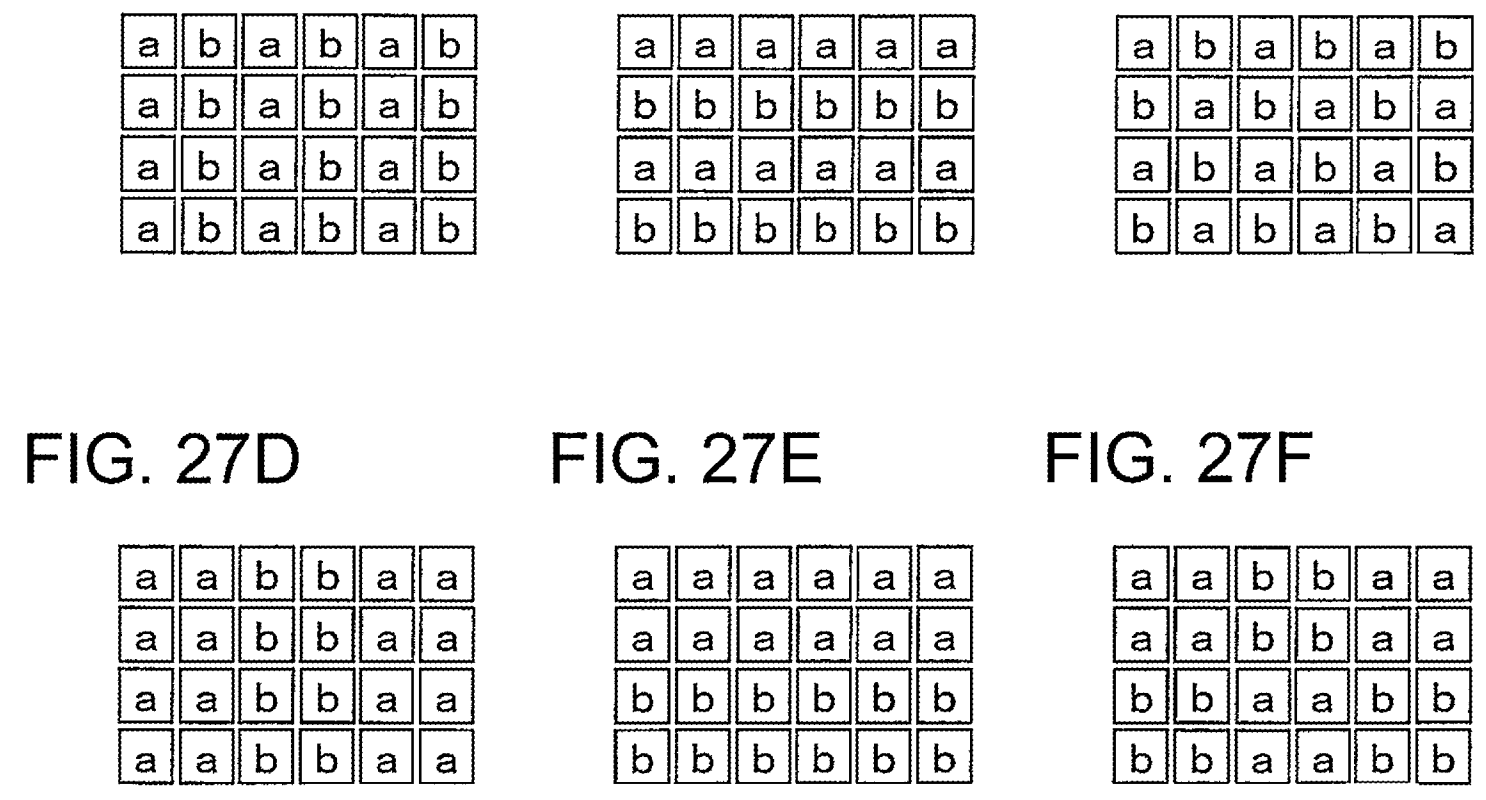

FIGS. 27A-27F show examples of pattern layout of the group of pixels a and the group of pixels b. FIG. 27A is a pattern in which the group of pixels a and the group of pixels b are disposed alternately on each vertical line, FIG. 27B is a pattern in which the group of pixels a and the group of pixels b are disposed alternately on each lateral line, and FIG. 27C is a pattern in which the pixel a and the pixel b are alternately arranged for each pixel on the vertical and lateral lines. FIG. 26 is a functional block diagram of an electrophoretic display device according to the third exemplary embodiment. For applying the different voltage waveforms for the patterned pixels a and the pixels b as in FIGS. 27A-27F, a display controller 80A used in the third exemplary embodiment is provided with a voltage data outputted in order of sub-frames for each display gradation corresponding to the pixels a and a similar voltage data corresponding to the pixels b. Thus, a data conversion circuit 84A shown in FIG. 26 includes: a lookup table (LUT_a) for the pixels a; a lookup table (LUT_b) for the pixels b; a function (selector) which judges whether the output pixels are the pixels a or the pixels b when reading out each pixel data by each sub-frame from the image data stored in an image memory; and a function which selects the voltage (+V/0/−V) to be written to the pixel electrode by using the above-described lookup tables according to the output target. That is, compared to the first exemplary embodiment, a significant difference in the third exemplary embodiment is that the two lookup tables of the applied voltages, which are twice as many, are required.

(Explanations of Driving Method)

The driving method according to the third exemplary embodiment will be described by referring to the accompanying drawings. With the driving method according to the third exemplary embodiment, different voltage waveforms are applied for each of the regions (pixels a/pixels b). However, as in the cases of the first and second exemplary embodiments, the stirring pulse and the compensation pulse are applied in the reset period and the set pulse is applied in the set period at the time of updating the image. Further, in each of the voltage waveforms of the pixels a and the pixels b, the width of the compensation pulse is determined in such a manner that the total DC component becomes 0. At the same time, the compensation pulse is applied after the pixels a are in the white or black base state and the pixels b are in the black or white base state by applying the stirring pulse, and the display states of the pixels a and the pixels b are not changed before and after applying the compensation pulse. Thus, as in the case of the first and the second exemplary embodiments, it is possible to achieve the driving with which the inverted image of the updated image is not displayed and the total DC component of the voltage waveforms is zero.

(Driving Example 3-1)

Figure 28:
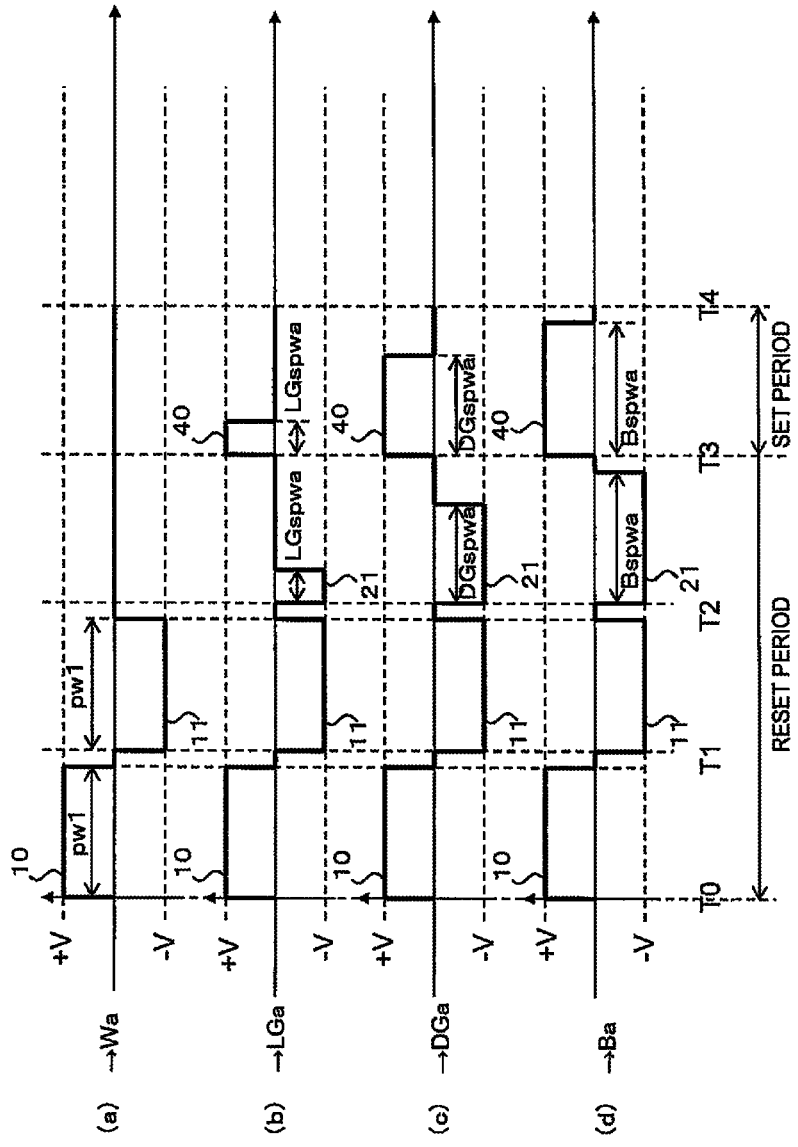
FIG. 28 is a chart showing voltage waveforms of the pixel a at the time of updating an image in Driving Example 3-1.
Figure 29:
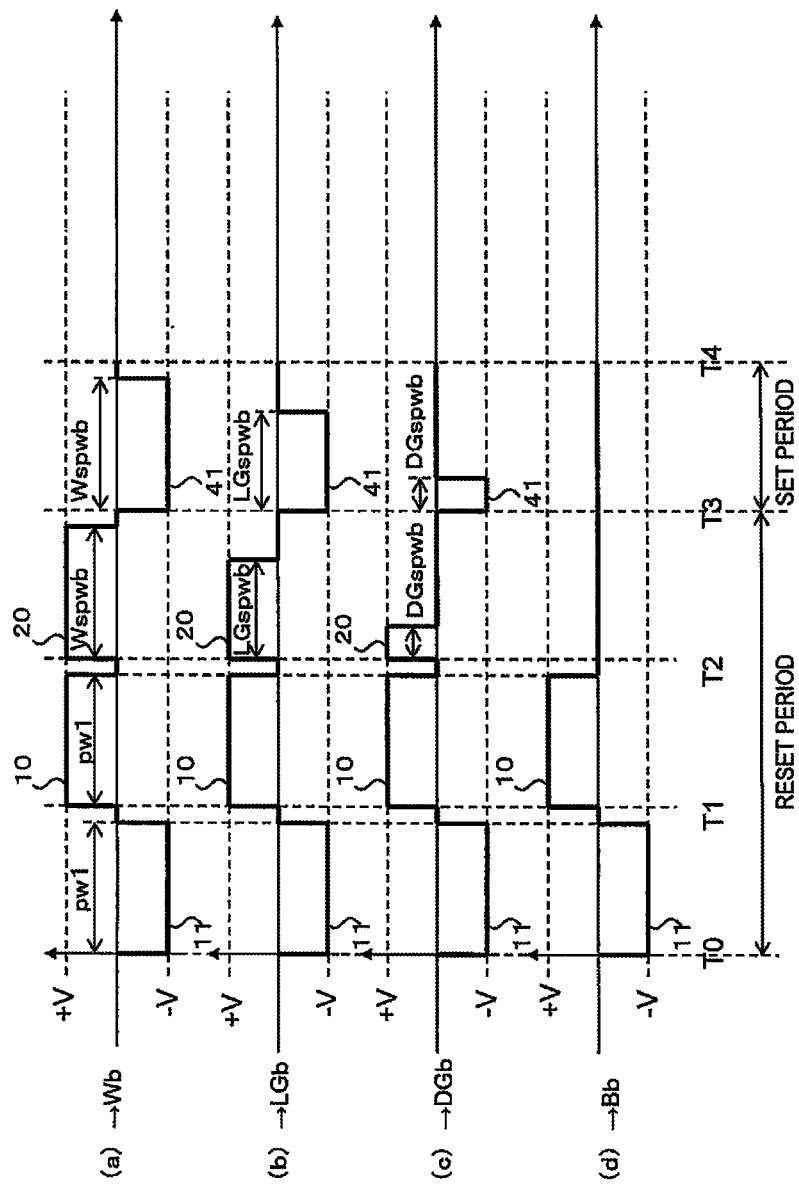
FIG. 29 is a chart showing voltage waveforms of the pixel b at the time of updating an image in Driving Example 3-1.
Figure 30:
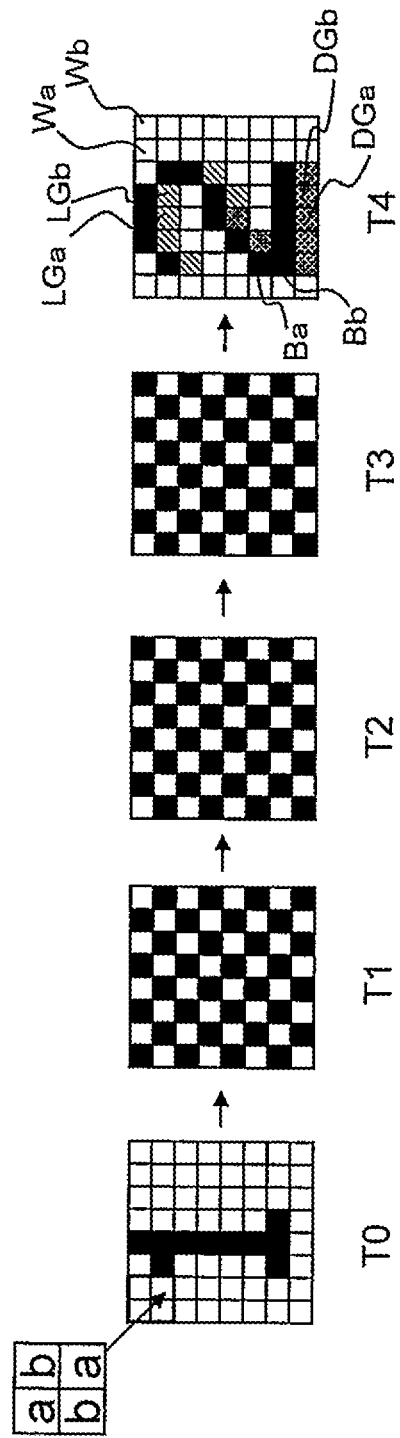
FIG. 30 is an illustration showing displayed images at the time of updating an image in Driving Example 3-1, Driving Example 4-4, and Driving Example 5-1.

The driving method 3-1 at the time of updating the image will be described by using the voltage waveforms applied to the pixels a shown in FIG. 28, the voltage waveforms applied to the pixels b shown in FIG. 29, and the displayed images shown in FIG. 30. FIG. 30 shows the displayed images when the pixels a and the pixels b are in the pattern (the co-called checkwise pattern) shown in FIG. 27C. As shown in FIG. 28 and FIG. 29, the image update period is constituted with a reset period (T0 to T3) where a previous image is erased and a set period (T3 to T4) where an image is written. FIG. 28-(a) and FIG. 29-(a) are the waveforms of the voltages applied to the pixels a and the pixels b for displaying white (Wa/Wb). FIG. 28-(b) and FIG. 29-(b) are the waveforms of the voltages applied to the pixels a and the pixels b for displaying light gray (LGa/LGb). FIG. 28-(c) and FIG. 29-(c) are the waveforms of the voltages applied to the pixels a and the pixels b for displaying dark gray (DGa/DGb). FIG. 28-(d) and FIG. 29-(d) are the waveforms of the voltages applied to the pixels a and the pixels b for displaying black (Ba/Bb).

In T0 to T1 of the reset period, the positive stirring pulse 10 of the pulse width pw1 is applied to the pixels a (FIG. 28), and the negative stirring pulse 11 of the pulse width pw1 is applied to the pixels b (FIG. 29) in order to erase the displayed image and to stir the particles. As described by referring to FIGS. 9A and 9B, the pulse width pw1 of the stirring pulse is determined by the time required for reaching the white or black base state from the black or white display state. In the case of this Driving Example, the negative and positive stirring pulses are used for the pixels a and the pixels b. Thus, it is preferable to determine it with the one that takes longer for reaching the white or black base state. The display state at T1 is a display where the pixels are alternately arranged as black and white by each pixel vertically and laterally as shown in FIG. 30. In T1 to T2 of the reset period, the negative stirring pulse 11 of the pulse width pw1 is applied to the pixels a (FIG. 28), and the positive stirring pulse 10 of the pulse width pw1 is applied to the pixels b (FIG. 29). The display state in T2 is a display where white and black are arranged alternately by each pixel vertically and laterally as shown in FIG. 30. Thus, the displayed pixels of black and white in T1 are inverted into the display pixels of white/black (white/black base state).

In the reset period T2 to T3, the compensation pulse that is of the same polarity as that of the stirring pulse immediately before is applied. That is, the negative stirring pulse 21 is applied to the pixels a (FIG. 28), and the positive stirring pulse 20 is applied to the pixels b (FIG. 29). In this Driving Example, there are odd-number of stirring pulses, and the total DC component of the stirring pulses is 0. Thus, as described in the first example embodiment, the width of the each of the compensation pulses is aligned with the pulse widths spwa and spwb of the set pulses to be described later, which are applied according to the display gradations in the set period.

After all the pixels a and the pixels b are turned into the white/black base state in T2, the compensation pulses are applied in the manner described above. Thus, the change in the display state is not visually recognized, and the display state in T3 is the same state as that of T2 in which white and black are arranged alternately by each pixel vertically and laterally as shown in FIG. 30.

At last, in the set period (T3 to T4), the set pulses of +V and −V of the pulse width corresponding to the intended display gradation are applied to the pixels a and the pixels b. As shown in FIG. 28 and FIG. 29, the pulse width of the set pulse applied to the pixels a is defined as spwa, and the width of the set pulse applied to the pixels b is defined as spwb. The set pulse widths for the pixels a/pixels b according to the display gradations are defined, respectively, as Wspwa/Wspwb for white display, LGspwa/LGspwb for light gray display, DGspwa/DGspwb for dark gray display, and Bspwa/Bspwb for black display.

Note here that the width of the set pulse is required to be set so that the pixels a and the pixels b displaying the same gradation are of the same reflectance. This is because there are DGa displayed on the pixels a and DGb displayed on the pixels b in the area for displaying DG (dark gray) as shown in FIG. 30, for example, and the pattern of the pixels a and the pixels b (e.g., FIG. 27C) is visually recognized so that the image quality is deteriorated when the reflectance of DGa is different from that of DGb. In this Driving Example, DGa is displayed by the set pulse of +V from the white base state, and DGb is displayed by the set pulse of −V from the black base state. The pulse widths DGspwa and DGspwb of each of the set pulses are required to be adjusted so that the reflectance of DGa and that of DGb become equivalent. While the case of DG (dark gray) has been described above, it is also required to adjust the widths of the set pulses as well for the other colors.

As described above, through applying the set pulses of the set pulse widths, the intended pixels are turned into the state of intended gradation display. Thereby, update of the image can be completed as shown in T4 of FIG. 30.

Through updating the image by using the voltage waveforms shown in FIG. 28 and FIG. 29, it is possible to prevent the inverted image of the updated image from being displayed. The factors for preventing the display of the inverted image are to apply the compensation pulse of the same polarity as that of the stirring pulse applied immediately before and to apply the stirring pulse at the same timing in each of the displayed gradations as described in the first exemplary embodiment. As described above, regarding the timing for applying the stirred pulses and the timing for applying the compensation pulses, there is also a margin as in the case of Driving Example 1-1 tolerated within the range described in Driving Example 1-1.

In this Driving Example, the voltage waveforms applied to the pixels a and the pixels b are shown in FIG. 28 and FIG. 29. However, the reversed voltage waveforms may be supplied to the pixels a and the pixels b. Further, while the patterns of the group of the pixels a and the group of the pixels b are described by referring to FIG. 27C, it is also applicable with the other patterns shown in FIGS. 27A-27F. Furthermore, when the pixel pitch is small, the two-line alternate patterns shown in FIG. 27D and FIG. 27E, the two-pixel alternate pattern shown in FIG. 27F, and patterns not illustrated in FIGS. 27A-27F are also possible to be employed.

Further, as shown in FIG. 28, focusing only on the voltage waveform to be applied to the pixels a, it is possible to execute the designing in such a manner that the gradation where the applied voltage is +V and the gradation where the voltage is −V do not exist within a same sub-frame. As shown in FIG. 29, this is the same for the pixels b. Thus, with the use of the pattern where there are only the pixels a on a given data line and only the pixels b on another data line, e.g., the pattern shown in FIG. 27A, it is possible with Driving Example 3-1 to achieve the design in which the gradation where the applied voltage is +V and the gradation where the voltage is −V do not exist within a same sub-frame. Therefore, it is possible to lower the power consumption. To lower the power consumption with the patterns of another group of pixels a and another group of the pixels b, detailed explanations will be provided in a fifth exemplary embodiment.

In addition to the effects acquired with the first exemplary embodiment such as the effect of lightening the load for the user because there is no display of the inverted image and the effect of having no afterimage and ghosting because the total DC component of the voltage waveform is zero, it is possible with Driving Example 3-1 to have the effect of lightening the load for the user still further due to the fact that there is no so-called flashing in which the entire display unit changes from white to black or from black to white in the reset period since the display unit is divided into the group of the pixels a in the first region and the group of the pixels b in the second region and the polarities of the stirring pulses applied in the reset period are inverted between the pixels a and the pixels b.

Further, as described above, it is possible to lower the power consumption through achieving the designing in such a manner that the gradation where the applied voltage is +V and the gradation where the voltage is −V do not exist within a same sub-frame.

Note that Driving Example 3-1 employs the voltage waveforms (Driving Example 1-3) shown in FIG. 15 and described in the first exemplary embodiment for the pixels a and the voltage waveforms (Driving Example 1-1) shown in FIG. 7 for the pixels b. Therefore, as described in the first exemplary embodiment, it is possible to shorten the time for updating the image through employing the voltage waveform in which the state of 0 V between each of the voltage pulses in this Driving Example (FIG. 28 and FIG. 29) is omitted and to achieve a still higher image quality through improving the capability of erasing the so-called history by adding the pair of positive and negative stirring pulses to increase the number of the stirring pulses. However, when adding the pair of positive and negative stirring pulses, it is necessary to invert the polarities of the stirring pulses to be added to the pixels a and the pixels b in order to suppress flashing.

(Driving Example 3-2)

Figure 31:
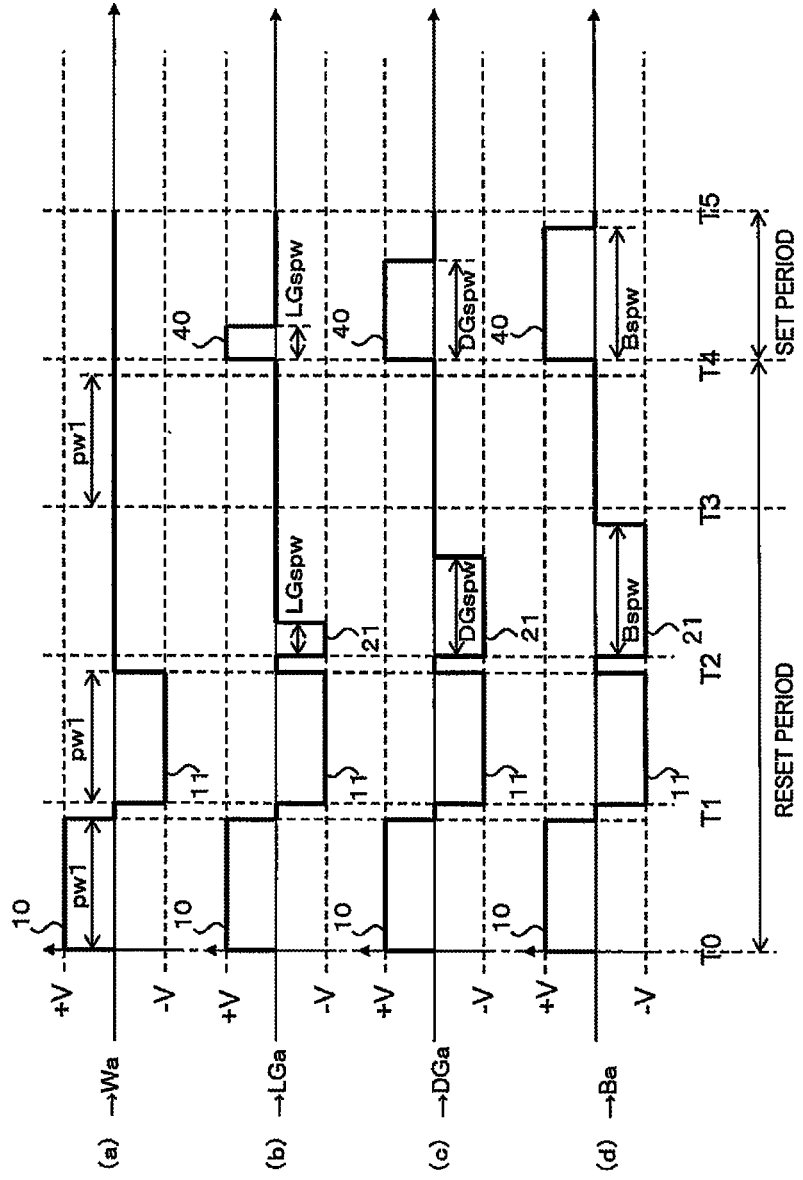
FIG. 31 is a chart showing voltage waveforms of the pixel a at the time of updating an image in Driving Example 3-2.
Figure 32:
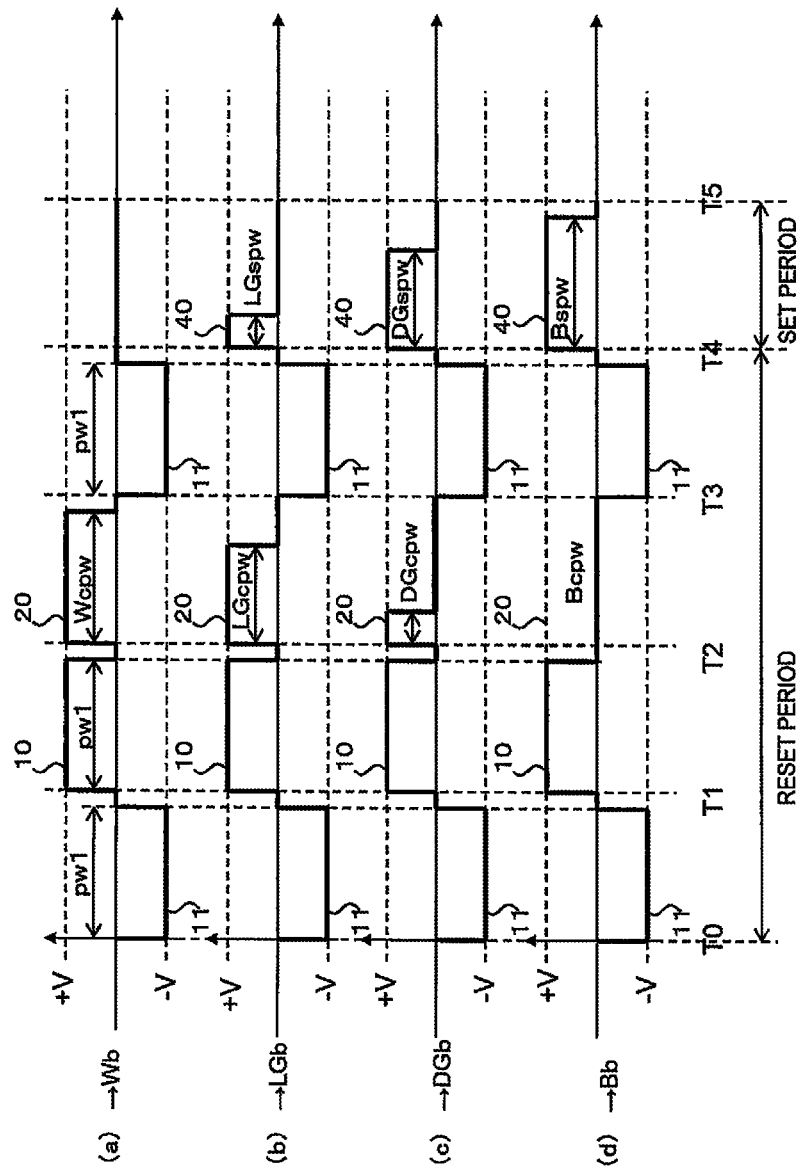
FIG. 32 is a chart showing voltage waveforms of the pixel b at the time of updating an image in Driving Example 3-2.
Figure 33:
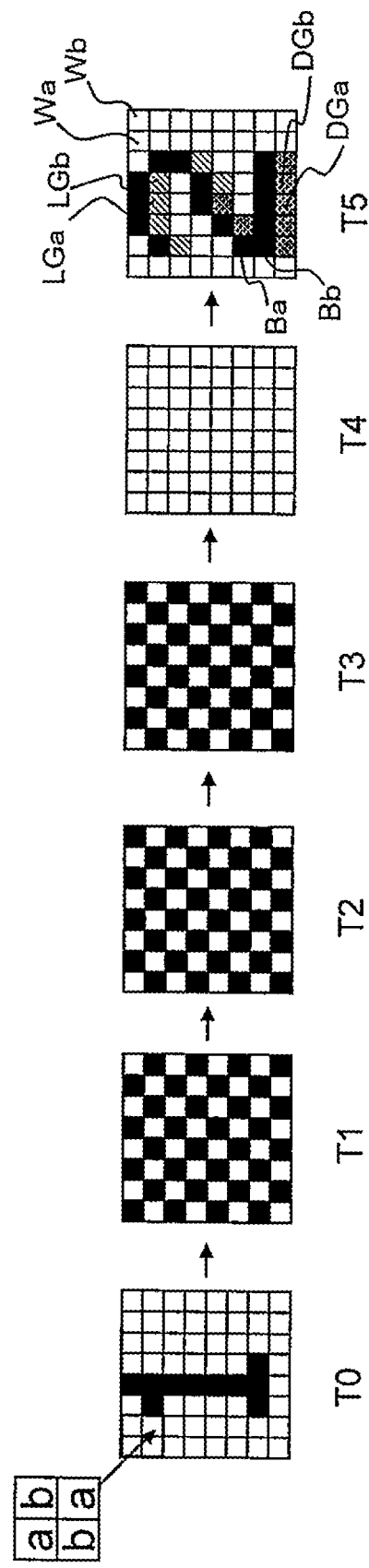
FIG. 33 is an illustration showing displayed images at the time of updating an image in Driving Example 3-2.

In Driving Example 3-2, FIG. 31 shows the voltage waveforms applied to the pixels a, FIG. 32 shows the voltage waveforms applied to the pixels b, and FIG. 33 shows the displayed images. FIG. 33 shows the displayed images of a case where the pixels a and the pixels b are in the pattern shown in FIG. 27C as in the case of Driving Example 3-1.

This Driving Example is different from Driving Example 3-1 in respect that the polarities of the set pulses applied in the set period are set as the same for the pixels a and the pixels b. Accordingly, the way of applying the compensation pulses becomes different from that of Driving Example 3-1. Regarding the displayed image, it is different from the case of Driving Example 3-1 in respect that all the pixels of the display unit is turned to white display once in the reset period.

The drive in T0 to T2 of the reset period is same as that of Driving Example 3-1 as shown in FIG. 31 and FIG. 32, so that the explanations thereof will be omitted.

In the reset period T2 to T3, the compensation pulse that is of the same polarity as that of the stirring pulse immediately before is applied. That is, the negative stirring pulse 21 is applied to the pixels a (FIG. 31), and the positive stirring pulse 20 is applied to the pixels b (FIG. 32). As shown in FIG. 31, there are even-number of stirring pulses in the voltage waveform of the pixels a. Thus, as described in the first example embodiment, the width of each of the compensation pulses is aligned with the pulse width spw of the set pulse to be applied according to the display gradations in the set period. In the meantime, as shown in FIG. 32, there are odd-number of stirring pulses in the voltage waveform of the pixels b. Thus, as described in the second example embodiment, the width cpw of each of the compensation pulses is set as the width calculated from Expression (2).

After all the pixels a and the pixels b are turned into the white/black base state in T2, the compensation pulses are applied in the manner described above. Thus, the change in the display state is not visually recognized, and the display state in T3 is the same state as that of T2 in which white and black are arranged alternately by each pixel vertically and laterally as shown in FIG. 33.

Then, the negative stirring pulse 11 is applied only to the pixels b in the reset period T3 to T4, and 0 V is applied to the pixels a in the period pw1 for applying the pulse to the pixels b. Thus, as shown in FIG. 33, all the pixels of the display unit are in the white display state in T4.

At last, in the set period T4 to T5, through applying the positive set pulse of +V of the pulse width corresponding to the intended display gradation to the pixel a and the pixels b, the intended pixels are turned to the intended gradation display state. Thereby, the image update is completed as shown in T5 of FIG. 33.

Through updating the image by using the voltage waveforms shown in FIG. 31 and FIG. 32, it is possible to prevent the inverted image of the updated image from being displayed. As described in the first exemplary embodiment, the factors for preventing the display of the inverted image are to apply the compensation pulse of the same polarity as that of the stirring pulse applied immediately before and to apply the stirring pulse at the same timing in each of the display gradations. However, as described above, regarding the timing for applying the stirred pulses and the timing for applying the compensation pulses, there is also a margin as in the case of Driving Example 1-1 tolerated within the range described in Driving Example 1-1.

In this Driving Example, the voltage waveforms applied to the pixels a and the pixels b are shown in FIG. 31 and FIG. 32. However, the reversed voltage waveforms may be supplied to the pixels a and the pixels b. Further, while all the pixels of the display unit are set to be the white display once in the reset period, and the negative stirring pulse is applied to the voltage waveform of the pixel b to apply the positive set pulse, it is also possible to reverse all the polarities of each of the pulses applied to the pixels a and the pixels b to set all the pixels of the display unit to be the black display once in the reset period and to apply the negative set pulse. Furthermore, as in the case of Driving Example 3-1, the pattern of the group of pixels a and the group of pixels b is not limited to the pattern shown in FIG. 27C.

Further, as in the case of Driving Example 3-1, with the use of the pattern where there are only the pixels a on a given data line and only the pixels b on another data line, e.g., the pattern shown in FIG. 27A, it is possible to achieve the design in which the gradation where the applied voltage is +V and the gradation where the voltage is −V do not exist within a same sub-frame. Therefore, it is possible to lower the power consumption.

In addition to the effects acquired with the first and second exemplary embodiments, it is possible with Driving Example 3-2 to have the effect of lightening the load for the user still further due to the fact that the entire display unit does not change from white to black or from black to white even though the entire display unit is turned to the white display once in the reset period, through driving the display unit by dividing it into the group of the pixels a as the first region and the group of the pixels b as the second region as in the case of Driving Example 3-1. Further, the polarities of the set pulses are the same for the pixels a and the pixels b. Thus, unlike the case of Driving Example 3-1, it is unnecessary to adjust the reflectance in gray display, i.e., unnecessary to adjust the pulse widths of the set pulses for each polarity. Therefore, there is such an effect that the design thereof becomes more simplified than that of Driving Example 3-1.

Further, as described above, it is possible to lower the power consumption through achieving the designing in such a manner that the gradation where the applied voltage is +V and the gradation where the voltage is −V do not exist within a same sub-frame.

The voltage waveform of the pixels a shown in Driving Example 3-2 is the waveform acquired by adding the pulse of 0 V in T3 to T4 of the voltage waveform (Driving Example 1-3) shown in FIG. 15 and described in the first exemplary embodiment. As the voltage waveform of the pixels b is the waveform, employed is the voltage waveform (Driving Example 2-1) shown in FIG. 22 and described in the second exemplary embodiment. Therefore, as described in the first and second exemplary embodiments, it is possible to shorten the time for updating the image through employing the voltage waveform in which the state of 0 V between each of the voltage pulses in this Driving Example (FIG. 31 and FIG. 32) is omitted and to achieve a still higher image quality through improving the capability of erasing the so-called history by adding the pair of positive and negative stirring pulses to increase the number of the stirring pulses. However, when the state of 0 V is to be omitted, the pulse of 0 V applied in T3 to T4 of this Driving Example needs to be remained. Further, when adding the pair of positive and negative stirring pulses, it is necessary to invert the polarities of the stirring pulses to be added to the pixels a and the pixels b and to select the adding order in order to suppress flashing.

While the structure and the driving method of the third exemplary embodiment have been described above, the structures and the driving method are not limited to those. Changes in the design are tolerated within the range not departing from the content described as applicable in the first exemplary embodiment and the concept of the third exemplary embodiment.

(Fourth Exemplary Embodiment)
(Explanations of Structure)

Figure 34:
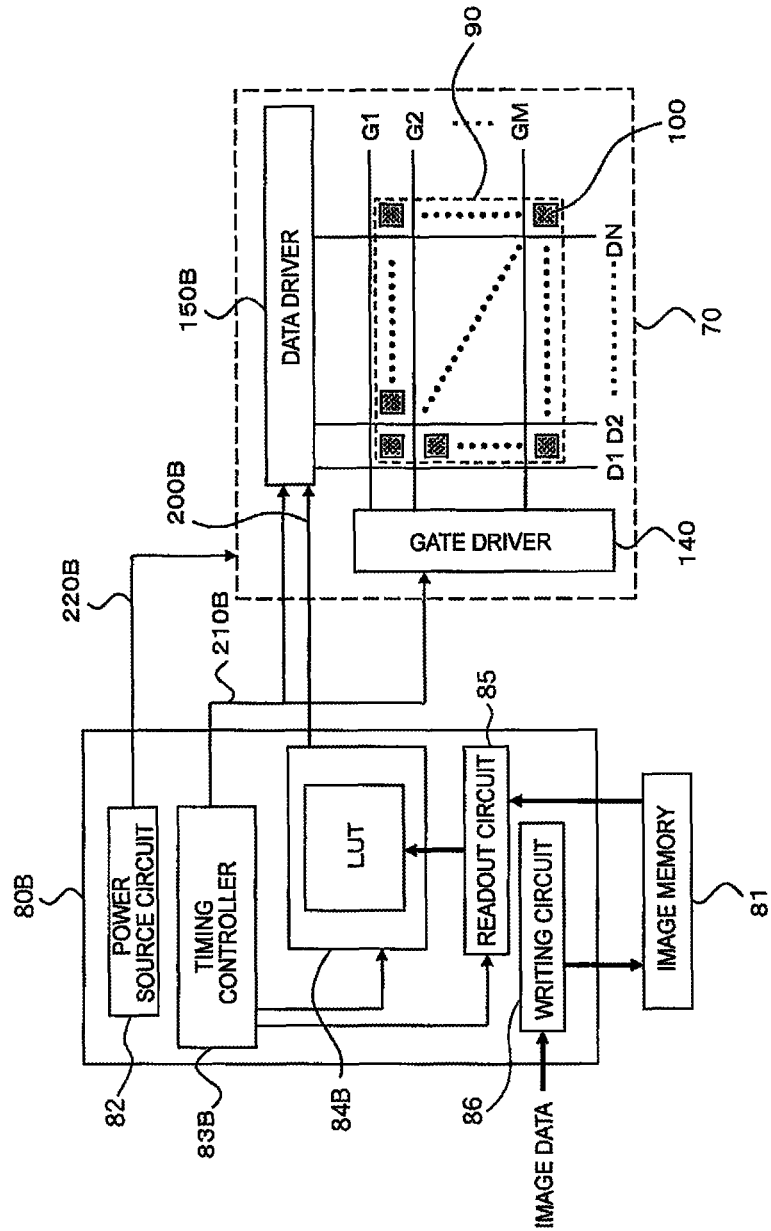
FIG. 34 is a functional block diagram showing an electrophoretic display device according to a fourth exemplary embodiment.

Regarding the structure of a fourth exemplary embodiment, explanations of the components same as those of the first exemplary embodiment will be omitted. In the first to third exemplary embodiments, the voltages applied to the pixels are defined as three values of +V, 0, and −V, and the method of changing the applying time is employed as a means for displaying the gradations. In the fourth exemplary embodiment, however, a method of changing the voltages to be applied is employed as a means for displaying the gradations. For example, voltages of seven values such as the positive voltages +V1, +V2, +V3 and the negative voltages −V1, −V2, −V3, and 0 V are used to display the gradations. Thus, as shown in FIG. 34, in the electrophoretic display device according to the fourth exemplary embodiment, a data driver 150B and a display controller 80B are provided with different functions from those of the first exemplary embodiment shown in FIG. 1. However, other structures are the same.

Figure 35:
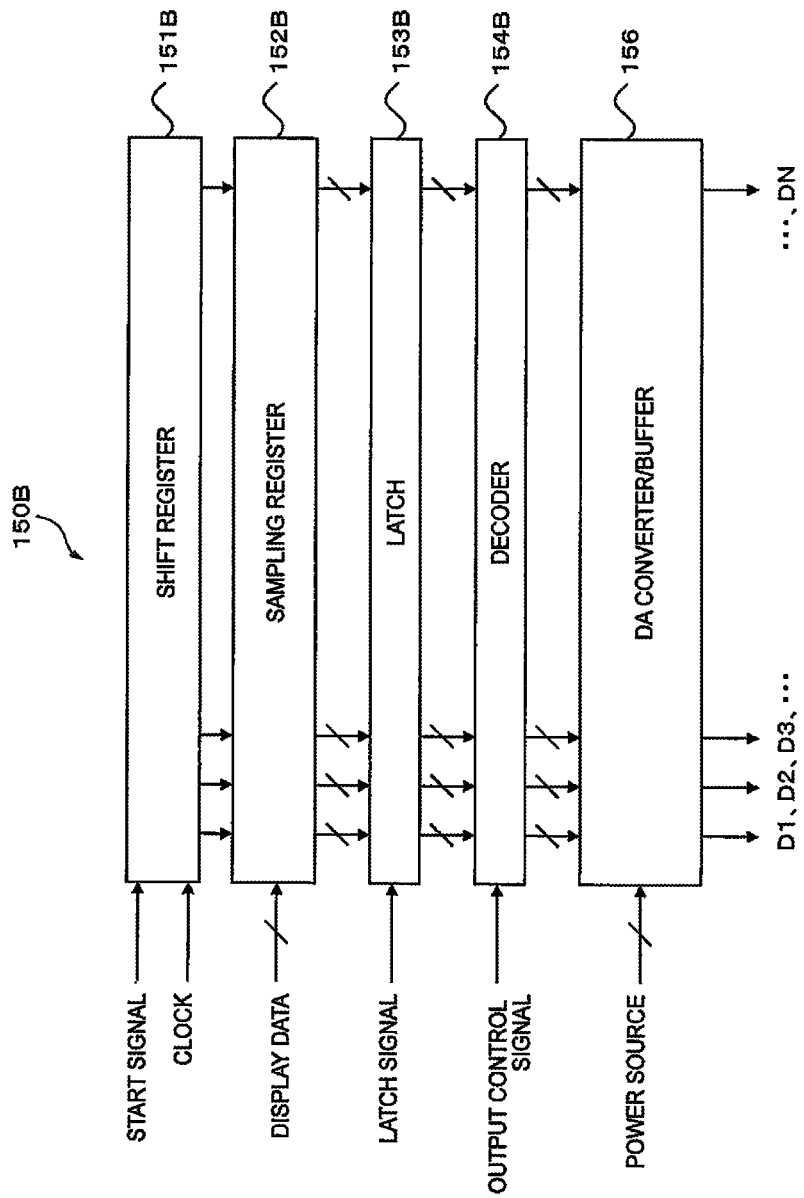
FIG. 35 is a block diagram showing a data drive according to the fourth exemplary embodiment.

The data driver 150B used in the fourth exemplary embodiment is different from the data driver 150 of the first exemplary embodiment in respect that the data driver 150B includes a function for outputting voltages of multiple values. As shown in FIG. 35, the data driver 150B is constituted with a shift register 151B, a sampling register 152B, a latch 153B, a decoder 154B, and a DA converter/buffer 156, for example. In order to deal with the voltages of multiple values, the number of bits of the display data is increased. However, the operations of the shift register 151B, the sampling register 152B, the latch 153B, and the decoder 154B are the same as those of the first exemplary embodiment. The DA converter/buffer 156 converts the decoded signals to intended analog voltages, and outputs those to the data lines D1, D2, - - - , DN simultaneously via the buffer.

As in the case of the first exemplary embodiment, the display controller 80B is provided with: a function (a timing controller 83B) which repeatedly outputs prescribed timing signals to the gate driver 140 and the data driver 150B in each sub-frame period; and a function (a data conversion circuit 84B) which generates display data outputted to the data driver 150B from the image data according to the sub-frames sf1, sf2, - - - , sfk. Thus, as in the case of the first exemplary embodiment, the display controller 80B includes a counter for counting the number of sub-frames and a voltage data outputted for each display gradation in the order of sub-frames (e.g., includes as a lookup table (LUT)). However, the types of the voltages to be outputted are increased, so that the data format becomes different from that of the first exemplary embodiment. Next, a method for acquiring different display gradations by changing the voltages to be applied will be described by referring to FIGS. 36A and 36B. FIG. 36A shows the response characteristic of the reflectance when the positive voltages of +V1, +V2, and +V3 are applied to the white state pixels. FIG. 36B shows the response characteristic of the reflectance when the negative voltages of −V1, −V2, and −V3 are applied to the black state pixels. As shown in FIG. 36A, when a positive voltage is applied to the pixel electrode, the white particles migrate to the pixel electrode side while the black particles migrate to the counter electrode side. Thus, the reflectance of the pixels is lowered according to the applied time. When the applied voltage is set as 0 V (counter electrode potential) after a prescribed time (pw1) has passed, migration of the particles stops, and the reflectance thereafter becomes almost constant. As shown in FIG. 36A, when the voltage value to be applied is changed (V3>V2>V1), the migration characteristic of the particles changes. The reflectance in the applied state in the pw1 period becomes lowered according to the extent of the voltage value. Further, as shown in FIG. 36B, when a negative voltage is applied to the pixel electrode, the black particles migrate to the pixel electrode side while the white particles migrate to the counter electrode side. Thus, the reflectance of the pixels is increased according to the applied time. However, as in the case of FIG. 36A, the reflectance in the applied state in the pw1 period becomes increased according to the extent of the voltage value.

Through changing the voltages to be applied in the set period by utilizing the characteristics of the particles described above, it is possible to perform gradation display. In a specific example shown in FIG. 36A, the state of displaying W (white) is changed to LG (light gray) display when +V1 is applied in pw1, changed to DG (dark gray) display when +V2 is applied in pw1, changed to B (black) display when +V3 is applied in pw1. Note here that the state of the B (black) display when +V3 is applied in pw1 is the black base state described above. Further, in a specific example shown in FIG. 36B, the state of displaying B (black) is changed to DG (dark gray) display when −V1 is applied in pw1, changed to LG (light gray) display when −V2 is applied in pw1, changed to W (white) display when −V3 is applied in pw1. Note here that the state of the W (white) display when −V3 is applied in pw1 is the white base state described above.

(Explanations of Driving Method)

The driving method according to the fourth exemplary embodiment will be described by referring to the accompanying drawings. Note that the positive/negative voltages used in the fourth exemplary embodiment such as +V1/−V1, +V2/−V2, and +V3/−V3 are of different polarities but have same values.

(Driving Example 4-1)

The driving method at the time of updating the image will be described by using the voltage waveforms applied to the pixels shown in FIG. 37 and the displayed images shown in FIG. 38. The image update period is constituted with a reset period (T0 to T3) where a previous image is erased and a set period (T3 to T4) where an image is written as shown in FIG. 37. FIG. 37-(a) is the waveform of the voltage applied to the pixel for displaying W (white). FIG. 37-(b) is the waveform of the voltage applied to the pixel for displaying LG (light gray). FIG. 37-(c) is the waveform of the voltage applied to the pixel for displaying DG (dark gray). FIG. 37-(d) is the waveform of the voltage applied to the pixel for displaying B (black).

This Driving Example is the method which sets all the pixels of the display unit to white display in the reset period, and applies an intended voltage to the intended pixels for a specific time (pw1) in the set period.

In the voltage waveform shown in FIG. 7, a negative stirring pulse 11 of −V3 is applied to all the pixels after applying a positive stirring pulse 10 of +V3 from T0 to T2 of the reset period in order to erase the displayed image and to stir the particles. In T2, as shown in FIG. 38, the pixels are turned to the white display state (white base state).

Next, the compensation pulse applied in the reset period T2 to T3 will be described. The compensation pulse is applied to zero the total DC component of each of the voltage waveforms shown in FIG. 37-(a) to FIG. 37-(d). In this Driving Example, the total DC component between T0 to T2 is 0 and, in the set period, a positive set pulse 60 of the voltage value corresponding to the display gradation is applied in the pw1 period. Thus, when a negative compensation pulse 51 of the same value as the value of the voltage applied in the set period is applied, the total DC component of the voltage waveforms becomes zero. Specifically, in the voltage waveform of FIG. 37-(a) applied to the pixels displaying W (white), the voltage value of the set pulse 60 is 0. Thus, the voltage value of the negative compensation pulse 51 is also 0, i.e., the compensation pulse is not applied. In the voltage waveform of FIG. 37-(b) applied to the pixels displaying LG (light gray), the voltage value of the set pulse 60 is +V1. Thus, the compensation pulse 51 of −V1 is applied. In the voltage waveform of FIG. 37-(c) applied to the pixels displaying DG (dark gray), the voltage value of the set pulse 60 is +V2. Thus, the compensation pulse 51 of −V2 is applied. In the voltage waveform of FIG. 37-(d) applied to the pixels displaying B (black), the voltage value of the set pulse 60 is +V3. Thus, the compensation pulse 51 of −V3 is applied.

That is, regarding the compensation pulse 51 used in the fourth exemplary embodiment, the period to be applied is the same value of period pw1 for all the compensation pulses but the voltage values to be applied are different depending on the compensation pulses, whereas the compensation pulses 20, 21 used in the first to third exemplary embodiments are of equal voltage values but the pulse widths thereof (applied periods) are different.

As described above, the negative compensation pulse 51 of the voltage value corresponding to the display gradation is applied in the reset period T2 to T3. However, due to the negative stirring pulse 11 applied immediately before, all the pixels are in white display state (white base state). Thus, the change in the display state is not visually recognized, and the pixels in T3 are in the white display state as in T2 as shown in FIG. 38.

At last, in the set period (T3 to T4), the set pulse 60 of the voltage value corresponding to the display gradation is applied. In this period, the intended pixels are in the intended gradation display state. Thereby, the image update is completed as shown in T4 of FIG. 38.

As described above, with the drive by using the voltage waveforms shown in FIG. 37, the display state is changed as in FIG. 38 at the time of updating the image, the inverted image of the updated image is not displayed, and the total DC component of the voltage waveform becomes zero. Since the inverted image is not displayed, there is no load imposed upon the user. Further, the total DC component of the voltage waveform applied at the time of updating the image is zero, so that it is possible to achieve the electrophoretic display device of a high image quality with which no afterimage and ghosting is generated.

Further, in Driving Example 4-1, between the voltage waveforms (specific example: FIG. 37) given to all the display gradations at the time of updating the image, the timing for supplying +V3 and the timing for supplying −V3 do not overlap with each other. Thus, the voltage of the data line does not change largely (e.g., from +V3 to −V3) in a short time, and the driving capacity of the data driver can be suppressed. Therefore, the power consumption and the cost can be lowered.

(Driving Example 4-2)

In the voltage waveforms of Driving Example 4-1, each of the voltage pulse applied to the pixels is shown as a pulse that includes the state of 0 V after applying the voltage for the sake of explanations. However, as described in the first exemplary embodiment, it is not essential for each of the voltage pulses to be in the state of 0 V after applying the voltage with the driving method of the present invention. As this Driving Example, FIG. 39 shows the voltage waveforms in which the state of 0 V after applying the voltage is omitted from the voltage waveforms of Driving Example 4-1.

Figure 39:
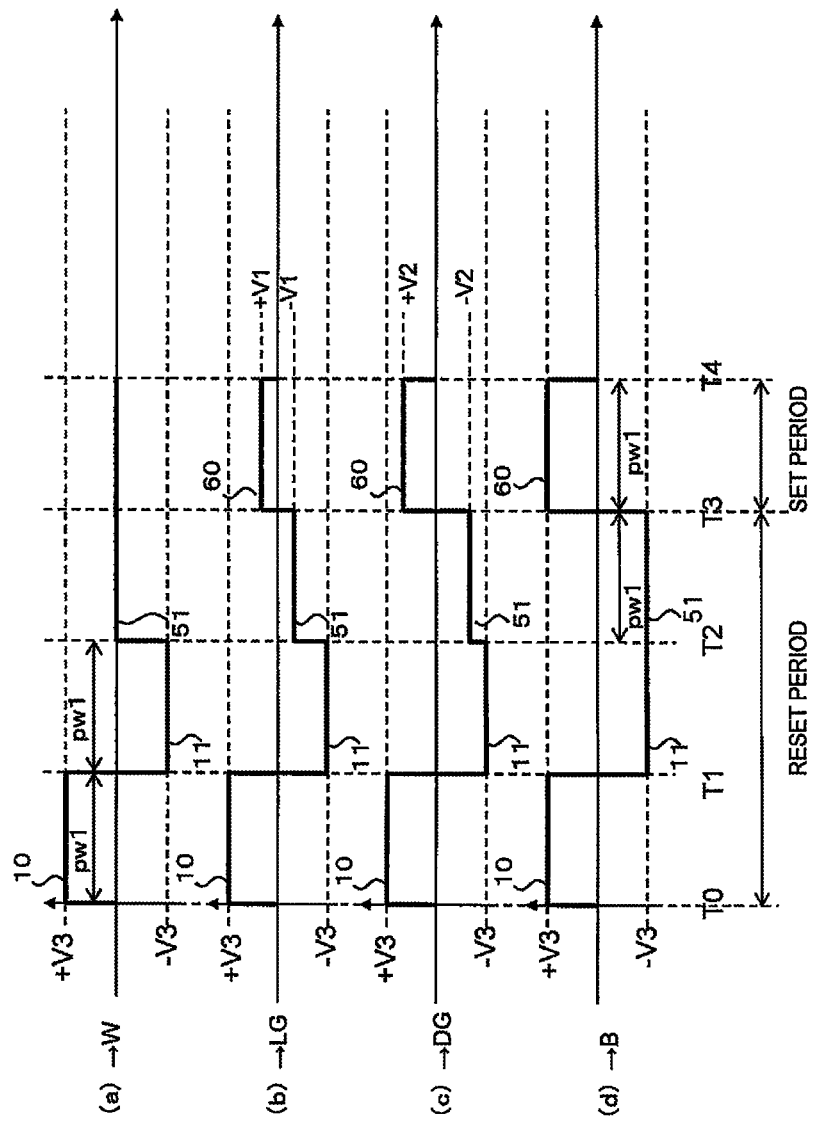
FIG. 39 is a chart showing voltage waveforms at the time of updating an image in Driving Example 4-2.

FIG. 39 shows the voltage waveforms in which the state of 0 V between each of the voltage pulses shown in FIG. 37 is omitted. For example, since the compensation pulse 51 is supplied immediately after the stirring pulse 11 as shown in FIG. 37-(d), the voltage is to be applied continuously. Thus, the voltage as the waveform is continuous. However, each of the pulses functions in the same manner as those of FIG. 37. Therefore, detailed explanations thereof will be omitted. Further, the display states in the process (T0, T1, - - - , T4) for updating the image are the same as the voltage waveforms of Driving Example 4-1 (FIG. 37), which are the displayed images shown in FIG. 38.

In FIG. 39, a direct voltage change is shown between the positive applied voltage and the negative applied voltage as the voltage waveform of the pixel. However, it is possible to lower the power consumption through dividing the changes in the voltage into the change from the negative voltage to 0 V and into the change from 0 V to the positive voltage by employing the concept described in Driving Example 1-1 by using FIG. 12 in the vertical blanking period. With Driving Example 4-2, the same effect as that of Driving Example 4-1 can be acquired. In addition, there is also an effect of completing the update of the image more quickly than the case of Driving Example 4-1, since the period for applying 0 V is omitted.

As described above, Driving Example 4-1 and Driving Example 4-2 are the driving methods in which the means for displaying the gradations and the means for compensating the total DC in the drive of the first exemplary embodiment are changed from the setting by using the pulse width to the setting by using the voltage value. Therefore, as in the relation between Driving Example 1-1 (FIG. 7) and Driving Example 1-3 (FIG. 15) of the first exemplary embodiment, the voltage waveforms of inverted polarities may be used. Further, as described in the first exemplary embodiment, it is also possible to achieve a high image quality through improving the capability of erasing the so-called history by adding the pair of positive and negative stirring pulses to increase the number of the stirring pulses.

(Driving Example 4-3)

Figure 40:
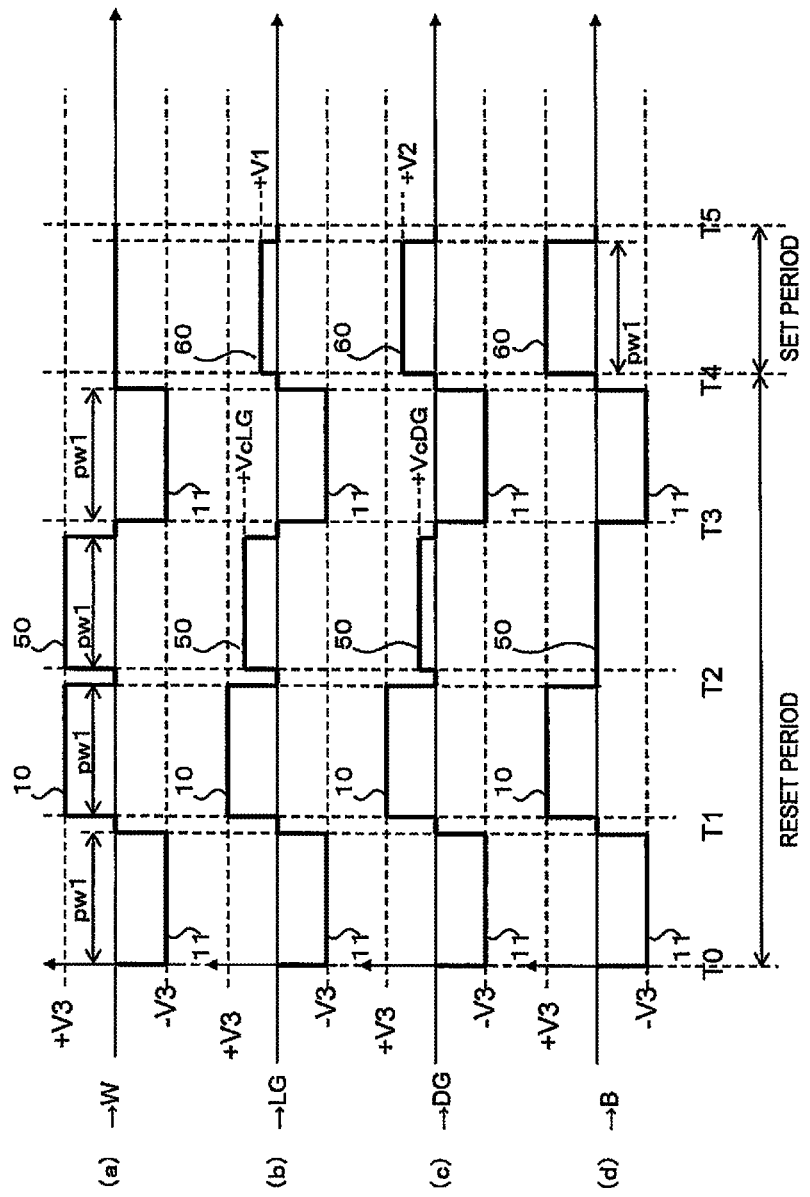
FIG. 40 is a chart showing voltage waveforms at the time of updating an image in Driving Example 4-3.
Figure 41:
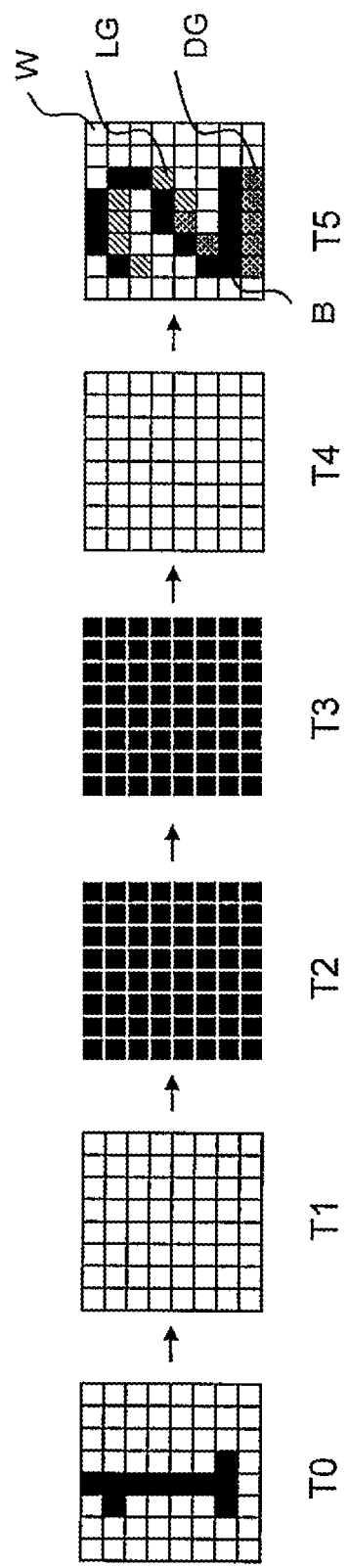
FIG. 41 is an illustration showing a displayed image at the time of updating the image in Driving Example 4-3.

FIG. 40 shows voltage waveforms of this Driving Example, and FIG. 41 shows displayed images. This Driving Example is a driving method in which the means for displaying the gradations and the means for compensating the total DC in the drive of the second exemplary embodiment are changed from the setting by using the pulse width to the setting by using the voltage value. Therefore, as described in the second exemplary embodiment, there are odd-number of stirring pulses in the reset period and the total DC component of the stirring pulses is not 0.

As in the case of the second exemplary embodiment, an expression for setting the total DC component as zero in the entire period of updating the image is established from the DC component of the stirring pulses within the reset period of this Driving Example, the DC component in the set period, and the DC component of the compensation pulse. Provided that the voltage value of the stirring pulse is V3, the voltage value of the set pulse is Vs, and the voltage value of the compensation pulse is Vc, a following expression applies from FIG. 40.

$$(-V3) \times pw1 + (+Vc) \times pw1 + (+Vs) \times pw1 = 0 \quad \text{Expression (9)}$$

When Expression (9) is arranged, the voltage value Vc of the compensation pulse in this Driving Example can be expressed as follows.

$$Vc = V3 - Vs \quad \text{Expression (10)}$$

Thus, when the compensation pulse of the positive voltage value determined by Expression (10) is applied, the total DC component of the voltage waveform becomes zero. Specifically, in each of the voltage waveforms shown in FIG. 40-(a) to FIG. 40-(d), the voltage values of the compensation pulses applied from T2 to T3 are determined as follows:

$$VcW = V3 - VsW = V3 \quad \text{Expression (11)} * VsW = 0$$

$$VcLG = V3 - VsLG = V3 - V1 \quad \text{Expression (12)}$$

$$VcDG = V3 - VsDG = V3 - V2 \quad \text{Expression (13)}$$

$$VcB = V3 - VsB = 0 \quad \text{Expression (14)} * VsB = V3$$

In this Driving Example, the compensation pulse 50 of the voltage values determined in the manner described above is applied in the reset period T2 to T3. However, all the pixels are in the black display state (black base state) by the positive stirring pulse 10 immediately before. Thus, the change in the display state by applying the compensation pulse is not visually recognized. As shown in FIG. 41, all the pixels in T3 are in the black display state as in the state of T2.

After applying the compensation pulse, the negative stirring pulse 11 is applied in the reset period T3 to T4 to make the pixels in the white display state. At last, the set pulse 60 of the voltage value corresponding to the display gradation is applied in the set period T4 to T5, so that the intended pixels are turned into the intended gradation display state. Thereby, the image update is completed as shown in T5 of FIG. 41.

As described above, with the drive by using the voltage waveforms shown in FIG. 40, the display state is changed as in FIG. 41 at the time of updating the image, the inverted image of the updated image is not displayed, and the total DC component of the voltage waveform becomes zero. Since the inverted image is not displayed, there is no load imposed upon the user. Further, the total DC component of the voltage waveform applied at the time of updating the image is zero, so that it is possible to achieve the electrophoretic display device of a high image quality with which no afterimage and ghosting is generated.

Further, in Driving Example 4-3, between the voltage waveforms (specific example: FIG. 40) given to all the display gradations at the time of updating the image, the timing for supplying +V3 and the timing for supplying −V3 do not overlap with each other. Thus, the voltage of the data line does not change largely (e.g., from +V3 to −V3) in a short time, and the driving capacity of the data driver can be suppressed. Therefore, the power consumption and the cost can be lowered.

Note that the state of 0 V between each of the voltage pulses shown in FIG. 40 can be omitted. With the voltage waveform where the state of 0 V is omitted, it is also possible to shorten the time for updating the image. Therefore, as in the relation between Driving Example 2-1 (FIG. 22) and Driving Example 2-2 (FIG. 24) described in the second exemplary embodiment, the voltage waveforms of inverted polarities may be used. Further, it is also possible to achieve a high image quality through improving the capability of erasing the so-called history by adding the pair of positive and negative stirring pulses to increase the number of the stirring pulses.

(Driving Example 4-4)

In Driving Examples from 4-1 to 4-3, the voltage values are adjusted while fixing the width of the compensation pulse to be applied as pw1 in order to zero the total DC component in the voltage waveforms applied at the time of updating the image. However, as shown in Expression (9), the total DC component is a result acquired by adding the products of the pulse width of each pulse and the voltage. Thus, it can be also adjusted by the pulse width. As a specific example, the voltage waveforms to be applied to the pixels are shown in FIG. 42 and FIG. 43.

Figure 42:
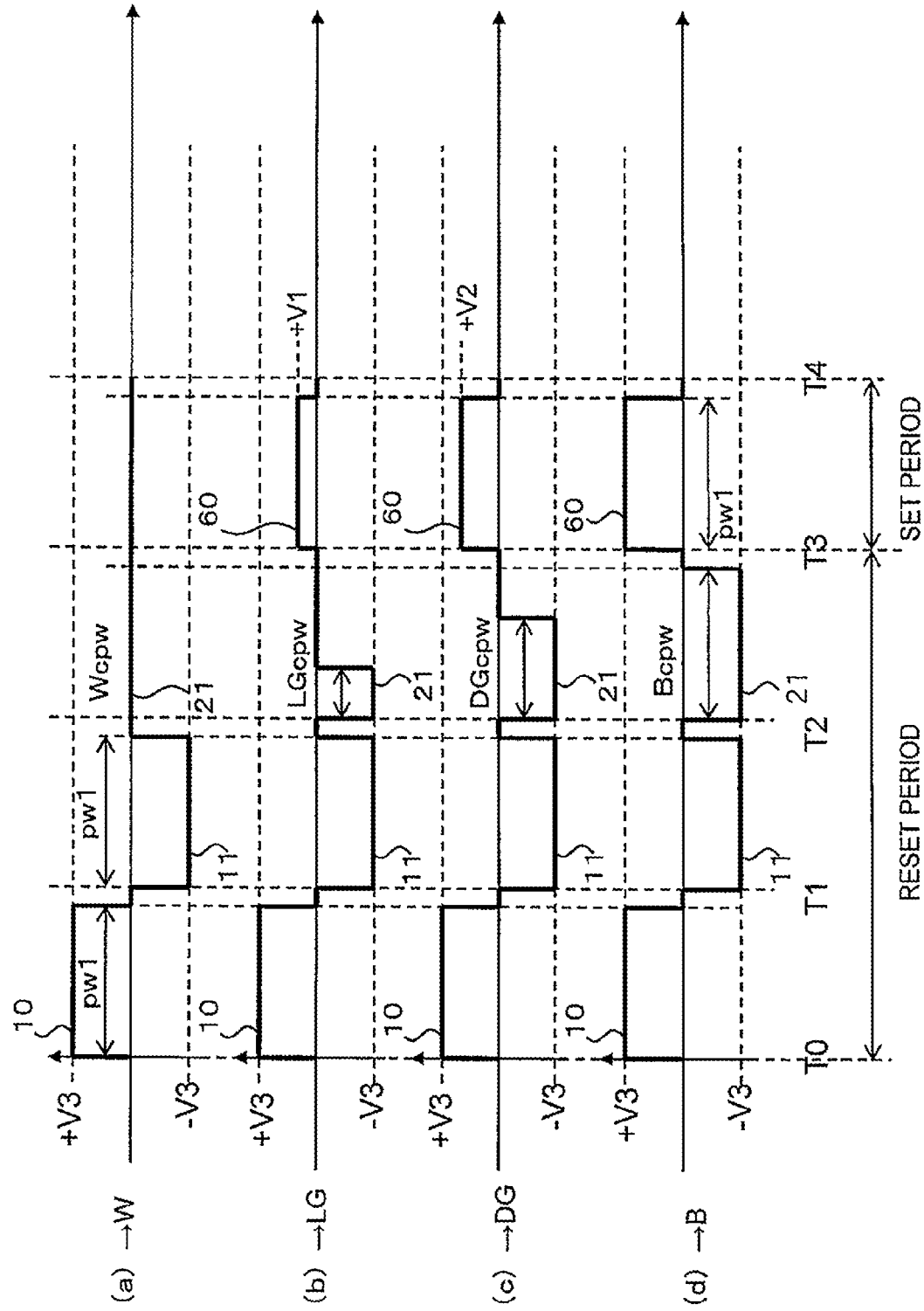
FIG. 42 is a chart showing voltage waveforms at the time of updating an image when Driving Example 4-4 is applied to Driving Example 4-1.
Figure 43:
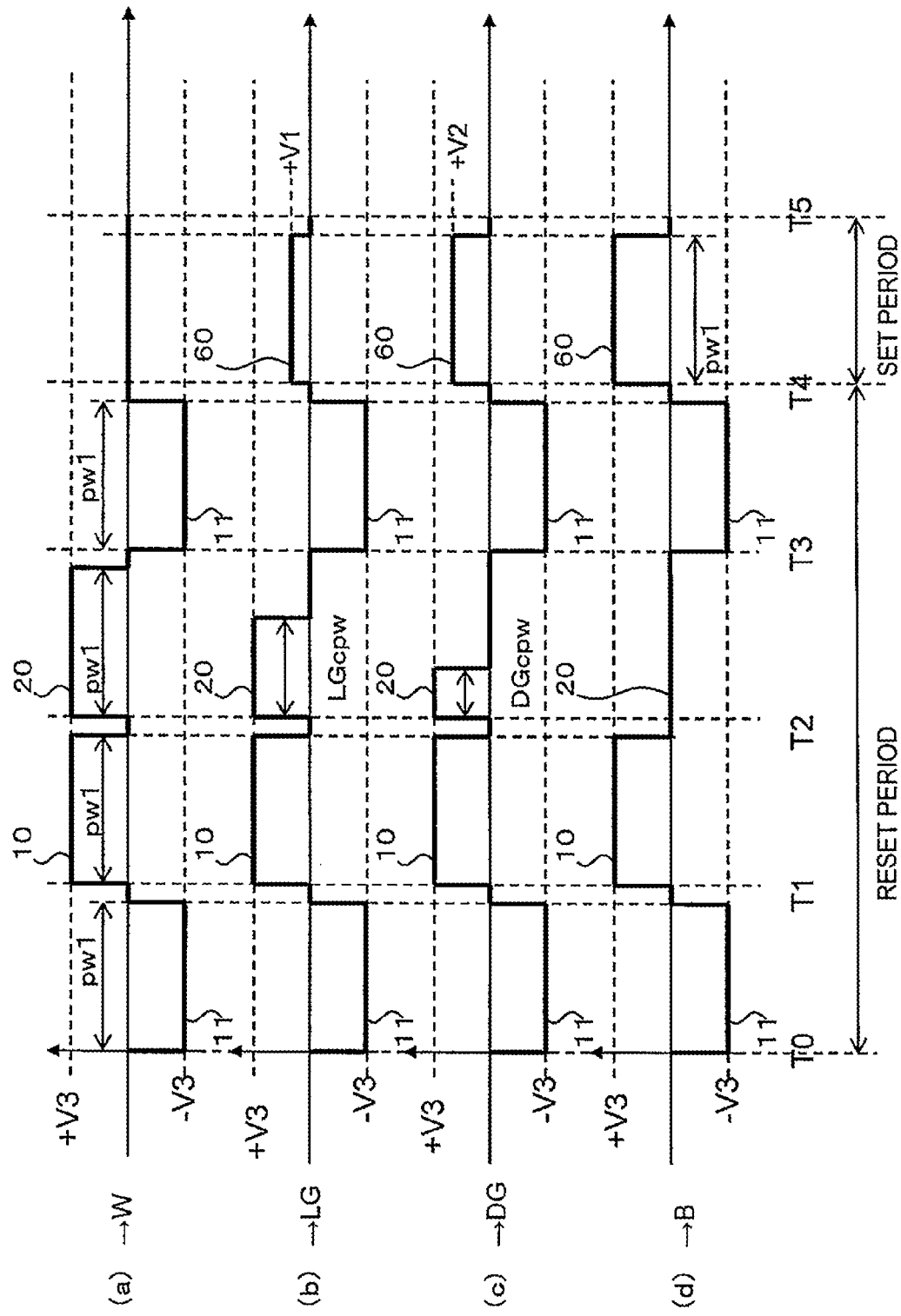
FIG. 43 is a chart showing voltage waveforms at the time of updating the image when Driving Example 4-4 is applied to Driving Example 4-1.

FIG. 42 is a driving example in which the voltage value of the compensation pulse is defined as −V3 and the pulse width cpw is adjusted in the voltage waveforms (FIG. 37) of Driving Example 4-1. In the voltage waveforms shown in FIG. 42, the DC component of the stirring pulses within the reset period is 0 since there are even-number of stirring pulses. When the voltage of the compensation pulse×pulse width is standardized as (−Vc)×cpw and the voltage of the set pulse×pulse width is standardized as (Vs)×spw, a following expression which zeros the total DC component in the entire period of updating the image applies:

$$(-Vc) \times cpw + (+Vs) \times spw = 0 \quad \text{Expression (15)}$$

Note here that the voltage value of the compensation pulse is defined as −V3. Based on the set pulse voltage of each of the display gradations and the set pulse width pw1, the widths of the compensation pulse 21 of the voltage waveforms shown in FIG. 42-(a) to FIG. 42-(d) are determined as follows:

$$Wcpw = (0/V3) \times pw1 = 0 \quad \text{Expression (16)} * VsW = 0$$

$$LGcpw = (V1/V3) \times pw1 \quad \text{Expression (17)}$$

$$DGcpw = (V2/V3) \times pw1 \quad \text{Expression (18)}$$

$$Bcpw = (V3/V3) \times pw1 = pw1 \quad \text{Expression (19)}$$

As described above, even when the compensation pulse 21 with the adjusted voltage and pulse width is applied, all the pixels are in white display state (white base state) due to the negative stirring pulse 11 applied immediately before. Thus, the change in the display state is not visually recognized. Therefore, the display images of the voltage waveforms of FIG. 42 are as in FIG. 38, which are the same as those of Driving Example 4-1. The voltage waveforms of FIG. 42 are same as those of Driving Example 4-1 except for the above-described compensation pulse 21, so that explanations thereof are omitted.

FIG. 43 is a Driving Example in which the voltage value of the compensation pulse is defined as −V3 and the pulse width cpw is adjusted in the voltage waveform (FIG. 40) of Driving Example 4-3. In the voltage waveform shown in FIG. 43, the DC component of the stiffing pulses within the reset period is (−V3)×pw1 since there are odd-number of stirring pulses. Assuming that the voltage of the compensation pulse×pulse width is (+Vc)×cpw and the voltage of the set pulse×pulse width is (Vs)×spw, a following expression which zeros the total DC component in the entire period of updating the image applies with the case of FIG. 43:

$$(-V3) \times pw1 + (+Vc) \times cpw + (+Vs) \times spw = 0 \quad \text{Expression (20)}$$

Note here that the voltage value of the compensation pulse is defined as +V3. Based on the set pulse voltage of each of the display gradations and the set pulse width pw1, the widths of the compensation pulse 20 of the voltage waveforms shown in FIG. 43-(a) to FIG. 43-(d) are determined as follows:

$$Wcpw=((V3-VsW)/V3) \times pw1=pw1 \quad \text{Expression (21)} \ast VsW=0$$

$$LGcpw=((V3-V1)/V3) \times pw1 \quad \text{Expression (22)}$$

$$DGcpw=((V3-V2)/V3) \times pw1 \quad \text{Expression (23)}$$

$$Bcpw=((V3-V3)/V3) \times pw1=0 \quad \text{Expression (24)}$$

As described above, even when the compensation pulse 20 with the adjusted voltage and pulse width is applied, all the pixels are in black display state (black base state) due to the positive stirring pulse 10 applied immediately before. Thus, the change in the display state is not visually recognized. Therefore, the display images of the voltage waveforms of FIG. 43 are as in FIG. 41 that are the same as those of Driving Example 4-3. The voltage waveforms of FIG. 43 are same as those of Driving Example 4-3 except for the above-described compensation pulse, so that explanations thereof will be omitted.

As described above by referring to FIG. 42 and FIG. 43, with the method which changes the applied voltage as a means for displaying the gradations, it is possible to prevent the inverted image of the update image from being displayed and to zero the total DC component of the voltage waveforms through adjusting the voltage and the pulse width of the compensation pulse. Since the inverted image is not displayed, there is no load imposed upon the user. Further, the total DC component of the voltage waveform applied at the time of updating the image is zero, so that it is possible to achieve the electrophoretic display device of a high image quality with which no afterimage and ghosting is generated.

Further, with the method that changes the voltage value of the set pulse as the means for displaying the gradations, a voltage value other than the voltage value used for the set pulse is required as the voltage value of the compensation pulse which zeros the total DC component as in the case of Driving Example 4-3, for example. In general, as the output voltage value is increased, the cost of the data driver is increased. Thus, this Driving Example has an effect of reducing the cost compared to the case of Driving Example 4-3.

Further, the Driving Example 4-4, between the voltage waveforms (specific example: FIG. 42) given to all the display gradations at the time of updating the image, the timing for supplying +V3 and the timing for supplying −V3 do not overlap with each other. Thus, the voltage of the data line does not change largely (e.g., from +V3 to −V3) in a short time, and the driving capacity of the data driver can be suppressed. Therefore, the power consumption and the cost can be lowered.

Note that the state of 0 V between each of the voltage pulses shown in FIG. 42 and FIG. 43 can be omitted. With the voltage waveform where the state of 0 V is omitted, it is also possible to shorten the time for updating the image. Therefore, as in the relation between Driving Example 2-1 (FIG. 22) and Driving Example 2-2 (FIG. 24) described in the second exemplary embodiment, the voltage waveforms of inverted polarities may be used. Further, it is also possible to achieve a high image quality through improving the capability of erasing the so-called history by adding the pair of positive and negative stirring pulses to increase the number of the stirring pulses.

(Driving Example 4-5)

Figure 44:
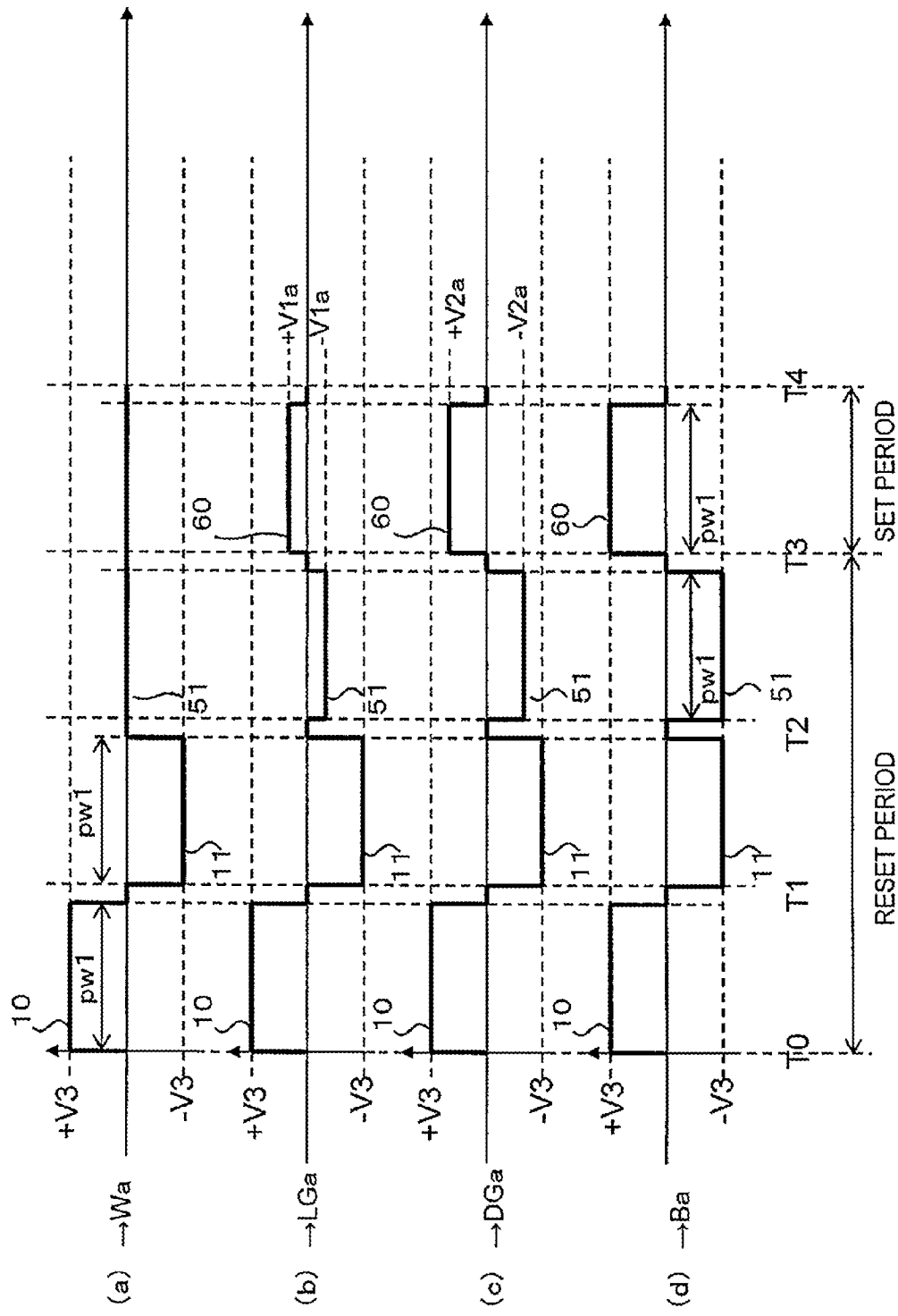
FIG. 44 is a chart showing voltage waveforms of the pixel a at the time of updating an image in Driving Example 4-5.
Figure 45:
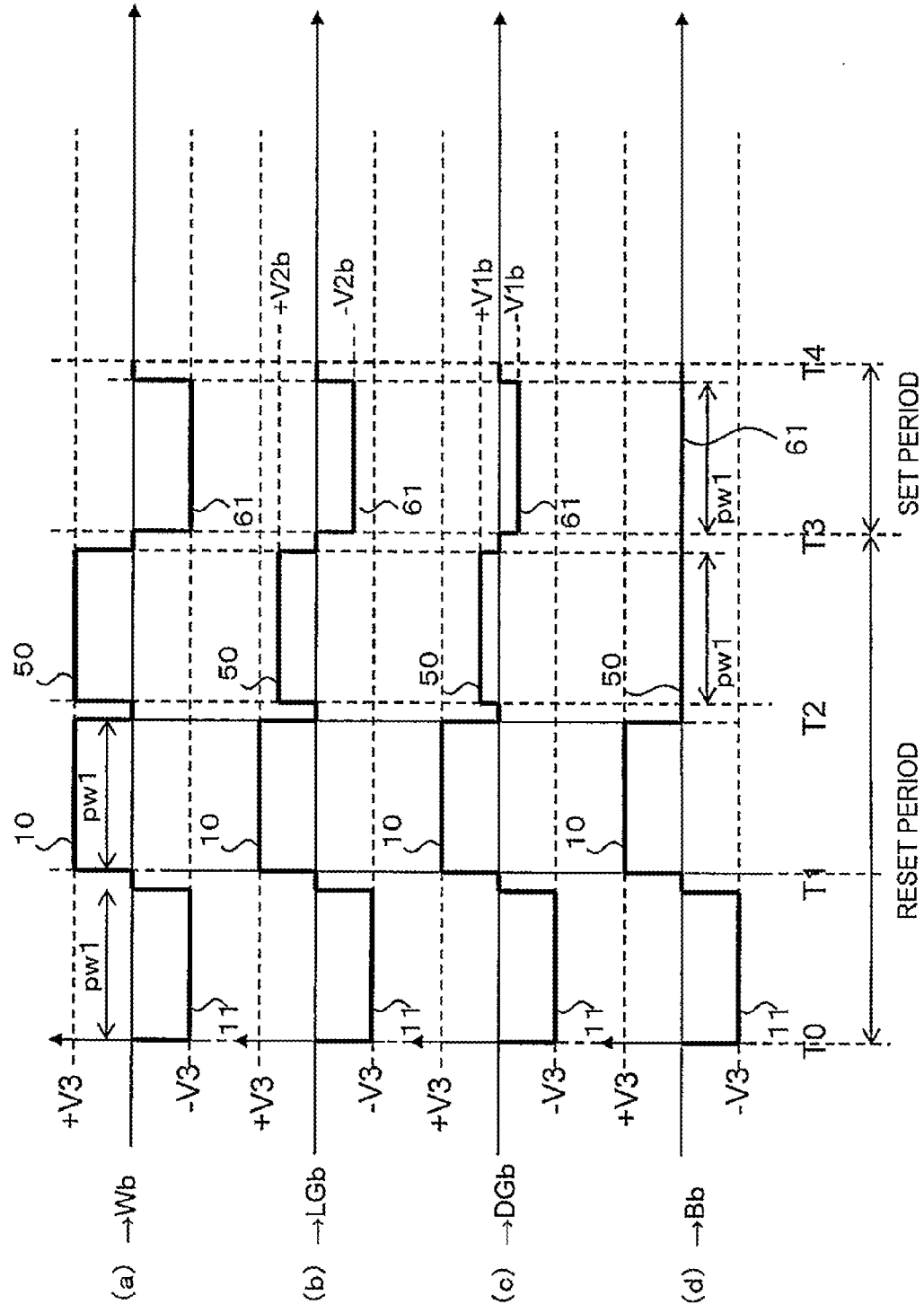
FIG. 45 is a chart showing voltage waveforms of the pixel b at the time of updating an image in Driving Example 4-5.

As described in the third exemplary embodiment, with this Driving Example, a plurality of pixels of the display unit are divided into a group of pixels a as a first region and a group of pixels b as a second region, and different voltage waveforms are applied to each region (pixels a/pixels b) when updating the image. The voltage waveforms applied to the pixels a in this Driving Example are shown in FIG. 44, and the voltage waveforms applied to the pixels b are shown in FIG. 45.

This Driving Example is a driving method in which the means for displaying the gradations and the means for compensating the total DC by using the applied time of the pulse in Driving Example 3-1 of the third exemplary embodiment are changed to the means for displaying the gradations and the means for compensating the total DC executed by using the applied voltage value of the pulse. Therefore, the displayed images are same as those (FIG. 30) of Driving Example 3-1. Furthermore, for the driving method of the pixels a and the pixels b shown in FIG. 44 and FIG. 45, the driving example described in Driving Example 4-1 is employed. Thus, the detailed explanations thereof will be omitted.

With this Driving Example, the same effect as those of Driving Example 3-1 of the third exemplary embodiment can be acquired. The concept of a modification example of Driving Example 3-1 described in the third exemplary embodiment can be employed to this Driving Example by replacing the means for displaying the gradations and the means for compensation by the applied time with the means for displaying the gradations and the means for compensation by the applied voltage value. Further, regarding the means for compensation described above, it is also possible to employ the adjustment of the pulse width, i.e., the means for compensation by the applied time, as described in Driving Example 4-4.

(Driving Example 4-6)

Figure 46:
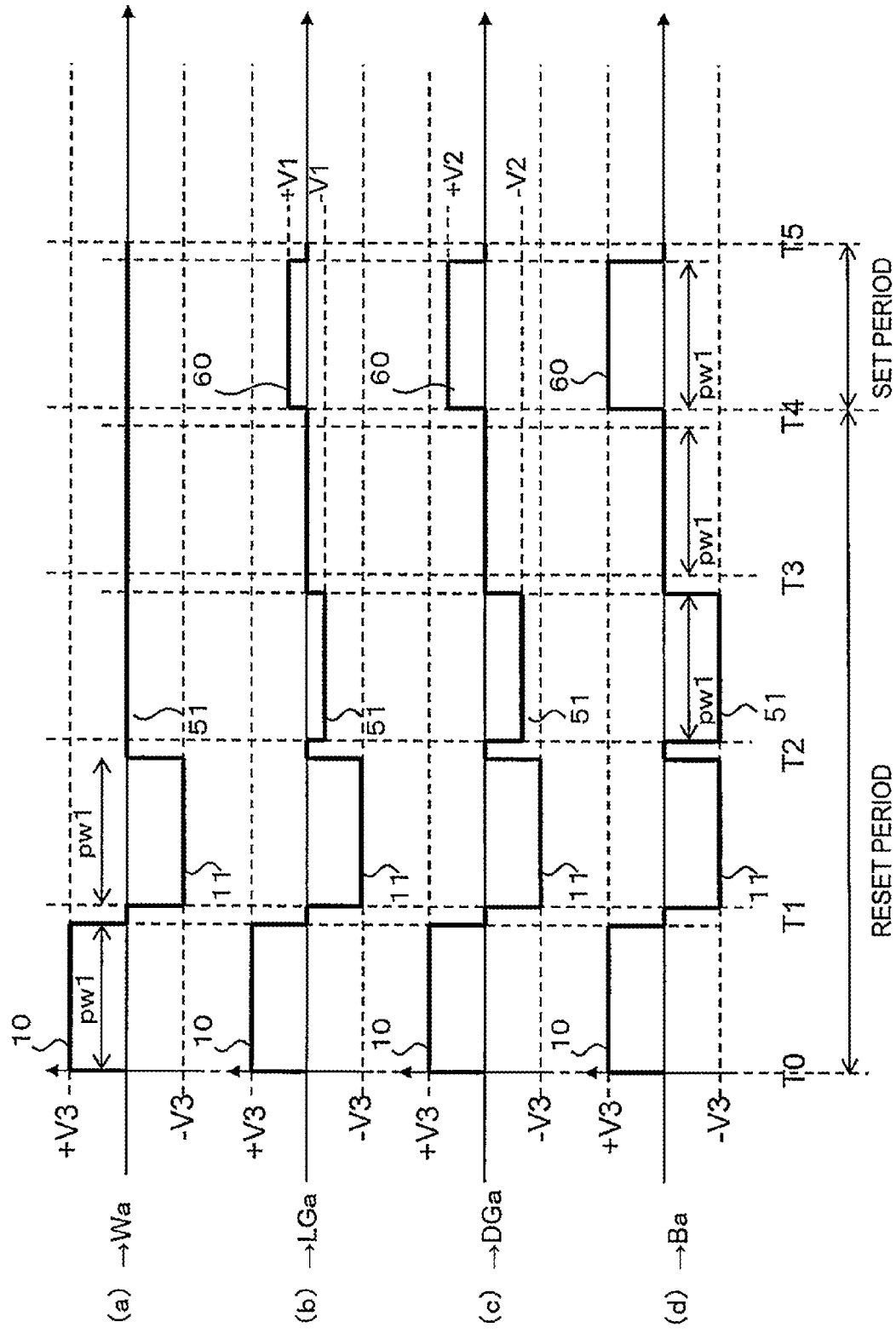
FIG. 46 is a chart showing voltage waveforms of the pixel a at the time of updating an image in Driving Example 4-6.
Figure 47:
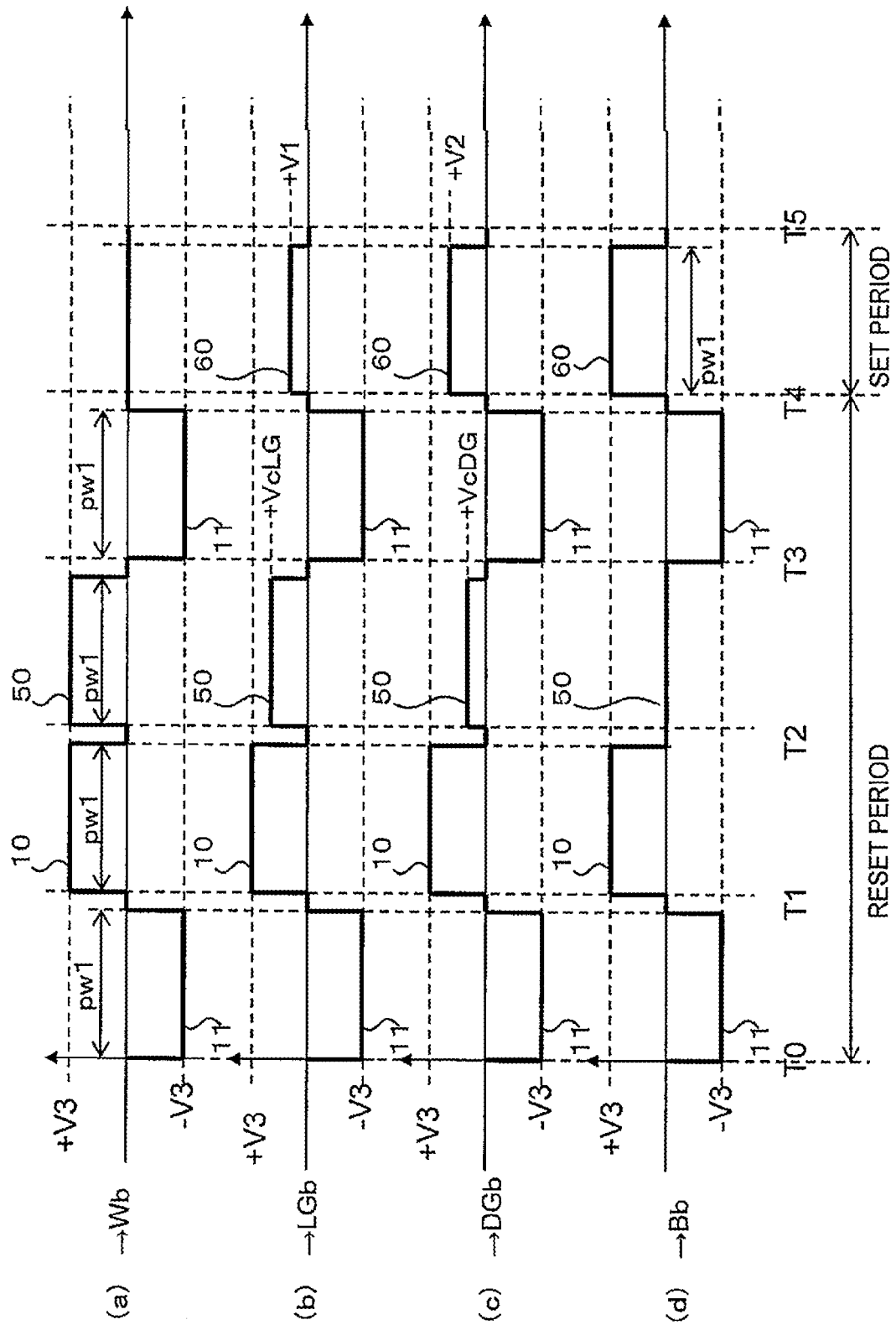
FIG. 47 is a chart showing voltage waveforms of the pixel b at the time of updating an image in Driving Example 4-6.

This Driving Example is a driving method in which the means for displaying the gradations and the means for compensating the total DC by using the applied time of the pulse in Driving Example 3-2 of the third exemplary embodiment are changed to the means for displaying the gradations and the means for compensating the total DC by using the applied voltage value of the pulse. The voltage waveforms applied to the pixels a in Driving Example 4-5 are shown in FIG. 46, and the voltage waveforms applied to the pixels b are shown in FIG. 47. The displayed images are same as those shown in FIG. 33 of Driving Example 3-2.

As shown in FIG. 46 and FIG. 47, the driving waveform of the pixels a in this Driving Example is the waveform in which the pulse of 0 V is added between T3 and T4 of Driving Example 4-1. For the driving waveform of the pixels b, the waveform of Driving Example 4-3 is employed. Therefore, the detailed explanations thereof are omitted.

With this Driving Example, it is possible to achieve the same effects as those of Driving Example 3-2 of the third exemplary embodiment.

To omit the state of 0 V between each of the voltage pulses, to add the stirring pulse, and the like as the modification example of Driving Example 3-2 described in the third exemplary embodiment can be applied to this Driving Example by replacing the means for displaying the gradations and the means for compensation by the applied time with the means for displaying the gradations and the means for compensation by the applied voltage value. Further, regarding the means for compensation described above, it is also possible to employ the adjustment of the pulse width, i.e., the means for compensation by the applied time, as described in Driving Example 4-4.

While the structures and the driving method of the fourth exemplary embodiment have been described above, the structures and the driving method are not limited to those. Changes in the design are tolerated within the range not departing from the content described as applicable in the first exemplary embodiment and the concept of the fourth exemplary embodiment.

(Fifth Exemplary Embodiment)
(Explanations of Structure)

A fifth exemplary embodiment provides a driving method which lowers the power consumption with patterns in which the pixels of the display unit described already in the third exemplary embodiment are divided into groups of pixels of the first and second regions regardless of the divided patterns. Thus, the structures to be employed in each of the Driving Examples are to be referred as the structures thereof, and explanations thereof are omitted.

(Explanations of Driving Methods)

The driving method according to the fifth exemplary embodiment will be described by referring to the accompanying drawings. The fifth exemplary embodiment is a driving method which divides a plurality of pixels of the display unit into a group of pixels a as the first region and a group of pixels b as the second region, and applies different voltage waveforms for each of the regions (pixels a/pixels b) when updating the image. This is the driving method which makes it possible to lower the power consumption in the pattern layout (e.g., FIG. 27B and FIG. 27C) in which the group of the pixels a and the group of the pixels b are connected to the same data line.

(Driving Example 5-1)

Figure 48:
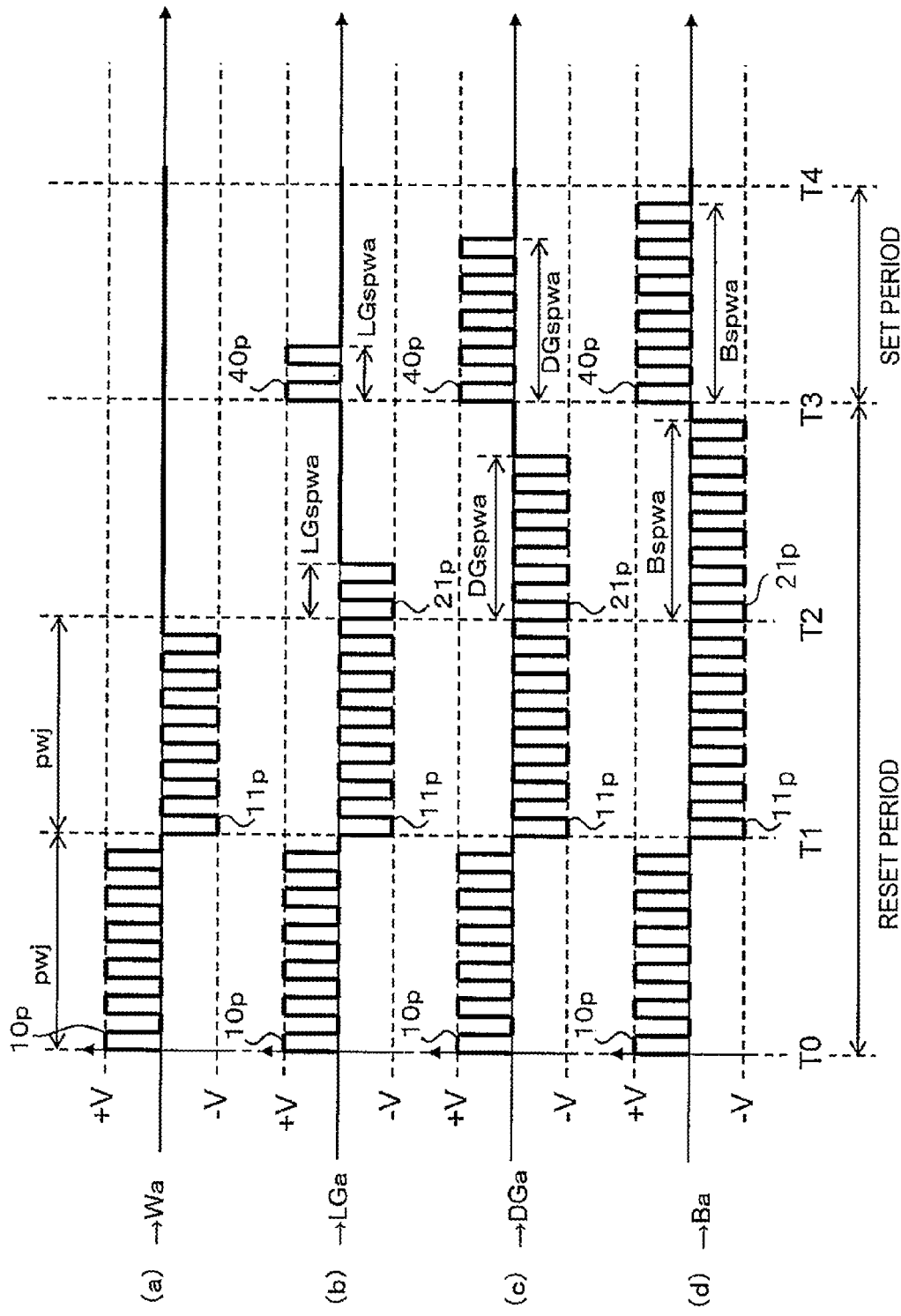
FIG. 48 is a chart showing voltage waveforms of the pixel a at the time of updating an image in Driving Example 5-1.
Figure 49:
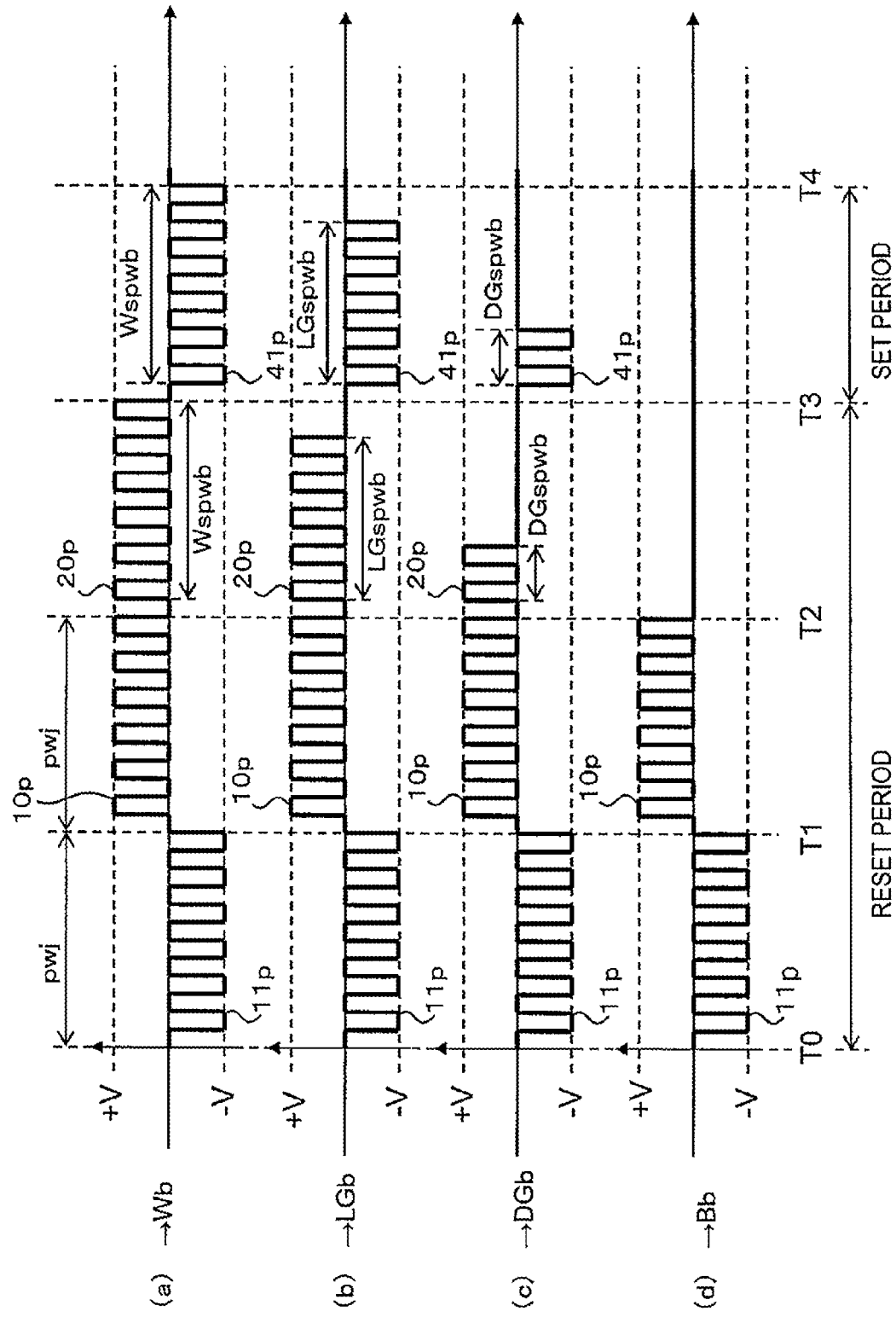
FIG. 49 is a chart showing voltage waveforms of the pixel b at the time of updating an image in Driving Example 5-1.

Driving Example 5-1 is designed to lower the power consumption of Driving Example 3-1 of the third exemplary embodiment. The voltage waveforms to be applied to the pixels a are shown in FIG. 48, and the voltage waveforms to be applied to the pixels b are shown in FIG. 49. FIG. 48-(*a*) and FIG. 49-(*a*) are the waveforms of the voltages applied to the pixels a and the pixels b for displaying white (Wa/Wb). FIG. 48-(*b*) and FIG. 49-(*b*) are the waveforms of the voltages applied to the pixels a and the pixels b for displaying light gray (LGa/LGb). FIG. 48-(*c*) and FIG. 49-(*c*) are the waveforms of the voltages applied to the pixels a and the pixels b for displaying dark gray (DGa/DGb). FIG. 48-(*d*) and FIG. 49-(*d*) are the waveforms of the voltages applied to the pixels a and the pixels b for displaying black (Ba/Bb).

As shown in FIG. 48 and FIG. 49 and as in the other exemplary embodiments, the image update period is constituted with a reset period (T0 to T3) where a previous image is erased and a set period (T3 to T4) where an image is written. Further, the function of the voltage pulse supplied between T0 to T1, T1 to T2, and T2 to T3 within the reset period and the function of the voltage pulse supplied in the set period (T3 to T4) are the same as those of Driving Example 3-1 (FIG. 28 and FIG. 29). Therefore, the changes in the display state at each timing (T0, T1, - - - , T4) at the time of updating the image are the same as those of Driving Example 3-1. The displayed images of this Driving Example are as in FIG. 30, when the pattern layout of the pixels a and the pixels b is as in FIG. 27C.

The difference of this Driving Example with respect to Driving Example 3-1 is that the stirring pulse, the compensation pulse, and the set pulse are time-divided so that the pulses of opposite polarities applied to the group of the pixels a and the group of the pixels b do not overlap with each other.

In T0 to T1 of the reset period, a group of the positive pulses 10*p* are applied to the pixels a (FIG. 48), and a group of the negative pulses 11*p* are applied to the pixels b (FIG. 49) in order to erase the displayed image and to stir the particles. Those groups of the pulses are applied in such a manner that the applied voltage to the group of the pixels b becomes 0 when the applied voltage to the group of the pixels a by the positive pulses 10*p* becomes +V, and the applied voltage to the group of the pixels a becomes 0 when the applied voltage to the group of the pixels b by the negative pulses 11*p* becomes −V. Through intermittently applying the pulses in the period of pwj, the pixels a are turned into a black display state (black base state) and the pixels b are turned into a white display state (white base state) as shown in T1 of FIG. 30.

Compared to the case of Driving Example 3-1, apply of the group of the positive pulses 10*p* to the pixels a in the period of pwj causes the same change in the display state as in the case of applying the positive stiffing pulse 10 of the pulse width pw1 in Driving Example 3-1 (T0 to T1 of FIG. 28), and apply of the group of the negative pulses 11*p* to the pixels b in the period of pwj causes the same change in the display state as in the case of applying the negative stirring pulse 11 of the pulse width pw1 in Driving Example 3-1 (T0 to T1 of FIG. 29). That is, the group of the plus pulses 10*p* in the period pwj function in the same manner as that of the positive stirring pulse 10 of the pulse width pw1, and the group of the negative pulses 10*p* in the period pwj function in the same manner as that of the positive stirring pulse 10 of the pulse width pw1. For the positive pulse 10*p* and the negative pulse 11*p*, the extent of the voltages, the pulse widths, and the numbers thereof contained in the period pwj are set to be equivalent.

Figure 50:
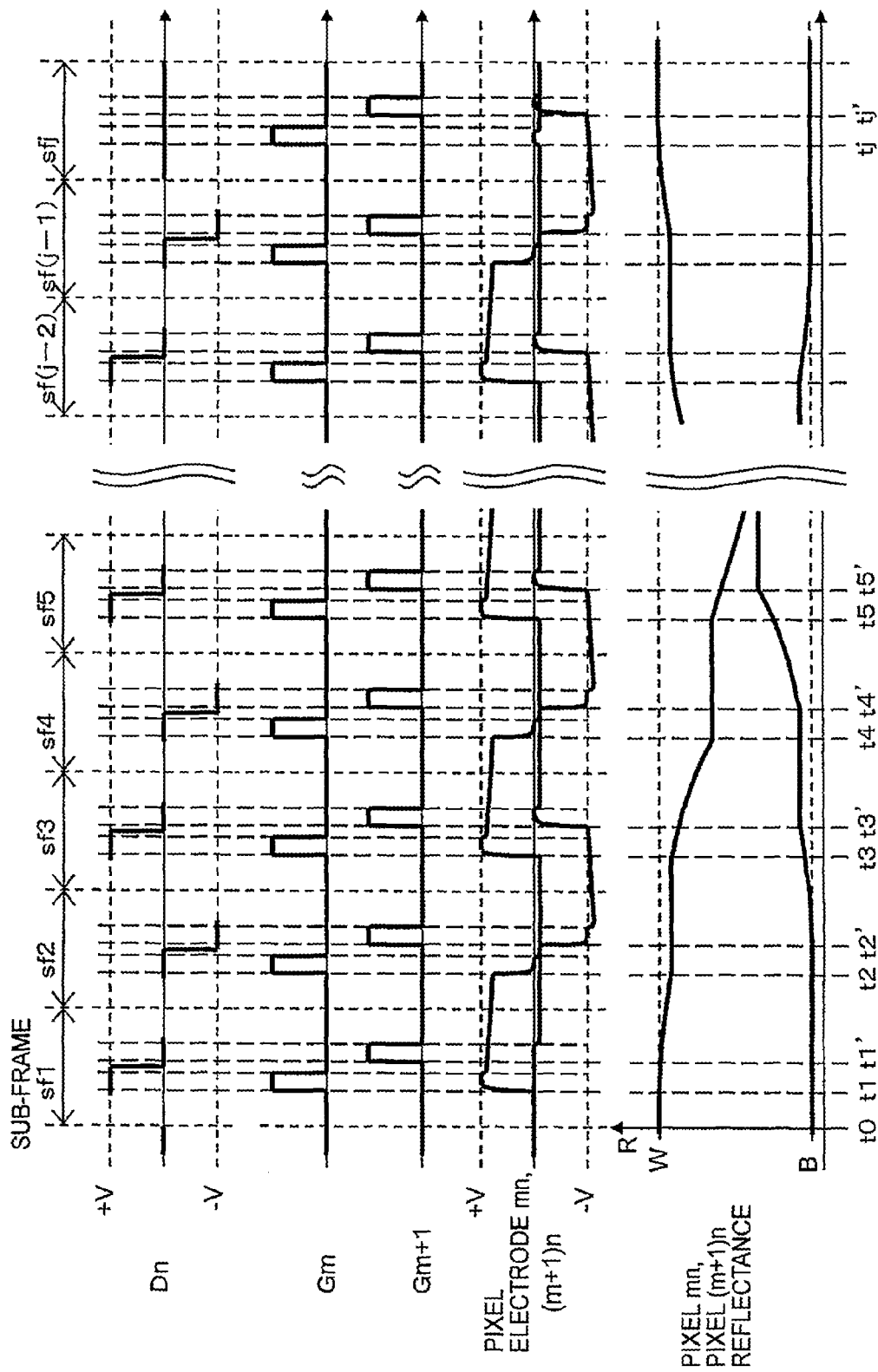
FIG. 50 is a timing chart showing characteristic changes in the voltage on a data line in Driving Example 5-1.

Regarding the writing of the voltages to the pixel electrode by intermittently applying the pulses and the changes in the reflectance of the pixels will be described in details by referring to FIG. 50. FIG. 50 shows an example in which the pixel mn is changed from the white display state (W) to the black display state (B), and the pixel (m+1)n from the black display state (B) to the white display state (W) by writing the voltages from the sub-frame sf1 to the sub-frame sfj. At t0, the white particles of the pixel mn stay on the display surface side, the white pixels of the pixel (m+1)n stay on the pixel electrode side, the black particles of the pixel mn stay on the pixel electrode side, and the black pixels of the pixel (m+1)n stay on the display surface side.

When +V is written to the pixel electrode 106-*mn* from the data line Dn at t1 of the sub-frame sf1, as in the explanation of FIG. 5, the voltage of the gate line Gm rises, the voltage of almost +V is held by the storage capacitance even after the TFT is set off, and the reflectance of the pixel mn starts to decrease. At t1', the data line Dn is set as 0 V, and 0 V is written to the pixel electrode 106-(*m*+1)n. Thus, the reflectance of the pixel (m+1)n does not change.

At t2 of the sub-frame sf2, the data line Dn is set as 0 V, and 0 V is written to the pixel electrode 106-*mn*. Thus, the change in the reflectance of the pixel mn stops. In the meantime, at t2', −V is written to the pixel electrode 106-(*m*+1)n. Thus, the reflectance of the pixel (m+1)n starts to increase.

At t3 of the sub-frame sf3, +V is written to the pixel electrode 106-*mn*. Thus, the reflectance of the pixel mn starts to decrease again. In the meantime, at t3', 0 V is written to the pixel electrode 106-(*m*+1)n. Thus, the change in the reflectance of the pixel (m+1)n stops.

After sf3, as described above, through repeatedly applying the voltages of +V/0 V and 0 V/−V to the pixel electrode 106-*mn* and the pixel electrode 106-(*m*+1)n by each of the sub-frames, the pixel mn changes to the black base state and the pixel (m+1)n changes to the white base state in the sub-frame sfj. The time from the sub-frame sf1 to sfj for turning to the base states is used as pwj.

The time pwj for turning to the base state by applying the pulse intermittently changes depending on the applied voltage and the particle characteristic, and it is determined as appropriate depending on those. Further, as described in the first exemplary embodiment (FIG. 6), the pixels can be set to an intended display state by not applying the voltage of +V or −V in the sub-frame before turning to the base state but by applying 0 V. In the set period to be described later, the period for applying a group of the set pulses 40p or 41p is determined in the manner described above.

The voltage waveforms of the pixel electrode 106-mn shown in FIG. 50 correspond to the voltage waveforms of the pixel a shown from T0 to T1 of FIG. 48, and the voltage waveforms of the pixel electrode 106-(m+1)n shown in FIG. 50 correspond to the voltage waveforms of the pixel b shown from T0 to T1 of FIG. 49.

Between T1 and T2, the group of the pulses 11p functioning as the negative stirring pulses are applied to the pixels a and the group of the pulses 10p functioning as the positive stirring pulses are applied to the pixels in the period of pwj. Since the voltages of opposite polarities from those of T0 to T1 are applied to the pixels a and the pixels b, the display state is turned to white/black display pixels (white/black base state) because the black/white display pixels of T1 are inverted as shown in T2 of FIG. 30.

Then, in the reset period T2 to T3, a group of pulses of the same polarity as a group of pulses functioning as the stirring pulse applied immediately before are applied to function as the compensation pulse. That is, a group of negative pulses 21p are applied to the pixels a, and a group of positive pulses 20p are applied between each of the waveforms in such a manner that the pixel b is 0 V when the pixel a is −V and the pixel b becomes +V when the pixel a is 0 V. Note here that the total DC component of the group of pulses functioning as the compensation pulse in T0 to T2 is 0, so that the period for applying the group of pulses 21p and the group of pulses 20p functioning as the compensation pulses are aligned with the period for applying the group of set pulses 40p and the group of pulses 41p applied according to the display gradations in the set period. For example, in the voltage waveform of LGa in FIG. 48, the period for applying the group of negative pulses 21p is set as LGspwa by being aligned with the period for applying the group of pulses 40p in the set period. Further, for example, in the voltage waveform of DGb in FIG. 49, the period for applying the group of positive pulses 20p is set as DGspwb by being aligned with the period for applying the group of pulses 41p in the set period. Since the group of the pulses functioning as the compensation pulse is applied as described above after all the pixels a and the pixels are turned into the white/black base state in T2, the change in the display state is not visually recognized. As shown in FIG. 30, the image in T3 is a white/black display as in T2 in which white and black are displayed alternately for each pixel vertically and laterally.

At last, in the set period T3 to T4, the group of the pulses 40p and the group of pulses 41p functioning as the set pulses of +V and −V are applied to the pixels a and the pixels b in the period corresponding to the intended display gradations. As in the case of the above-described stirring pulse and the group of pulses functioning as the compensation pulse, the group of the pulses are applied in such a manner that the pixel b is 0 V when the pixel a is +V and the pixel b is −V when the pixel a is 0 V.

Figure 51:
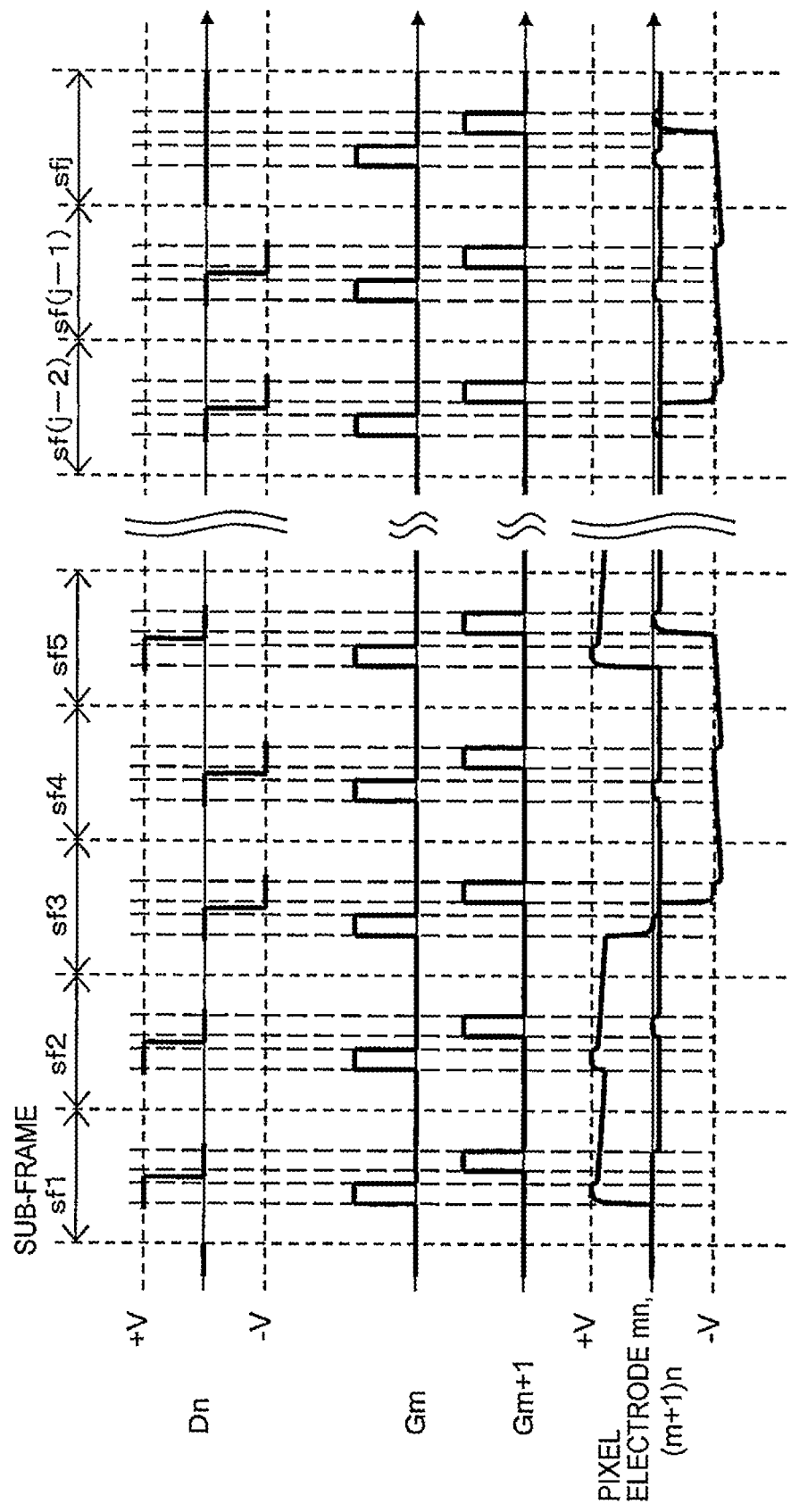
FIG. 51 is a chart showing driving waveforms according to a fifth exemplary embodiment.

As described above, through applying the voltages to the group of the pixels a and the group of pixels b by the time-divided pulses, the changes in the voltages of the data line can be suppressed to the change between +V and 0 V and the change between −V and 0 V even in the pattern layout where the pixels a and the pixels b are connected to the same data line. This makes it possible to lower the power consumption. The minimum unit for time-dividing each pulse shown in FIG. 48 and FIG. 49 is a unit of sub-frame, and each divided pulse width can be determined as appropriate according to the response characteristic of the particles and the sub-frame period. While the example of applying the voltages to the pixels a and the pixels b in a time division manner of a unit of one sub-frame is shown in FIG. 50, it is also possible to apply the voltages repeatedly in a unit of two sub-frames as shown in FIG. 51, for example.

As in the effect acquired in Driving Example 3-1, in addition to the effect of having no afterimage and ghosting that may be caused due to the fact that the total DC component of the voltage waveforms is zero, this Driving Example is capable of achieving the effect of having no so-called flashing where the entire display unit changes from white to black or from black to white in the reset period so that the load for the user can be lightened further, since the polarities of the pulses functioning as the stirring pulses applied in the reset period are inverted for the pixels a and the pixels b.

Further, with this Driving Example, it is also possible to suppress the changes in the voltages of the data line to the change between +V and 0 V and the change between −V and 0 V even in the pattern layout where the pixels a and the pixels b are connected to the same data line through applying the voltages to the group of the pixels a and the group of pixels b by the time-divided pulses (specific example: FIG. 48 and FIG. 49). This makes it possible to lower the power consumption and the cost.

The concept of this Driving Example is to suppress the changes in the voltages of the data line to the change between +V and 0 V and the change between −V and 0 V even in the pattern layout where the pixels a and the pixels b are connected to the same data line through applying the voltages to the group of the pixels a and the group of pixels b by the time-divided pulses. It is also possible to lower the power consumption and the cost by employing this concept to Driving Example 4-5 and Driving Example 4-6 of the fourth exemplary embodiment.

While the structures and the driving method of the fifth exemplary embodiment have been described above, the structures and the driving method are not limited to those. Changes in the design are tolerated within the range not departing from the content described as applicable in the first exemplary embodiment and the concept of the fifth exemplary embodiment.

(Sixth Exemplary Embodiment)

In the first to fifth exemplary embodiments, only the Driving Examples in which the voltage supplied to the counter electrode (and each storage line) is fixed are described. However, the present invention can also be employed to the so-called common inversion drive with which the voltage of the counter electrode is changed as appropriate. Hereinafter, a sixth embodiment of the present invention in which the common inversion drive is employed will be described.

With the common inversion drive, the output voltage width of the data driver can be reduced by supplying a bias voltage to the counter electrode as appropriate. Thus, it is possible to lower the power consumption. For example, in the first exemplary embodiment, the counter electrode is set to be in a constant voltage of 0 V (strictly speaking, the adjustment voltage taking the feedthrough voltage into account is set as constant) by using the data driver which outputs +V, 0, and −V and the voltages of +V, 0, and −V are applied to the pixels. However, it is also possible to apply the voltages of +V, 0, and −V to the pixels by using a data driver having output of two values which outputs +V and 0 by changing the voltage of the counter electrode as 0 or +V as appropriate. Specifically, by setting the counter electrode as 0 and outputting +V from the data driver, +V can be applied to the pixels. By setting the counter electrode as 0 and outputting 0 from the data driver or by setting the counter electrode as +V and outputting +V from the data driver, 0 can be applied to the pixels. By setting the counter electrode as +V and outputting 0 from the data driver, −V can be applied to the pixels.

Looking at it from another point of view, with the common inversion drive, the voltage applied to the pixels defined as the voltage of the pixel electrode with respect to the counter electrode can be made as the maximum output voltage width of the data driver or larger. Thus, to employ the common inversion drive can prevent the increases in the size, the power consumption, and the cost that may be caused in general when the data driver that can correspond to high voltages is employed.

(Explanations of Structures and Driving Method)

The electrophoretic display device according to the sixth exemplary embodiment is different from those of the other exemplary embodiments in respect that the display controller included in the "voltage applying unit" is provided with a function which changes the voltage (referred to as common voltage hereinafter) supplied to the counter electrode and each storage line (Vst in FIG. 3). While specific example of the structures and the driving method will be described hereinafter, explanations of the components same as those of the other exemplary embodiments will be omitted.

(Structural Example 6-1)

Figure 52:
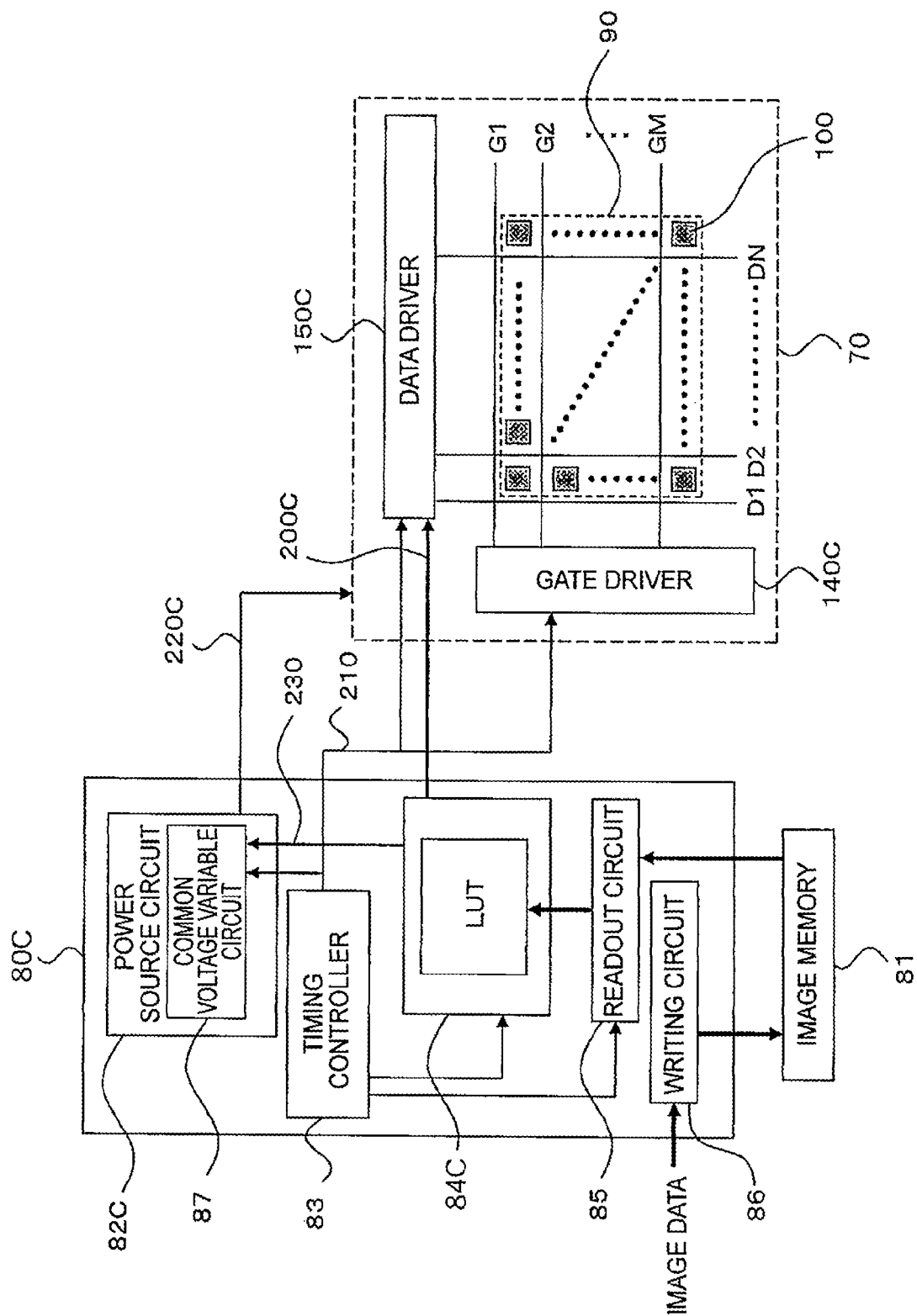
FIG. 52 is a functional block diagram of an electrophoretic display device of Structural Example 6-1.

Structural Example 6-1 is an example of the structure of the electrophoretic display device which achieves the drive of the concept same as those of the first and second exemplary embodiments with the common inversion drive by setting the voltages to be applied to the pixels as +V, 0, and −V which are same as the cases of the first and second exemplary embodiments. FIG. 52 shows a functional block diagram of the electrophoretic display device according to Structural Example 6-1.

As shown in FIG. 52, the electrophoretic display device according to Structural Example 6-1 includes a common voltage variable circuit 87 that is provided to a power source circuit 82C of a display controller 80C. A data conversion circuit 84C has a function which outputs a signal 230 for designating the output voltage to the common voltage variable circuit 87, in addition to a function which generates and outputs display data 200C to a data driver 150C. Those points are different from the structures of the first and second exemplary embodiments shown in FIG. 1. Further, as described above, it is a different point from the case of the first and second exemplary embodiments that the data driver having output of two values for outputting +V and 0 can be employed as the data driver 150C.

The common voltage variable circuit 87 is provided with a function which outputs an output voltage (+V or 0) according to the signal 230 for designating the output voltage in a unit of sub-frame by synchronizing with the signal from a timing controller 83. For example, it is constituted with: power source circuits which generate the output voltage of +V, and 0; a selector circuit which switches the outputs of two power source circuits according to the signal 230; and a circuit which holds the voltage of the output of the selector according to the signal from the timing controller 83, and outputs the held voltage to the counter electrode and each storage line.

The data conversion circuit 84C includes voltage data and common voltage data outputted to the data driver 150C for each display gradation in order of sub-frames. For example, the voltage data outputted to the data driver 150C is stored as a lookup table (LUT) which corresponds to the display gradations and the count value of the sub-frames as in the cases of the first and second exemplary embodiments. The common voltage data is stored as a lookup table (LUT) which corresponds to the count value of the sub-frames. Further, the data conversion circuit 84C is also provided with a function which reads out each pixel data from the image data stored in an image memory 81 by each sub-frame, uses the voltage data from the display gradation designated by the image data and the count value of the sub-frames, and outputs the encoded display data 200C which designates the voltage (+V/0) outputted from the data driver 150C and outputs the signal 230 which designates the common voltage (+V/0).

Through the above-described structure, the voltage to be written to the pixel electrode can be determined as +V, 0, or −V according to each of the display gradations. However, the common voltage is +V or 0 in a unit of sub-frame. Thus, the voltage to be written to the pixel electrode is +V/0 or 0/−V in a unit of sub-frame.

(Driving Example 6-1-1)

The driving method at the time of updating an image where the common inversion drive is employed to the first exemplary embodiment will be described by using the electrophoretic display device of Structural Example 6-1 by referring to FIG. 53.

Figure 53:
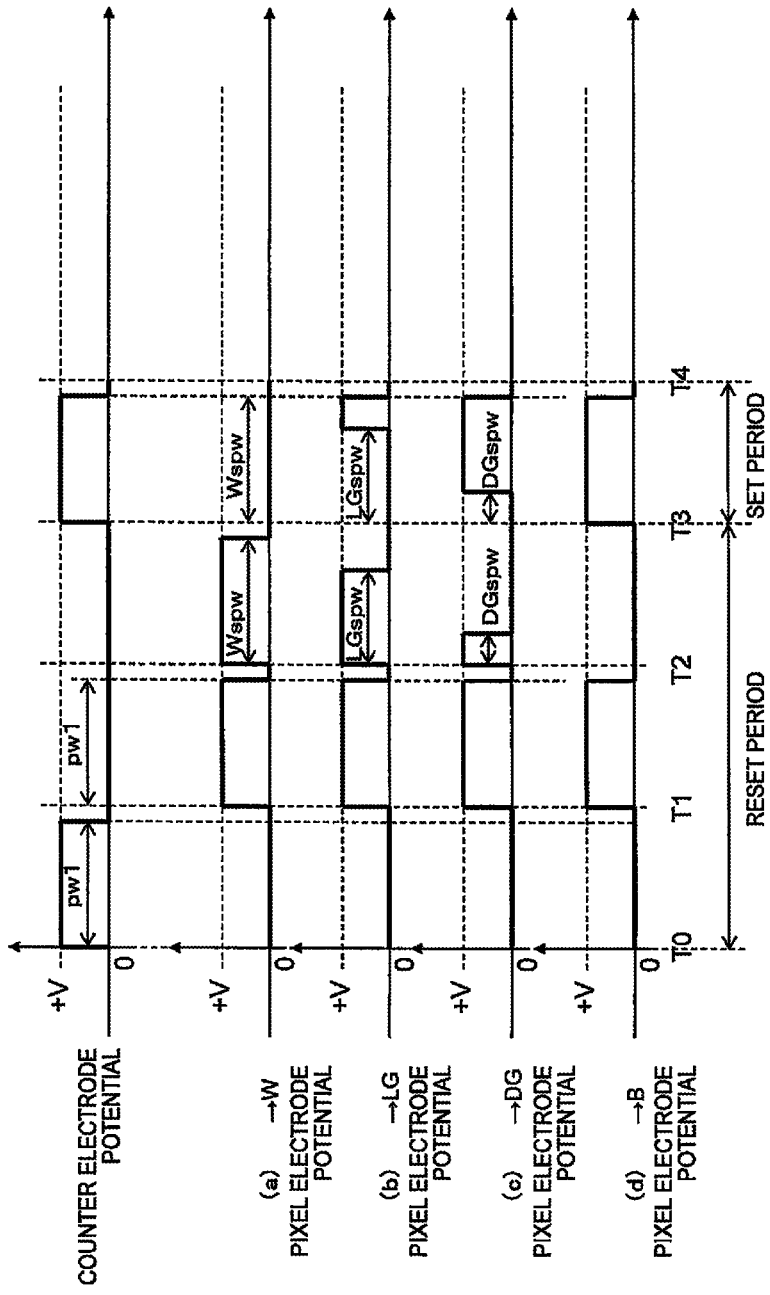
FIG. 53 is a timing chart showing the counter electrode potential and the pixel electrode potentials of each displayed gradation at the time of updating an image in Driving Example 6-1-1.

Driving Example 6-1-1 shown in FIG. 53 is an example of a timing chart showing the changes in the counter electrode potential and the pixel electrode potential when the common inversion drive is employed to Driving Example 1-1 (FIG. 7). Note here that the pixel electrode potential is determined by the output voltage of the data driver, and the counter electrode potential is determined by the common voltage. In the pixel electrode potential shown in the chart, the feed-through voltage is disregarded for the sake of explanations. It is because the potential difference between the counter electrode and the pixel electrode can be set as a relation same as that shown in FIG. 53, i.e., the feed-through voltage can be canceled, by adjusting the offset of the counter electrode potential.

As shown in FIG. 53, the image update period is constituted with a reset period (T0 to T3) where a previous image is erased and a set period (T3 to T4) where an image is written as in the cases of the other exemplary embodiments. FIG. 53-(*a*) shows the pixel electrode potential of the pixel for displaying W (white) next in an updated image. FIG. 53-(*b*) shows the pixel electrode potential of the pixel for displaying LG (light gray) next in the updated image. FIG. 53-(*c*) shows the pixel electrode potential of the pixel for displaying DG (dark gray) next in the updated image. FIG. 53-(*d*) shows the pixel electrode potential of the pixel for displaying B (black) next in the updated image.

From T0 to T1 of the reset period, the counter electrode potential is set as V in the period of pw1 and as 0 in the remaining periods. Further, from T0 to T1, the pixel electrode potential of the pixels for displaying all the gradations of FIG. 53-(*a*) to FIG. 53-(*d*) is set as 0. As a result, the voltage of −V is applied to the pixels in the period pw1 from T0 to T1, since the voltage applied to the pixels is defined as the voltage of the pixel electrode with respect to the counter electrode. That is, as in the case of Driving Example 1-1, the negative stirring pulse 11 shown in FIG. 7 is to be applied to the entire pixels. From T1 to T2 thereafter, the counter electrode potential is set as 0, the pixel electrode potential of the pixels for displaying all the gradations of FIG. 53-(*a*) to FIG. 53-(*d*) is defined as +V in the period of pw1, and the remaining periods are set as 0. As a result, the voltage of +V is applied to the pixels in the period of pw1 from T1 to T2. That is, as in the case of Driving Example 1-1, the positive stirring pulse 10 shown in FIG. 7 is to be applied to the entire pixels.

As described above, through setting the counter electrode potential and the pixel electrode potential as shown in FIG. 53 from T0 to T2 of the reset period, the positive stirring pulse is applied to the pixels after the negative stirring pulse of the pulse width pw1 as in the case of Driving Example 1-1 of the first exemplary embodiment. Thus, the change in the display state of the display unit is the same change as in FIG. 8 used in Driving Example 1-1. That is, all the pixels in the display unit are turned to white display in T1, and then tuned to black display in T2. Then, in the reset period T2 to T3, the counter electrode potential is set as 0, the voltage applied time (spw) of the pixel electrode potential to the pixels in the reset period for each display gradations is set as +V, and the remaining periods are set as 0. Specifically, from T2 to T3, the pixel electrode potential of the pixels displaying W (white) is set as +V in the Wspw period, the pixel electrode potential of the pixels displaying LG (light gray) is set as +V in the LGspw period while the remaining periods are set as 0, the pixel electrode potential of the pixels displaying DG (dark gray) is set as +V in the DGspw period while the remaining periods are set as 0, and the pixel electrode potential of the pixels displaying B (black) is set as 0 since the voltage applied to the pixels in the set period is 0. As a result, the voltage of +V is applied to the pixels from T2 to T3 in the spw period according to the display gradation. That is, as in the case of Driving Example 1-1, the positive compensation pulse 20 shown in FIG. 7 is applied to the pixels with the pulse width according to the display gradation.

As described above, through setting the counter electrode potential and the pixel electrode potential as shown in FIG. 53 from T2 to T3 of the reset period, the positive compensation pulse of the pulse width corresponding to the display gradation is applied to the pixels as in the case of Driving Example 1-1 of the first exemplary embodiment. Regarding the display state of this period, all the pixels are in a black display state (black base state) at the point of T2 as described above. Thus, the change in the display state by applying the positive compensation pulse is not visually recognized.

At last, in the set period T3 to T4, the counter electrode potential is set as +V in the period of Wspw and as 0 in the remaining periods. Further, in T3 to T4, the pixel electrode potential is set as 0 in the period corresponding to the display gradation within the period where the counter electrode potential is +V (Wspw), set as +V in the remaining periods, and the pixel electrode potential is also set as 0 in the period where the counter electrode potential is 0. As a result, the voltage of −V is applied to the pixels from T3 to T4 in the spw period according to the display gradation. That is, as in the case of Driving Example 1-1, the negative set pulse 41 shown in FIG. 7 is applied to the pixels with the pulse width according to the display gradation. Therefore, the intended pixels are in an intended gradation display state in T3 to T4, and update of the image is completed.

As described above, through changing the counter electrode potential and the pixel electrode potential according to the timing chart shown in FIG. 53, the voltage waveforms same as the case of Driving Example 1-1 (FIG. 7) can be applied to the pixels. Thus, the change in the display state at the time of updating the image is also the same as that of Driving Example 1-1 (FIG. 8), so that it is possible to prevent the inverted image of the updated image from being displayed and the total DC component of the voltage waveform becomes zero. Therefore, as in the case of the first exemplary embodiment, there is no load imposed upon the user since the inverted image is not displayed. Further, the total DC component of the voltage waveforms applied at the time of updating the image is zero, so that it is possible to achieve the electrophoretic display device of a high image quality with which no afterimage and ghosting is generated. Furthermore, the output voltage width of the data driver can be reduced by the common inversion drive, so that it is possible to lower the power consumption.

(Driving Example 6-1-1')

In order to set the voltage applied to the pixels as 0 in the common inversion drive, the counter electrode potential and the pixel electrode potential may be set as equivalent. That is, as the method for setting the voltage applied to the pixels as 0 in Structural Example 6-1, there are two methods, i.e., a method which sets both the counter electrode potential determined with the output of the common voltage and the pixel electrode potential determined with the output of the data driver output as +V and a method which sets the both as 0. Therefore, the method for applying the voltage waveform same as that of the Driving Example 1-1 (FIG. 7) by the common inversion drive is not limited to the timing chart shown in FIG. 53. Hereinafter, another Driving Example 6-1-1' which applies the voltage waveform same as that of Driving Example 1-1 (FIG. 7) will be described by referring to FIG. 54.

Figure 54:
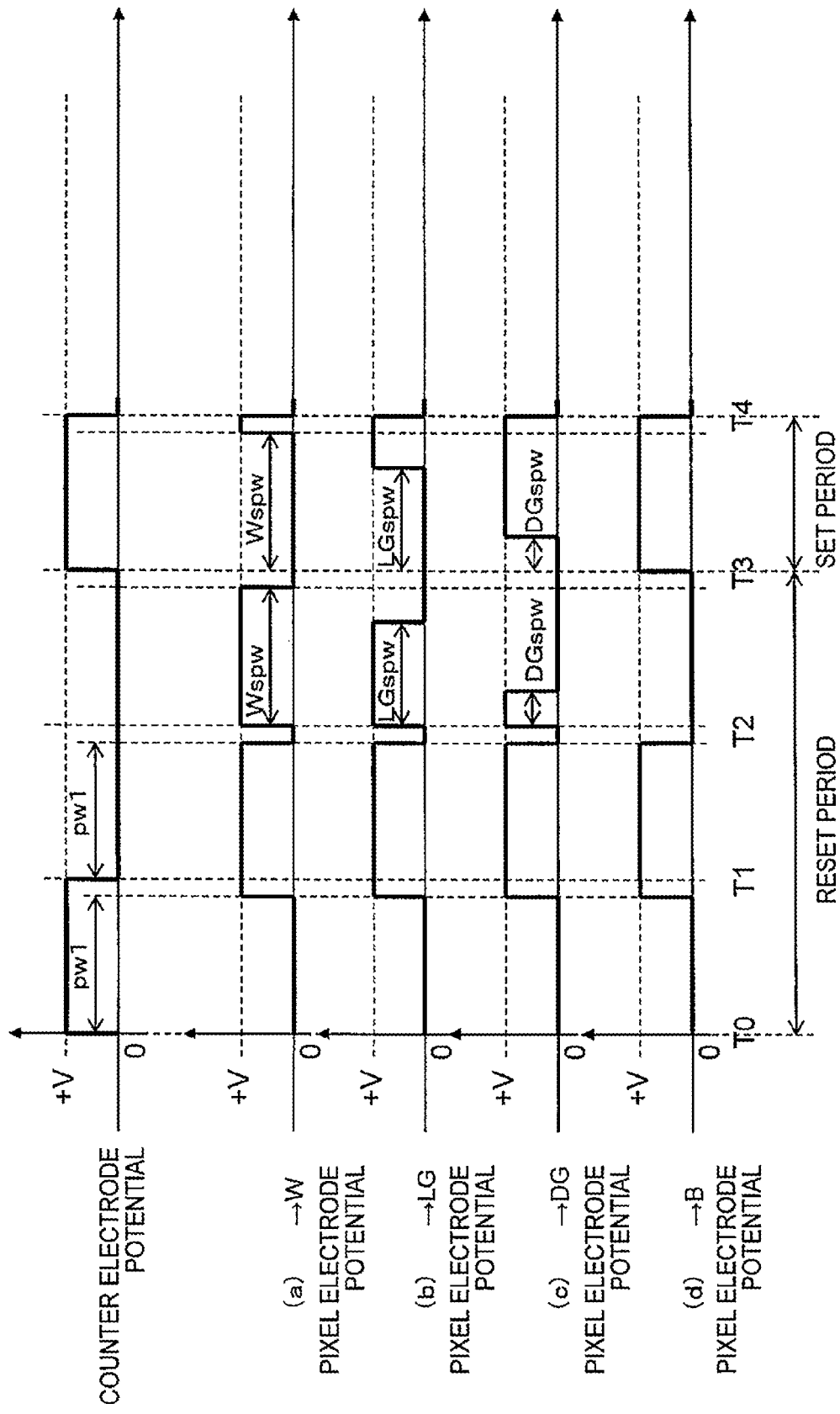
FIG. 54 is a timing chart showing the counter electrode potential and the pixel electrode potentials of each displayed gradation at the time of updating an image in Driving Example 6-1-1'.

Like FIG. 53, FIG. 54 is a timing chart showing the changes in the counter electrode potential and the pixel electrode potential according to the display gradations. In FIG. 54, the counter electrode potential is subtracted from the pixel electrode potential of each display gradation to acquire the voltage waveform to be applied to the pixels in each of the display gradations, the voltage waveforms become consistent with those of FIG. 7.

The difference between FIG. 54 and FIG. 53 is the state of the counter electrode potential and the pixel electrode potential when the voltage applied to the pixel is 0. For example, in T0 to T1 of the reset period, the counter electrode in FIG. 53 is set as +V in the pw1 period and as 0 in the remaining periods, and the pixel electrode potential is set as 0. In the meantime, the counter electrode potential in FIG. 54 is set as +V in the period T0 to T1, while the pixel electrode potential is set as 0 in the pw1 period and as +V in the remaining period. As a result, 0 is applied after the negative stirring pulse 11 of the pulse width pw1 shown in FIG. 7 is applied to the entire pixels both in FIG. 53 and FIG. 54. However, the state of the voltage applied to the pixels being 0 is 0 for both the counter electrode potential and the pixel electrode potential in FIG. 53, while the state thereof is +V for both the counter electrode potential and the pixel electrode potential in FIG. 54.

As shown in FIG. 54, in Driving Example 6-1-1', the voltage applied to the pixels is set to become 0 before the counter electrode potential changes.

As described above, the driving example in which the common inversion drive is employed to other exemplary embodiments of the present invention is not limited only to the timing chart shown in the drawings but is allowed to be modified by various kinds of combinations of the pixel electrode potential and the common electrode potential in each period where the voltage applied to the pixels is set as 0.

(Driving Example 6-1-2)

Figure 55:
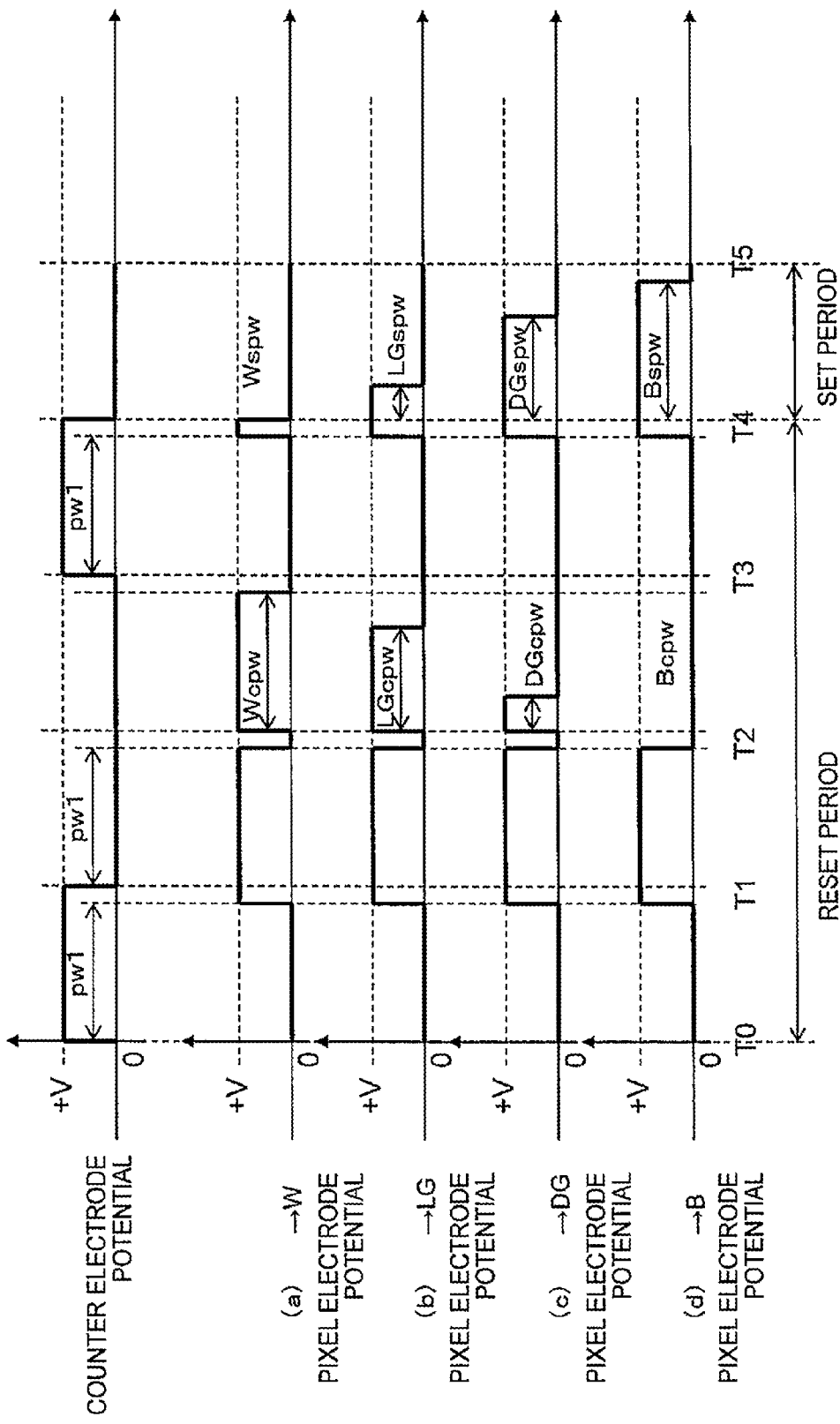
FIG. 55 is a timing chart showing the counter electrode potential and the pixel electrode potentials of each displayed gradation at the time of updating an image in Driving Example 6-1-2.

FIG. 55 shows an example of a driving method used at the time of updating an image in which the common inversion drive is employed to the second exemplary embodiment by using the electrophoretic display device of Structural Example 6-1.

Driving Example 6-1-2 shown in FIG. 55 is an example of a timing chart showing the changes in the counter electrode potential and the pixel electrode potential when the common inversion drive is employed to Driving Example 2-1 (FIG. 22). In FIG. 55, the counter electrode potential is subtracted from the pixel electrode potential of each display gradation to acquire the voltage waveform to be applied to the pixels in each of the display gradations, the voltage waveforms become consistent with those of FIG. 22. That is, with the drive shown in FIG. 55, the pulses same as those of Driving Example 2-1, specifically odd-number of stiffing pulses, the compensation pulse of the pulse width cpw corresponding to the display gradations, and the set pulse of the pulse width spw corresponding to the display gradations, can be applied to the pixels. Thus, the changes in the display state at the time of updating the image are also the same as those of Driving Example 2-1 (FIG. 23), the inverted image of the update image can be prevented from being displayed, and the total DC component of the voltage waveform becomes zero. Therefore, in addition to achieving the same effect as that of the second exemplary embodiment, it is possible to lower the power consumption since the output voltage width of the data driver can be reduced by the common inversion drive.

While the Driving Examples of the cases where the common inversion drive is employed to Driving Example 1-1 of the first exemplary embodiment and to Driving Example 2-1 of the second exemplary embodiment have been described by using the electrophoretic display device of Structural Example 6-1, it is also possible to employ the common inversion drive in the same manner to the other Driving Examples described in the first and second exemplary embodiments and to the cases having design modifications in a range not departing from the concept of the first and second exemplary embodiments.

(Structural Example 6-2)

Figure 56:
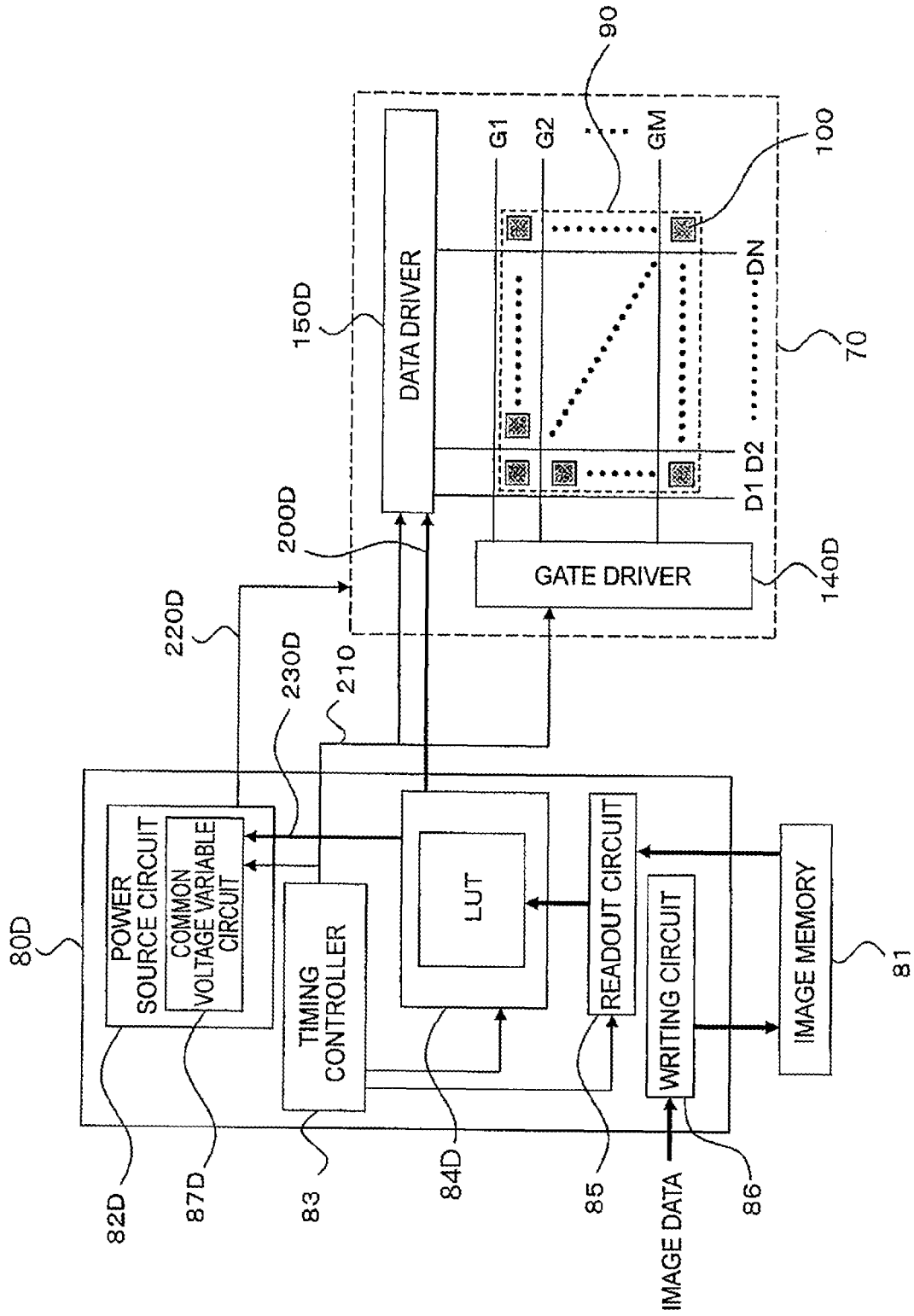
FIG. 56 is a functional block diagram of an electrophoretic display device of Structural Example 6-2.

Structural Example 6-2 is an example of a case where the common inversion drive is employed to the electrophoretic display device of the fourth exemplary embodiment which changes the extent of the voltage applied to the pixels as a means for displaying gradations. FIG. 56 shows a functional block diagram of the electrophoretic display device of Structural Example 6-2. Structural Example 6-2 is a case where the functions required for the fourth exemplary embodiment (FIG. 34) are added to Structural Example 6-1, so that explanations of the components same as those of Structural Example 6-1 are omitted.

A data driver 150D used in Structural Example 6-2 is provided with a function which outputs voltages of multiple values as in the case of the data driver 150B described in the fourth exemplary embodiment. The data driver 150B (FIG. 35) of the fourth exemplary embodiment is referred to for the structure of the data driver 150D, and explanations of the data driver 150D are omitted.

Further, the method which displays gradations by applying the voltages of seven values such as positive voltages +V1, +V2, +V3, negative voltages −V1, −V2, −V3, and 0 V to the pixels has been described as a specific example in the fourth exemplary embodiment. In Structural Example 6-2, the voltages of the seven values same as those of the fourth exemplary embodiment are applied to the pixels by using the common inversion drive for the sake of explanations.

As an example of the method which applies the voltages of the seven values to the pixels by the common inversion drive, there is described a method in which the common voltage is set as +V3 or 0 and a driver that outputs the voltages of +V3, +V3−V1, +V2, +V3−V2, +V1, and 0 is used as the data driver 150D. In this case, a common voltage variable circuit 87D of a display controller 80D switches the positive voltage and 0 as in the case of Structural Example 6-1, so that the function and structure thereof are the same. Further, a data conversion circuit 84D includes the voltage data outputted from the data driver 150D for each of the display gradations in order of sub-frames and common voltage data as in the case of Structural Example 6-1, and is also provided with a function which uses the voltage data and outputs the encoded display data 200D which designates the voltage (+V3/+V3−V1/+V2/+V3−V2/+V1/0) outputted from the data driver 150D and outputs the signal 230D which designates the common voltage (+V3/0).

(Driving Example 6-2-1)

Figure 57:
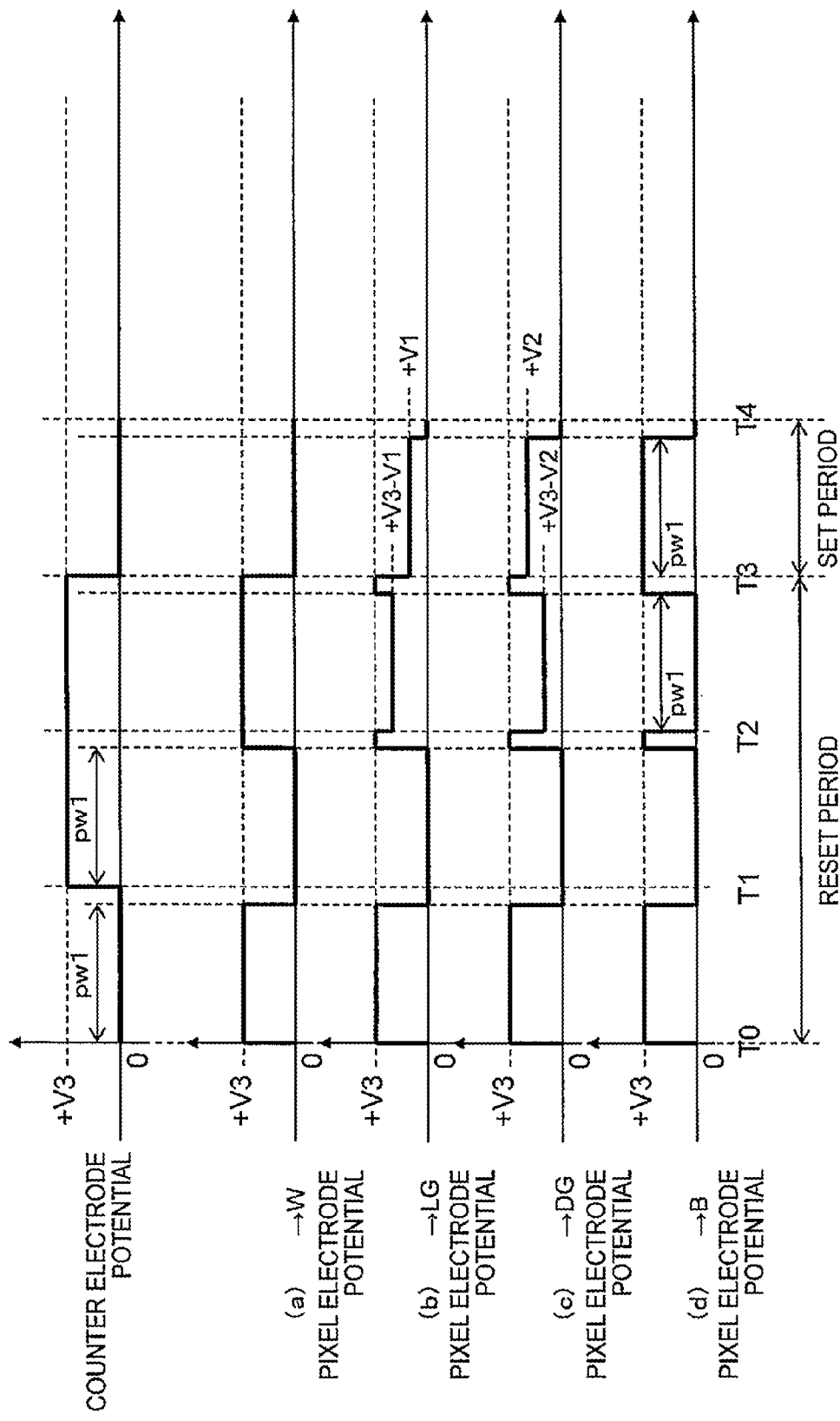
FIG. 57 is a timing chart showing the counter electrode potential and the pixel electrode potentials of each displayed gradation at the time of updating an image in Driving Example 6-2-1.

FIG. 57 shows an example of the driving method at the time of updating an image where the common inversion drive is employed to the fourth exemplary embodiment by using the electrophoretic display device of Structural Example 6-2.

Driving Example 6-2-1 shown in FIG. 57 is an example of a timing chart showing the changes in the counter electrode potential and the pixel electrode potential when the common inversion drive is employed to Driving Example 4-1 (FIG. 37). In FIG. 57, when the counter electrode potential is subtracted from the pixel electrode potential of each display gradation to acquire the voltage waveform to be applied to the pixels in each of the display gradations, the voltage waveforms become consistent with those of FIG. 37. That is, with the drive shown in FIG. 57, the pulses same as those of Driving Example 4-1, specifically even-number of stirring pulses, the compensation pulse corresponding to the voltage value of the set pulse, and the set pulse of the voltage value corresponding to the display gradations, can be applied to the pixels. Thus, the changes in the display state at the time of updating the image are also the same as those of Driving Example 4-1 (FIG. 38), the inverted image of the update image can be prevented from being displayed, and the total DC component of the voltage waveform becomes zero. Therefore, in addition to achieving the same effect as that of the fourth exemplary embodiment, it is possible to lower the power consumption since the output voltage width of the data driver can be reduced by the common inversion drive.

While the Driving Examples of the cases where the common inversion drive is employed to Driving Example 4-1 of the fourth exemplary embodiment has been described by using the electrophoretic display device of Structural Example 6-2, it is also possible to employ the common inversion drive in the same manner to the other Driving Examples described in the fourth exemplary embodiment and to the cases having design modifications in a range not departing from the concept of the fourth exemplary embodiment.

(Structural Example 6-3)

Figure 58:
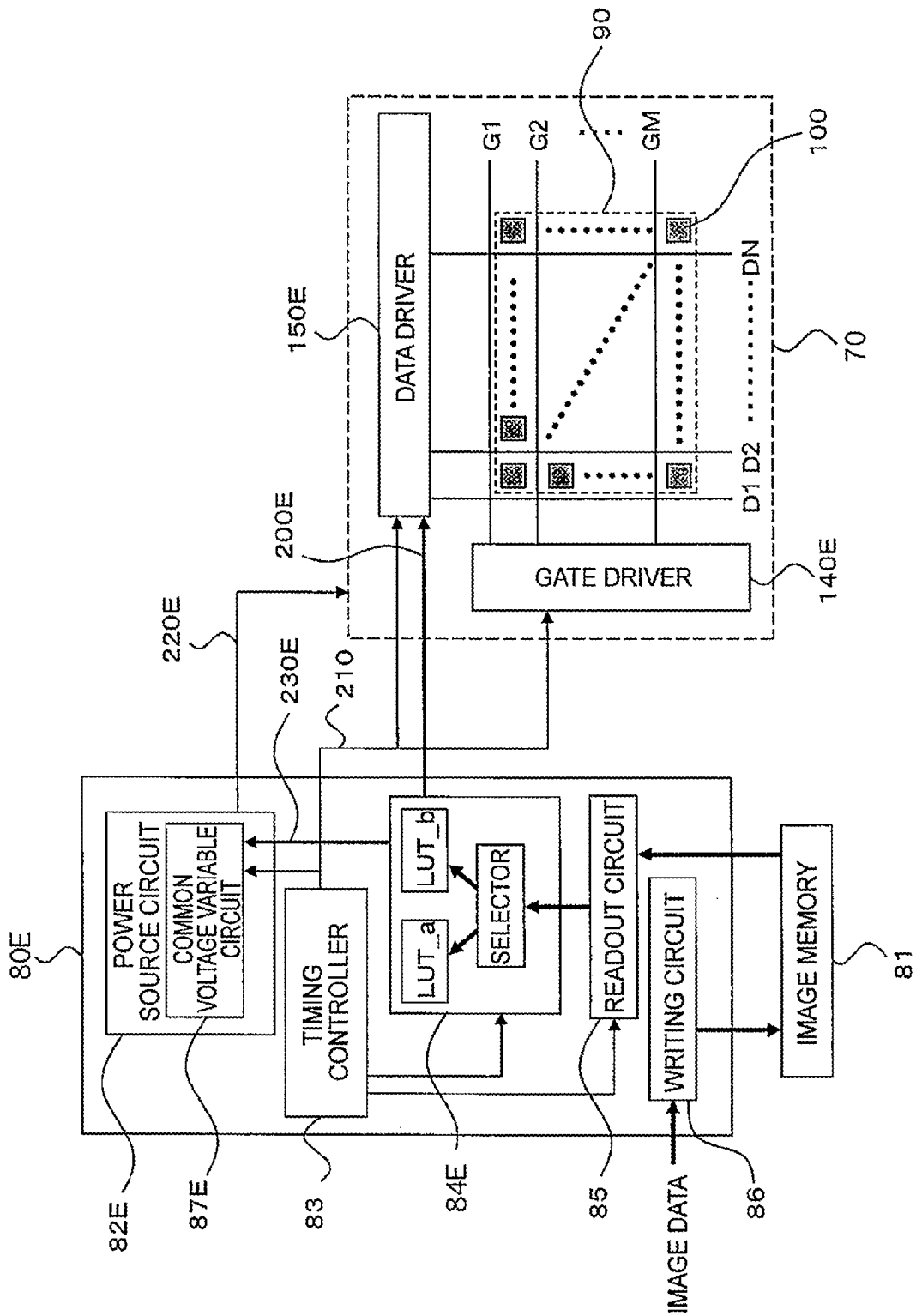
FIG. 58 is a functional block diagram of an electrophoretic display device of Structural Example 6-3.

Structural Example 6-3 is an example of the electrophoretic display device in which the drive of the concept same as that of the fifth exemplary embodiment is achieved using the common inversion drive by setting the voltages applied to the pixels as +V, 0, and −V that are same as the case of the fifth exemplary embodiment. Therefore, as described in the third and fifth exemplary embodiments, as shown in FIGS. 27A-27F, a plurality of pixels on the display unit are divided into a group of pixels a as a first region and a group of pixels b as a second region, and different voltage waveforms are applied for each of the regions (pixels a/pixels b) at the time of updating an image. FIG. 58 shows a functional block diagram of the electrophoretic display device according to Structural Example 6-3.

Structural Example 6-3 is a case where the functions required for the third and fifth exemplary embodiments (FIG. 26) are added to Structural Example 6-1, so that explanations of the components same as those of Structural Example 6-1 are omitted. The difference with respect to the case of Structural Example 6-1 is that a display controller 80E shown in FIG. 58 includes a data conversion circuit 84E which applies different voltage waveforms for the patterned pixels a and the pixels b illustrated in FIGS. 27A-27F. In addition to the lookup table of the common voltage data described in Structural Example 6-1, the data conversion circuit 84E includes the lookup table (LUT_a) for the pixels a and the lookup table (LUT_b) for the pixels b described in the third exemplary embodiment. Further, the data conversion circuit 84E includes a function (selector) which judges whether the output pixels are the pixels a or the pixels b when reading out each pixel data for each sub-frame from the image data stored in the image memory 81; and a function which outputs encoded display data 200E which designates the voltage (+V/0) outputted from a data driver 150E from the display gradations designated by the image data and the count value of the sub-frames by utilizing the LUT_a or the LUT_b according to the output target. Furthermore, the data conversion circuit 84E includes a function which outputs a signal 230E which designates the common voltage (+V/0) outputted from a common voltage variable circuit 87E by utilizing the lookup table of the common voltage data from the count value of the sub-frames.

With the above-described structures, it is possible to determine which of the voltages +V, 0, and −V is to be written to the pixel electrode for each region and according to each of the regions (pixels a and pixels b) and each of the display gradations.

(Driving Example 6-3-1)

The driving method at the time of updating the image where the common inversion drive is employed to the fifth exemplary embodiment by using the electrophoretic display device of Structural Example 6-3 will be described by referring to FIG. 59 and FIG. 60.

Figure 59:
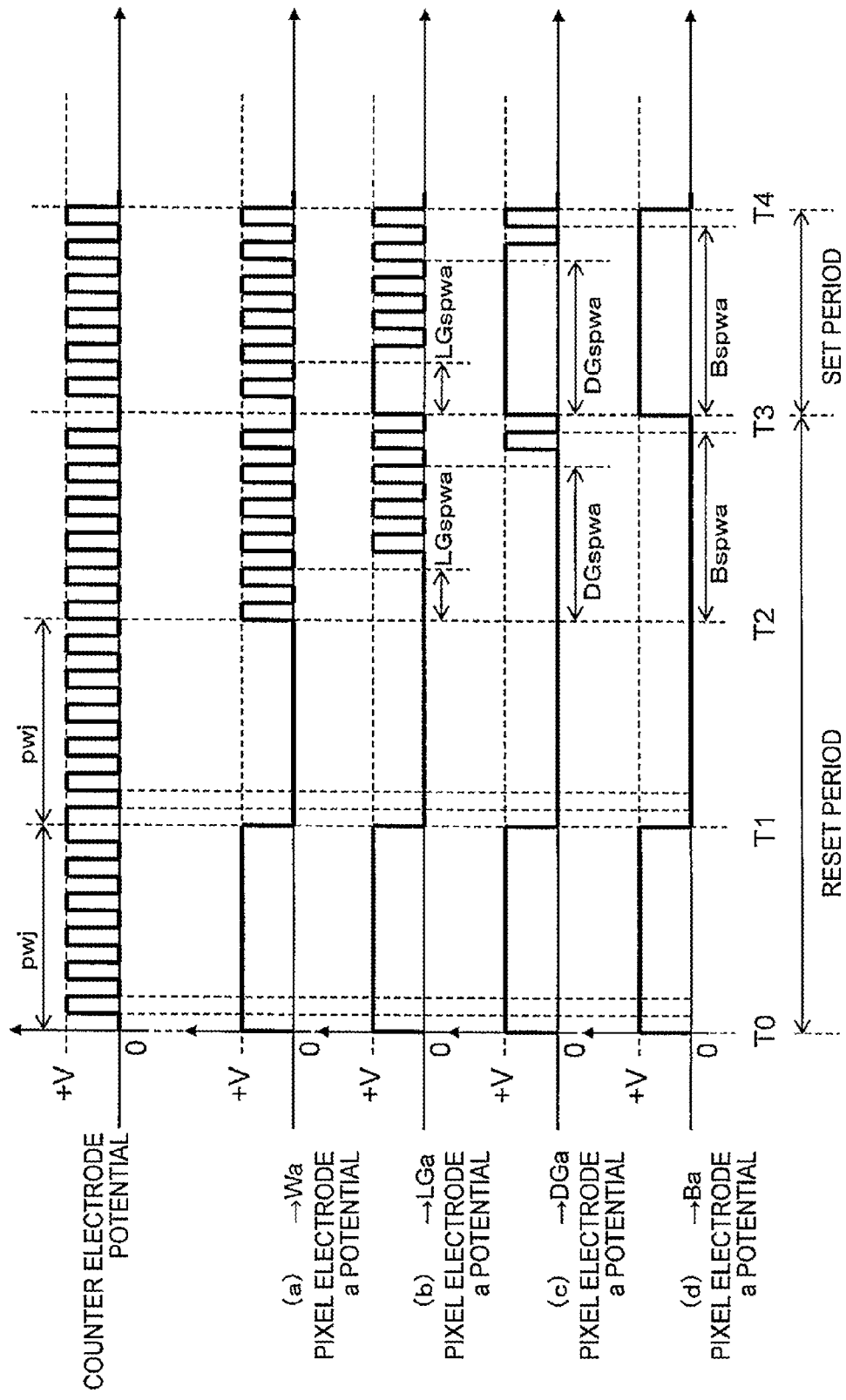
FIG. 59 is a timing chart showing the counter electrode potential and the pixel electrode potentials of each displayed gradation of the pixel a at the time of updating an image in Driving Example 6-3-1.
Figure 60:
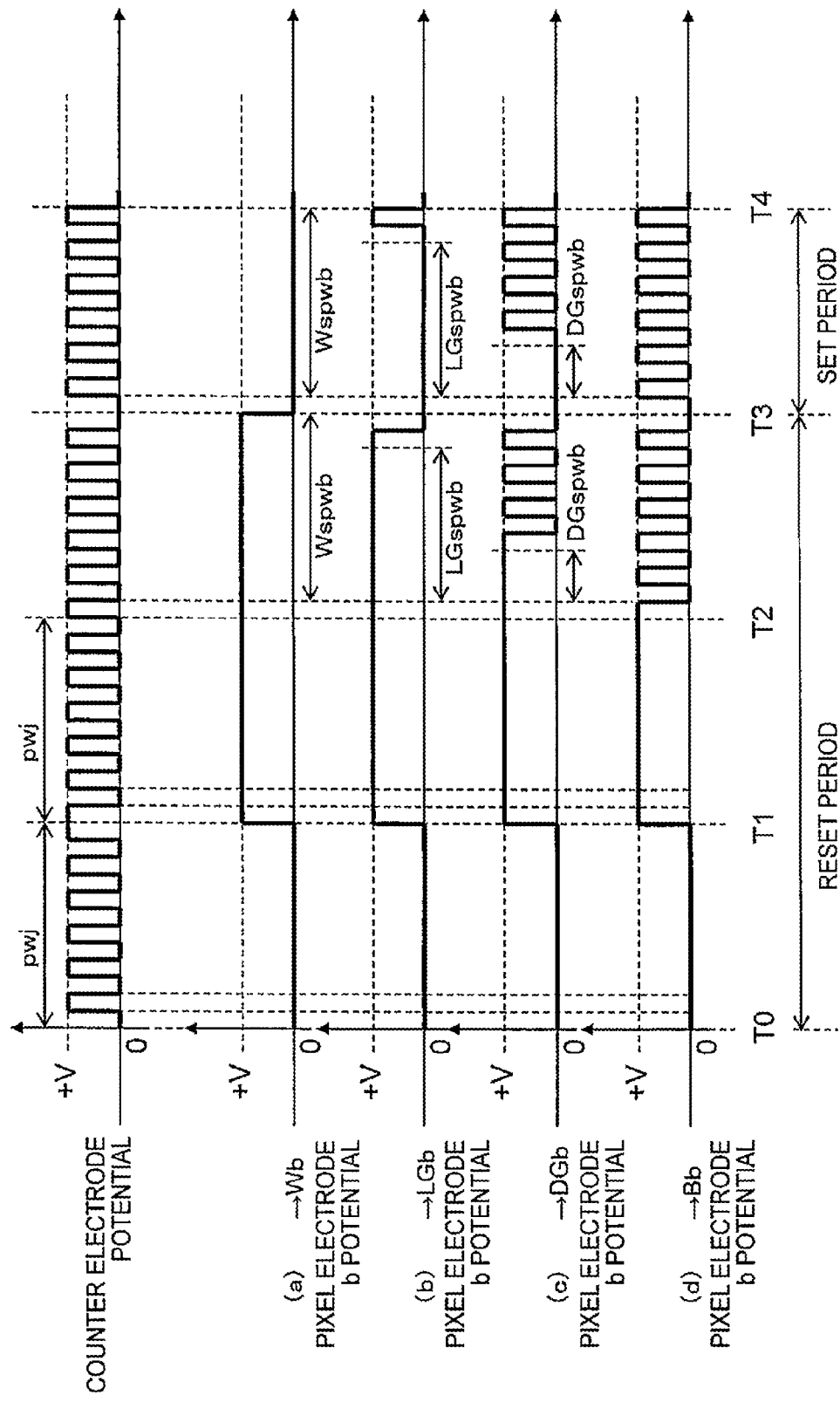
FIG. 60 is a timing chart showing the counter electrode potential and the pixel electrode potentials of each displayed gradation of the pixel b at the time of updating an image in Driving Example 6-3-1.
Figure 61:
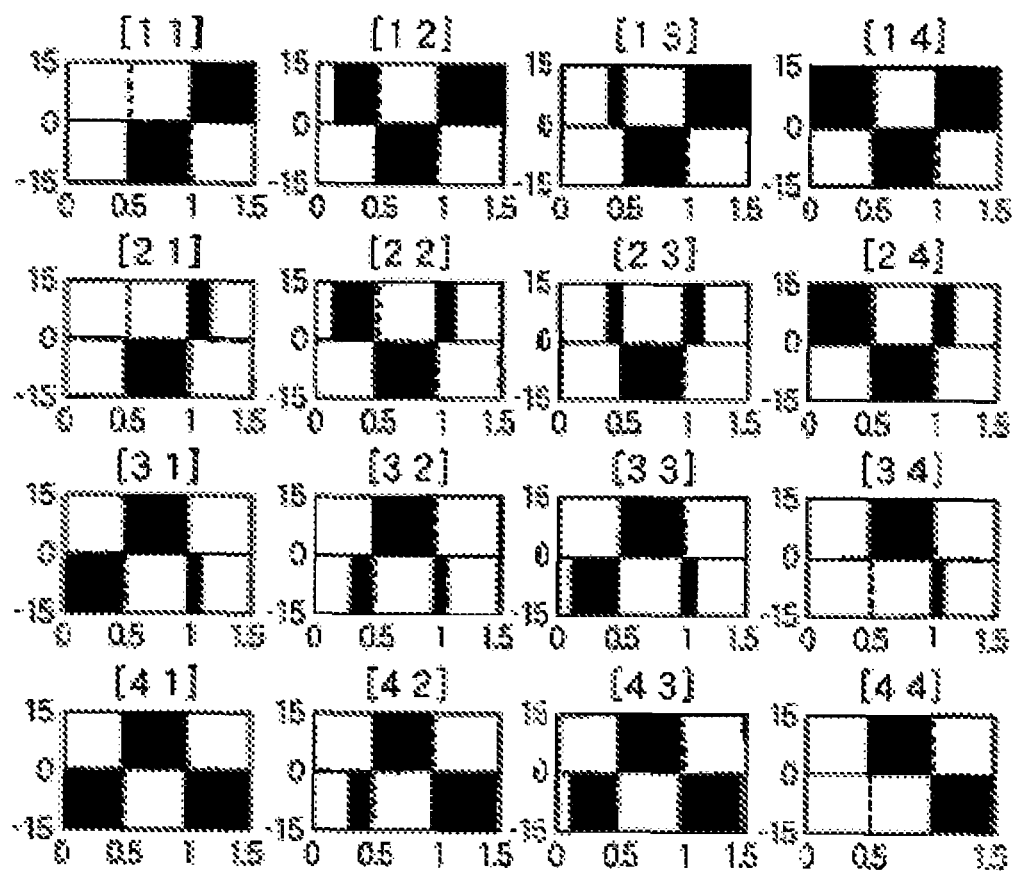
FIG. 61 is a chart showing voltage waveforms at the time of updating an image depicted in Patent Document 2.
Figure 62A:
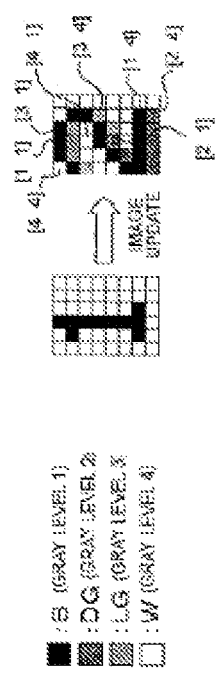
FIGS. 62A and 62B show charts illustrating the changes in the display screen according to the waveforms of FIG. 61.
Figure 62B:
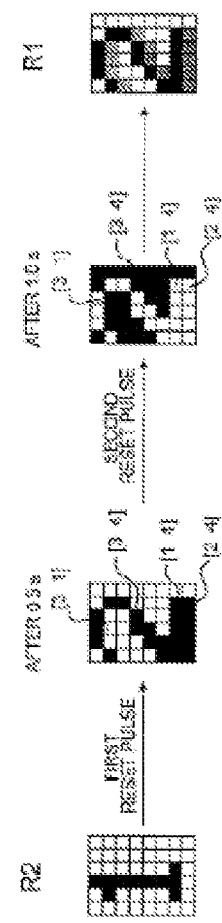

Driving Example 6-3-1 shown in FIG. 59 and FIG. 60 is an example of a timing chart showing the changes in the counter electrode potential and the pixel electrode potential when the common inversion drive is employed to Driving Example 5-1 (FIG. 48 and FIG. 49). FIG. 59 shows the counter electrode potential and the pixel electrode potential of the group of pixels a, and FIG. 60 shows the counter electrode potential and the pixel electrode potential of the group of pixels b. FIG. 59-(*a*) and FIG. 60-(*a*) are the pixel electrode potential of the voltages applied to the pixels a and the pixels b for displaying white (Wa/Wb). FIG. 59-(*b*) and FIG. 60-(*b*) are the pixel electrode potential of the voltages applied to the pixels a and the pixels b for displaying light gray (LGa/LGb). FIG. 59-(*c*) and FIG. 60-(*c*) are the pixel electrode potential of the voltages applied to the pixels a and the pixels b for displaying dark gray (DGa/DGb). FIG. 59-(*d*) and FIG. 60-(*d*) are the pixel electrode potential of the voltages applied to the pixels a and the pixels b for displaying black (Ba/Bb).

When the counter electrode potential is subtracted from the pixel electrode potential of each display gradation n FIG. 59 to acquire the voltage waveform to be applied to the pixels a in each of the display gradations, the voltage waveforms become consistent with those of FIG. 48. Further, when the counter electrode potential is subtracted from the pixel electrode potential of each display gradation n FIG. 60 to acquire the voltage waveform to be applied to the pixels b in each of the display gradations, the voltage waveforms become consistent with those of FIG. 49. That is, with the drive shown in FIG. 59 and FIG. 60, the pulses same as those of Driving Example 5-1 can be applied to the pixels a and the pixels b.

Specifically, as shown in FIG. 59 and FIG. 60, in the reset period T0 to T1, the counter electrode potential is switched between 0 and +V by having a sub-frame period as the minimum unit. In T0 to T1, as shown in FIG. 59, the pixel electrode potential of the pixels a is +V. Thus, +V is added to the pixels a when the counter electrode potential is 0, and 0 is added to the pixels a when the counter electrode potential is +V. That is, the positive pulse group 10*p* same as that of FIG. 48 is applied to the pixels a.

Further, as shown in FIG. 60, the pixel electrode potential of the pixels b is 0 in T0 to T1. Thus, 0 is added to the pixels b when the counter electrode potential is +V, and −V is added to the pixels b when the counter electrode potential is +V. That is, a group of the negative pulses 11*p* same as the case of FIG. 49 are applied to the pixels b. Through applying those pixels intermittently in the period of pwj, the pixels a are turned to a black display state (black base state) and the pixels b are turned to a white display state (white base state) in T1 as in the case of Driving Example 5-1. The changes in the display state caused by applying the pulses to the pixels intermittently are the same as the case of the fifth exemplary embodiment, so that explanations thereof are omitted.

In the reset period T1 to T2, the counter electrode potential is switched between +V and 0, and the pixel electrode potential of the pixels a is 0 (FIG. 59) while the pixel electrode potential of the pixels b is +V (FIG. 60). Thus, a group of the negative pulses 11*p* same as the case of FIG. 48 are applied to the pixels a, and a group of the positive pulses 10*p* same as the case of FIG. 48 are applied to the pixels b. Similarly, a group of pulses same as those of Driving Example 5-1 functioning as the compensation pulses are applied to the pixels in T2 to T3, and a group of pulses same as those of Driving Example 5-1 functioning as the set pulses are applied to the pixels in T3 to T4.

As described above, the same pulse group as that of Driving Example 5-1 is applied to the pixels at the time of updating the image. Thus, the changes in the display state by the drive shown in FIG. 59 and FIG. 60 are also same as the case of Driving Example 5-1, and the changes are as in FIG. 30 when the pattern layout of the pixels a and pixels b is that of FIG. 27C. Thus, in addition to achieving the effect of having no afterimage and ghosting that may be caused because the total DC component of the voltage waveforms acquired in Driving Example 5-1 is zero and the effect of lightening the load for the user because there is no so-called flashing where the entire display unit is changed from white to black and from black to white in the reset period since the polarities of the groups of pulses applied to the pixels in the reset period are inverted for the pixels a and the pixels b, it is possible to reduce the output voltage width of the data driver by the common inversion drive so that the power consumption is lowered.

While the Driving Examples of the cases where the common inversion drive is employed to Driving Example 5-1 of the fifth exemplary embodiment has been described by using the electrophoretic display device of Structural Example 6-3, it is also possible to employ the common inversion drive in the same manner to the other Driving Examples described in the fifth exemplary embodiment and to the cases having design modifications in a range not departing from the concept thereof.

While the structures and the driving method of the sixth exemplary embodiment have been described above, the structures and the driving method are not limited to those. Changes in the design are tolerated within the range not departing from the content described as applicable in the first exemplary embodiment and the concept of the sixth exemplary embodiment.

(Supplementation)

The present invention can also be expressed as follows:

A display device according to the present invention is an image display device having a memory characteristic, which includes a display unit which includes a first substrate in which switching elements and pixel electrodes are arranged in matrix, a second substrate in which a counter electrode is formed, an electrophoretic layer including at least an electrophoretic particle being inserted between the first substrate and the second substrate, and pixels arranged in matrix by corresponding to the pixel electrodes; and a voltage applying module which updates a display state of the display unit from a current image to a next image by applying a prescribed voltage waveform to the electrophoretic particles between the pixel electrode and the counter electrode for each display gradation when updating the image, wherein when a state where all the electrophoretic particles are migrated to the first substrate or the second substrate by a stirring pulse for stirring the electrophoretic particles is defined as a base state, periods for updating the image include: a reset period that is a combination of a stirring period where all the pixels of the display unit are set to the base state at least once and a period where accumulation of a residual direct current component is suppressed by the compensation pulse; and a set period that includes a set pulse for transiting the display state to a prescribed display state according to the next image by applying a voltage corresponding to the electrophoretic particles to intended pixels for an intended amount of time according to the next image, and the compensation pulse is applied after all the pixels of the display unit are in the white or black base state by at least one of the stirring pulses, and the display state does not change before and after applying the compensation pulse.

Further, the display unit is constituted with the pixels of an arbitrary first region and the pixels of an arbitrary second region. When a state where all the electrophoretic particles are migrated to the first substrate by a stirring pulse for stirring the electrophoretic particles is defined as a first base state and a state where all the electrophoretic particles are migrated to the second substrate is defined as a second base state, periods for updating the image include: a reset period that is a combination of a stirring period where all the pixels in the first region are set to the first base state and all the pixels in the second region are set to the second base state at least once and a period where accumulation of a residual direct current component is suppressed by the compensation pulse; and a set period that includes a set pulse for transiting the display state to a prescribed display state by applying a voltage corresponding to the electrophoretic particles to intended pixels for an intended amount of time according to the next image; and the compensation pulse is applied after all the pixels in the first region are in the first base state and all the pixels in the second region are in the second base state by at least one of the stirring pulses, and the display state does not change before and after applying the compensation pulse.

A driving method according to the present invention is a method for driving an image display device having a memory characteristic, which includes a display unit which includes a first substrate in which switching elements and pixel electrodes are arranged in matrix, a second substrate in which a counter electrode is formed, an electrophoretic layer including at least an electrophoretic particle being inserted between the first substrate and the second substrate, and pixels arranged in matrix by corresponding to the pixel electrodes; and a voltage applying module which updates a display state of the display unit from a current image to a next image by applying a prescribed voltage waveform to the electrophoretic particles between the pixel electrode and the counter electrode for each display gradation when updating the image, wherein when a state where all the electrophoretic particles are migrated to the first substrate or the second substrate by a stirring pulse for stirring the electrophoretic particles is defined as a base state, periods for updating the image include: a reset period that is a combination of a stirring period where all the pixels of the display unit are set to the base state at least once and a period where accumulation of a residual direct current component is suppressed by the compensation pulse; and a set period that includes a set pulse for transiting the display state to a prescribed display state according to the next image by applying a voltage corresponding to the electrophoretic particles to intended pixels for an intended amount of time according to the next image, and the compensation pulse is applied after all the pixels of the display unit are in the white or black base state by at least one of the stirring pulses, and the display state does not change before and after applying the compensation pulse.

Further, in the driving method according to the present invention, the display unit is constituted with the pixels of an arbitrary first region and the pixels of an arbitrary second region. When a state where all the electrophoretic particles are migrated to the first substrate by a stirring pulse for stirring the electrophoretic particles is defined as a first base state and a state where all the electrophoretic particles are migrated to the second substrate is defined as a second base state, periods for updating the image is characterized to include: a reset period that is a combination of a stirring period where all the pixels in the first region are set to the first base state and all the pixels in the second region are set to the second base state at least once and a period where accumulation of a residual direct current component is suppressed by the compensation pulse; and a set period that includes a set pulse for transiting the display state to a prescribed display state by applying a voltage corresponding to the electrophoretic particles to intended pixels for an intended amount of time according to the next image; and the compensation pulse is applied after all the pixels in the first region are in the first base state and all the pixels in the second region are in the second base state by at least one of the stirring pulses, and the display state does not change before and after applying the compensation pulse.

With the present invention, inverted images are not displayed. Thus, there is no load and a sense of discomfort given to the user, and the total DC component of the voltage waveforms applied at the time of updating an image is zero. Thus, it is possible to achieve the electrophoretic display device of a high image quality with which no afterimage and ghosting is generated. Further, the display unit is divided into the first region and the second region, and the polarities of each of the stirring pulses are inverted in the reset period. Therefore, there is no so-called flashing where the entire display screen is changed from white to black and from black to white, so that there is an effect of lightening the load for the user further.

While the exemplary embodiments of the present invention have been described above by referring to the accompanying drawings, the specific structures of the present invention are not limited to those exemplary embodiments. It is to be noted that design changes and the like within the range not departing from the scope of the present invention are included in the present invention. For example, while the display gradations are defined as W (white), LG (light gray), DG (dark gray), and B (black) in the explanations of the Driving Examples, the gradations are not limited only to those. It is allowed to drive with a larger number of gradations based on the concept of the present invention. Further, while the electrophoretic display devices of each of the exemplary embodiments are described to provide white and black display, it is also possible to display in colors such as red, green, blue, and the like by changing the white pigment 117 and the black pigment 118 as the charged particles with pigments of complementary colors such as red, green, blue, and the like. Further, the present invention includes combinations of a part or a whole part of the structures of each of the above described exemplary embodiments mutually combined as appropriate.

While a part of or a whole part of the exemplary embodiments can be summarized as follows as in Supplementary Notes, the present invention is not necessarily limited only to the following structures.

(Supplementary Note 1)

An electrophoretic display device, which includes:
a display unit which includes a first substrate, a second substrate, and electrophoretic particles inserted between the first substrate and the second substrate; and
a voltage applying unit which updates a display state of the display unit from a current image to a next image by applying prescribed voltage waveforms constituted with a stirring pulse, a compensation pulse, and a set pulse to the electrophoretic particles, wherein
the voltage applying unit first sets the display state to a state where the electrophoretic particles are migrated to either the first substrate or the second substrate by the stirring pulse, then applies a voltage for suppressing a residual direct current component that may be generated after applying the set pulse without causing a change in the display state by the compensation pulse, and updates the image to the next image by the set pulse.

(Supplementary Note 2)

An electrophoretic display device, which includes:
a display unit which includes a first substrate in which switching elements and pixel electrodes are arranged in matrix, a second substrate in which a counter electrode is formed, an electrophoretic layer including at least a single color of electrophoretic particles being inserted between the first substrate and the second substrate, and pixels arranged in matrix by corresponding to the pixel electrodes; and
a voltage applying unit which updates a display state of the display unit from a current image to a next image by applying a prescribed voltage waveform to the electrophoretic particles between the pixel electrode and the counter electrode for each display gradation when updating the image, wherein
when a state where all the electrophoretic particles of at least the single color are migrated to the first substrate or the second substrate by a stirring pulse for stirring the electrophoretic particles is defined as a base state, periods for updating the image include: a reset period that is a combination of a stirring period where all the pixels of the display unit are set to the base state at least once and a compensation period where accumulation of a residual direct current component is suppressed by the compensation pulse; and a set period that includes a set pulse for transiting the display state to a state according to the next image, and
the compensation pulse is applied after all the pixels of the display unit are in the same base state by at least one of the stirring pulses, and the display state does not change before and after applying the compensation pulse.

(Supplementary Note 3)

The electrophoretic display device as depicted in Supplementary Note 2, wherein
a time integral value of the direct current component of the voltage waveform applied to the pixel electrodes becomes zero in the period for updating the image.

(Supplementary Note 4)

The electrophoretic display device as depicted in Supplementary Note 3, wherein
when updating the image, there are even-number of the stirring pulses contained in the voltage waveform applied to the pixel electrode, voltage of the compensation pulse is of a same value and of opposite polarity from those of the set pulse, and pulse width of the compensation pulse is equivalent to pulse width of the set pulse.

(Supplementary Note 5)

The electrophoretic display device as depicted in Supplementary Note 3, wherein
when updating the image, there are odd-number of the stirring pulses contained in the voltage waveform applied to the pixel electrode, voltage of the compensation pulse is of a same value and of same polarity as those of the set pulse, and pulse width of the compensation pulse is a period acquired by subtracting width of the set pulse from width of the stirring pulse.

(Supplementary Note 6)

The electrophoretic display device as depicted in any one of Supplementary Notes 2 to 5, wherein
in the periods for updating the image, a period where a positive voltage is applied to the counter electrode and a period where a negative voltage is applied do not overlap with each other in each of the voltage waveforms applied for each of the display gradations.

(Supplementary Note 7)

An electrophoretic display device, which includes:
a display unit which includes a first substrate in which switching elements and pixel electrodes are arranged in matrix, a second substrate in which a counter electrode is formed, an electrophoretic layer including at least a single color of electrophoretic particles being inserted between the first substrate and the second substrate, and pixels arranged in matrix by corresponding to the pixel electrodes; and
a voltage applying unit which updates a display state of the display unit from a current image to a next image by applying a prescribed voltage waveform to the electrophoretic particles between the pixel electrode and the counter electrode for each display gradation when updating the image, wherein:
the display unit is constituted with the pixels of a first region and the pixels of a second region;
when a state where all the electrophoretic particles of at least the single color are migrated to the first substrate by a stirring pulse for stirring the electrophoretic particles is defined as a first base state and a state where all the electrophoretic particles are migrated to the second substrate is defined as a second base state, periods for updating the image include: a reset period that is a combination of a stirring period where all the pixels in the first region are set to the first base state and all the pixels in the second region are set to the second base state at least once and a compensation period where accumulation of a residual direct current component is suppressed by the compensation pulse; and a set period that includes a set pulse for transiting the display state to a state according to the next image; and the compensation pulse is applied after all the pixels in the first region are in the first base state and all the pixels in the second region are in the second base state by at least one of the stirring pulses, and the display state does not change before and after applying the compensation pulse.

(Supplementary Note 8)

The electrophoretic display device as depicted in Supplementary Note 7, wherein a time integral value of the direct current component of the voltage waveform applied to the pixel electrodes becomes zero in the period for updating the image.

(Supplementary Note 9)

The electrophoretic display device as depicted in Supplementary Note 7 or 8, wherein in the periods for updating the image, a period where a positive voltage is applied to the counter electrode and a period where a negative voltage is applied do not overlap with each other in each of the voltage waveforms applied to the pixels in the first region and the pixels in the second region for each of the display gradations.

(Supplementary Note 10)

An electrophoretic display device, which includes:

a display unit which includes a first substrate in which switching elements and pixel electrodes are arranged in matrix, a second substrate in which a counter electrode is formed, an electrophoretic layer including at least a single color of electrophoretic particles being inserted between the first substrate and the second substrate, and pixels arranged in matrix by corresponding to the pixel electrodes; and a voltage applying unit which updates a display state of the display unit from a current image to a next image by applying a prescribed voltage waveform to the electrophoretic particles between the pixel electrode and the counter electrode for each display gradation when updating the image, wherein:

when a state where all the electrophoretic particles of at least a single color are migrated to the first substrate by a first stirring pulse for stirring the electrophoretic particles is defined as a first base state and a state where all the electrophoretic particles of at least a single color are migrated to the second substrate by a second stirring pulse for stirring the electrophoretic particles is defined as a second base state, periods for updating the image include: a reset period constituted with a stirring period where all the pixels are set to the first base state and the second base state; and a set period that includes a set pulse for transiting the display state to a state according to the next image; and in the reset period, there is a timing where all the pixels of the display unit are aligned to the first base state or to the second base state, and the first stirring pulse or the second stirring pulse is applied after the timing where all the pixels of the display unit is aligned to the first base state or to the second base state.

(Supplementary Note 11)

The electrophoretic display device as depicted in Supplementary Note 10, wherein in the periods for updating the image, a period where a positive voltage is applied to the counter electrode and a period where a negative voltage is applied do not overlap with each other in each of the voltage waveforms applied for each of the display gradations.

(Supplementary Note 12)

A method for driving an electrophoretic display device, wherein:

when updating a display state of a display unit including a first substrate, a second substrate, and electrophoretic particles inserted between the first substrate and the second substrate from a current image to a next image by applying a single or a plurality of stirring pulses to the electrophoretic particles, applying a compensation pulse after one of the stirring pulses, and applying a set pulse at last, the stirring pulse is formed with a voltage waveform which moves the electrophoretic particles at least to the first substrate or the second substrate;

the compensation pulse is of a same polarity as that of the stirring pulse applied immediately before the compensation pulse and is formed with a voltage waveform which suppresses the residual direct current component after applying the set pulse; and the set pulse is formed with a voltage waveform which updates the image to the next image.

(Supplementary Note 13)

A method for driving an electrophoretic display device which includes:

a display unit which includes a first substrate in which switching elements and pixel electrodes are arranged in matrix, a second substrate in which a counter electrode is formed, an electrophoretic layer including at least a single color of electrophoretic particles being inserted between the first substrate and the second substrate, and pixels arranged in matrix by corresponding to the pixel electrodes; and a voltage applying unit which updates a display state of the display unit from a current image to a next image by applying prescribed voltage waveforms constituted with a stirring pulse, a compensation pulse, and a set pulse to the electrophoretic particles between the pixel electrode and the counter electrode for each display gradation when updating the image, the method including, during update of the image:

when a state where all the electrophoretic particles of at least a single color are migrated to the first substrate or the second substrate by the stirring pulse for stirring the electrophoretic particles is defined as a base state, setting all the pixels of the display unit in the same base state by at least one of the stirring pulses; then suppressing accumulation of a residual direct current component without causing a change in the display state by the compensation pulse; and then transiting the display state of the base state to a state according to the next image by the set pulse.

(Supplementary Note 14)

The method for driving the electrophoretic display device as depicted in Supplementary Note 13, wherein a time integral value of the direct current component of the voltage waveform applied to the pixels electrode becomes zero in the period for updating the image.

(Supplementary Note 15)

The method for driving the electrophoretic display device as depicted in Supplementary Note 14, wherein
when updating the image, there are even-number of the stiffing pulses contained in the voltage waveform applied to the pixel electrode, voltage of the compensation pulse is of a same value and of opposite polarity from those of the set pulse, and pulse width of the compensation pulse is equivalent to pulse width of the set pulse.

(Supplementary Note 16)

The method for driving the electrophoretic display device as depicted in Supplementary Note 14, wherein
when updating the image, there are odd-number of the stirring pulses contained in the voltage waveform applied to the pixel electrode, voltage of the compensation pulse is of a same value and of same polarity as those of the set pulse, and pulse width of the compensation pulse is a period acquired by subtracting width of the set pulse from width of the stirring pulse.

(Supplementary Note 17)

The method for driving the electrophoretic display device as depicted in any one of Supplementary Notes 13 to 16, wherein
in the periods for updating the image, a period where a positive voltage is applied to the counter electrode and a period where a negative voltage is applied do not overlap with each other in each of the voltage waveforms applied for each of the display gradations.

(Supplementary Note 18)

A method for driving the electrophoretic display device which includes:
a display unit which includes a first substrate in which switching elements and pixel electrodes are arranged in matrix, a second substrate in which a counter electrode is formed, an electrophoretic layer including at least a single color of electrophoretic particles being inserted between the first substrate and the second substrate, and pixels arranged in matrix by corresponding to the pixel electrodes; and
a voltage applying unit which updates a display state of the display unit from a current image to a next image by applying prescribed voltage waveforms constituted with a stirring pulse, a compensation pulse, and a set pulse to the electrophoretic particles between the pixel electrode and the counter electrode for each display gradation when updating the image, wherein:
the display unit is constituted with the pixels of a first region and the pixels of a second region; the method including, during update of the image:
when a state where all the electrophoretic particles of at least a single color are migrated to the first substrate by the stirring pulse for stirring the electrophoretic particles is defined as a first base state and a state where all the electrophoretic particles are migrated to the second substrate is defined as a second base state,
setting all the pixels in the first region to the first base state and setting all the pixels in the second region to the second base state by the stirring pulse; then
suppressing accumulation of a residual direct current component without causing a change in the display state of the first base state and the display state of the second base state by the compensation pulse; and then
transiting the display state to a state according to the next image by the set pulse.

(Supplementary Note 19)

The method for driving the electrophoretic display device as depicted in Supplementary Note 18, wherein
a time integral value of the direct current component of the voltage waveform applied to the pixels electrode becomes zero in the period for updating the image.

(Supplementary Note 20)

The method for driving the electrophoretic display device as depicted in Supplementary Note 18 or 19, wherein
in the periods for updating the image, a period where a positive voltage is applied to the counter electrode and a period where a negative voltage is applied do not overlap with each other in each of the voltage waveforms applied to the pixels in the first region and the pixels in the second region for each of the display gradations.

(Supplementary Note 21)

A method for driving an electrophoretic display device which includes:
a display unit which includes a first substrate in which switching elements and pixel electrodes are arranged in matrix, a second substrate in which a counter electrode is formed, an electrophoretic layer including at least a single color of electrophoretic particles, the layer being inserted between the first substrate and the second substrate, and pixels arranged in matrix by corresponding to the pixel electrodes; and
a voltage applying unit which updates a display state of the display unit from a current image to a next image by applying prescribed voltage waveforms to the electrophoretic particles between the pixel electrode and the counter electrode when updating the image, the method including, during update of the image:
when a state where all the electrophoretic particles of at least a single color are migrated to the first substrate by the first stirring pulse for stirring the electrophoretic particles is defined as a first base state and a state where all the electrophoretic particles of at least a single color are migrated to the second substrate by the second stirring pulse for stirring the electrophoretic particles is defined as a second base state,
setting all the pixels of the display unit to the first base state and the second base state by the first stirring pulse or the second stirring pulse after a timing where all the pixels of the display unit are aligned to the first base state or to the second base state; and then
transiting the display state to a state according to the next image by the set pulse.

(Supplementary Note 22)

The method for driving the electrophoretic display device as depicted in Supplementary Note 21, wherein
in the periods for updating the image, a period where a positive voltage is applied to the counter electrode and a period where a negative voltage is applied do not overlap with each other in each of the voltage waveforms applied for each of the display gradations.

Industrial Applicability

The present invention can be broadly employed to electronic paper display devices such as a public display, an electronic book, an electronic newspaper, and the like.

What is claimed is:
1. An electrophoretic display device, comprising:
a display unit which comprises a first substrate, a second substrate, and electrophoretic particles inserted between the first substrate and the second substrate; and a voltage applying unit which updates a display state of the display unit from a current image to a next image by applying prescribed voltage waveforms constituted with a stirring pulse, a compensation pulse, and a set pulse to the electrophoretic particles, wherein the voltage applying unit first sets the display state to a state where the electrophoretic particles are migrated to either the first substrate or the second substrate by the stirring pulse according to polarity of the electrophoretic particles, then applies a voltage for suppressing a residual direct current component that may be generated after applying the set pulse without causing a change in the display state by the compensation pulse, and updates the image to the next image by the set pulse.

2. An electrophoretic display device, comprising:

a display unit which comprises a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying a prescribed voltage waveform to the electrophoretic particles between the pixel electrode and the counter electrode for each display gradation when updating the image, wherein when a state where all the electrophoretic particles of at least the single color are migrated to the first substrate or the second substrate by a stirring pulse for stirring the electrophoretic particles is defined as a base state, periods for updating the image include: a reset period that is a combination of a stirring period where all the pixels of the display unit are set to the base state at least once and a compensation period where accumulation of a residual direct current component is suppressed by the compensation pulse; and a set period that includes a set pulse for transiting the display state to a state according to the next image, and the compensation pulse is applied after all the pixels of the display unit are in the same base state by at least one of the stirring pulses, and the display state does not change before and after applying the compensation pulse.

3. The electrophoretic display device as claimed in claim 2, wherein a time integral value of the direct current component of the voltage waveform applied to the pixel electrodes becomes zero in the period for updating the image.

4. The electrophoretic display device as claimed in claim 3, wherein when updating the image, there are even-number of the stirring pulses contained in the voltage waveform applied to the pixel electrode, voltage of the compensation pulse is of a same value and of opposite polarity from those of the set pulse, and pulse width of the compensation pulse is equivalent to pulse width of the set pulse.

5. The electrophoretic display device as claimed in claim 3, wherein when updating the image, there are odd-number of the stirring pulses contained in the voltage waveform applied to the pixel electrode, voltage of the compensation pulse is of a same value and of same polarity as those of the set pulse, and pulse width of the compensation pulse is a period acquired by subtracting width of the set pulse from width of the stirring pulse.

6. The electrophoretic display device as claimed in claim 2, wherein in the periods for updating the image, a period where a positive voltage is applied to the counter electrode and a period where a negative voltage is applied do not overlap with each other in each of the voltage waveforms applied for each of the display gradations.

7. The electrophoretic display device as claimed in claim 2, wherein when updating the image, the voltage of the counter electrode is changed as appropriate.

8. An electrophoretic display device, comprising:

a display unit which comprises a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying a prescribed voltage waveform to the electrophoretic particles between the pixel electrode and the counter electrode for each display gradation when updating the image, wherein:

the display unit is constituted with the pixels of a first region and the pixels of a second region;

when a state where all the electrophoretic particles of at least the single color are migrated to the first substrate by a stirring pulse for stirring the electrophoretic particles is defined as a first base state and a state where all the electrophoretic particles are migrated to the second substrate is defined as a second base state, periods for updating the image include: a reset period that is a combination of a stirring period where all the pixels in the first region are set to the first base state and all the pixels in the second region are set to the second base state at least once and a compensation period where accumulation of a residual direct current component is suppressed by the compensation pulse; and a set period that includes a set pulse for transiting the display state to a state according to the next image; and the compensation pulse is applied after all the pixels in the first region are in the first base state and all the pixels in the second region are in the second base state by at least one of the stirring pulses, and the display state does not change before and after applying the compensation pulse.

9. The electrophoretic display device as claimed in claim 8, wherein a time integral value of the direct current component of the voltage waveform applied to the pixel electrodes becomes zero in the period for updating the image.

10. The electrophoretic display device as claimed in claim 8, wherein in the periods for updating the image, a period where a positive voltage is applied to the counter electrode and a period where a negative voltage is applied do not overlap with each other in each of the voltage waveforms applied to the pixels in the first region and the pixels in the second region for each of the display gradations.

11. An electrophoretic display device, comprising:

a display unit which comprises a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying a prescribed voltage waveform to the electrophoretic particles between the pixel electrode and the counter electrode for each display gradation when updating the image, wherein:

when a state where all the electrophoretic particles of at least a single color are migrated to the first substrate by a first stirring pulse for stirring the electrophoretic particles is defined as a first base state and a state where all the electrophoretic particles of at least a single color are migrated to the second substrate by a second stirring pulse for stirring the electrophoretic particles is defined as a second base state, periods for updating the image include: a reset period constituted with a stirring period where all the pixels are set to the first base state and the second base state; and a set period that includes a set pulse for transiting the display state to a state according to the next image; and in the reset period, a first timing occurs where all the pixels of the display unit are aligned to one of the first base state and the second base state by applying one of the first stirring pulse and the second stirring pulse, and after the first timing, a second timing occurs where all the pixels of the display unit are aligned to the other one of the first base state and the second base state by applying the other one of the first stirring pulse and the second stirring pulse containing an extension period of the pulse width according to the display gradation, and the display state of the display unit does not change during a longest extension period among different extension periods according to the display gradation.

12. The electrophoretic display device as claimed in claim 11, wherein in the periods for updating the image, a period where a positive voltage is applied to the counter electrode and a period where a negative voltage is applied do not overlap with each other in each of the voltage waveforms applied for each of the display gradations.

13. A method for driving an electrophoretic display device which comprises:

a display unit which comprises a first substrate, a second substrate, and electrophoretic particles inserted between the first substrate and the second substrate; and a voltage applying unit which updates a display state of the display unit from a current image to a next image by applying prescribed voltage waveforms constituted with a stirring pulse, a compensation pulse, and a set pulse to the electrophoretic particles, the method comprising:

setting the display state to a state where the electrophoretic particles are migrated to either the first substrate or the second substrate by the stirring pulse according to polarity of the electrophoretic particles; then applying a voltage for suppressing a residual direct current component that may be generated after applying the set pulse without causing a change in the display state by the compensation pulse, and updating the image to the next image by the set pulse.

14. A method for driving an electrophoretic display device which comprises:

a display unit which comprises a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying prescribed voltage waveforms constituted with a stirring pulse, a compensation pulse, and a set pulse to the electrophoretic particles between the pixel electrode and the counter electrode for each display gradation when updating the image, the method comprising, during update of the image:

when a state where all the electrophoretic particles of at least a single color are migrated to the first substrate or the second substrate by the stirring pulse for stirring the electrophoretic particles is defined as a base state, setting all the pixels of the display unit in the same base state by at least one of the stirring pulses; then suppressing accumulation of a residual direct current component without causing a change in the display state of the base state by the compensation pulse; and then transiting the display state to a state according to the next image by the set pulse.

15. A method for driving an electrophoretic display device which comprises:

a display unit which comprises a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying prescribed voltage waveforms constituted with a stirring pulse, a compensation pulse, and a set pulse to the electrophoretic particles between the pixel electrode and the counter electrode for each display gradation when updating the image, wherein:

the display unit is constituted with the pixels of a first region and the pixels of a second region; the method comprising, during update of the image:

when a state where all the electrophoretic particles of at least a single color are migrated to the first substrate by the stirring pulse for stirring the electrophoretic particles is defined as a first base state and a state where all the electrophoretic particles are migrated to the second substrate is defined as a second base state, setting all the pixels in the first region to the first base state and setting all the pixels in the second region to the second base state by the stirring pulse; then suppressing accumulation of a residual direct current component without causing a change in the display state of the first base state and the display state of the second base state by the compensation pulse; and then transiting the display state to a state according to the next image by the set pulse.

16. A method for driving an electrophoretic display device which includes a display unit which includes a first substrate in which switching elements and pixel electrodes are arranged in matrix, a second substrate in which a counter electrode is formed, an electrophoretic layer including at least a single color of electrophoretic particles and being inserted between the first substrate and the second substrate, and pixels arranged in matrix by corresponding to the pixel electrodes; and a voltage applying unit which updates a display state of the display unit from a current image to a next image by applying prescribed voltage waveforms to the electrophoretic particles between the pixel electrode and the counter electrode for each display gradation when updating the current image to the next image, the method comprising:

updating the current image to the next image wherein when a state where all the electrophoretic particles of at least a single color are migrated to the first substrate by the first stirring pulse for stirring the electrophoretic particles is defined as a first base state and a state where all the electrophoretic particles of at least a single color are migrated to the second substrate by the second stirring pulse for stirring the electrophoretic particles is defined as a second base state, periods for updating the image including: a reset period constituted with a stirring period where all the pixels are set to the first base state and the second base state, and a set period that includes a set pulse for transiting the display state to a state according to the next image, in the reset period, a first timing occurs where all the pixels of the display unit are aligned to one of the first base state and the second base state by applying one of the first stirring pulse and the second stirring pulse, and after the first timing, a second timing occurs where all the pixels of the display unit are aligned to the other of the first base state and the second base state by applying the other one of the first stirring pulse and the second stirring pulse containing an extension period of the pulse width according to the display gradation, and the display state of the display unit does not change during a longest extension period among different extension periods according to the display gradation.

\* \* \* \* \*